United States Patent [19]
Nagasaki et al.

[11] Patent Number: 6,028,673
[45] Date of Patent: Feb. 22, 2000

[54] INSPECTION OF SOLDER BUMPS OF BUMP-ATTACHED CIRCUIT BOARD

[75] Inventors: Masato Nagasaki; Tomoyoshi Tsunekawa, both of Aichi; Yoichi Matsubara; Akira Kotagiri, both of Nagano, all of Japan

[73] Assignee: NGK Spark Plug Co., Ltd., Nagoya, Japan

[21] Appl. No.: 09/122,891

[22] Filed: Jul. 28, 1998

[30] Foreign Application Priority Data

Mar. 31, 1998 [JP] Japan .................................. 10-105553
Mar. 31, 1998 [JP] Japan .................................. 10-105554
Mar. 31, 1998 [JP] Japan .................................. 10-105555
Mar. 31, 1998 [JP] Japan .................................. 10-105671

[51] Int. Cl.$^7$ .................................................. G01B 11/14
[52] U.S. Cl. ...................... 356/376; 356/375; 250/559.23
[58] Field of Search ..................................... 356/375, 372, 356/376, 394; 348/126, 125; 382/154; 228/9, 8, 102, 104, 105; 250/559.23, 559.34, 559.22, 559.29, 559.31

[56] References Cited

U.S. PATENT DOCUMENTS

| | | | |
|---|---|---|---|
| 5,103,105 | 4/1992 | Ikegaya et al. | 356/376 |
| 5,166,753 | 11/1992 | Tokura | 356/376 |
| 5,267,217 | 11/1993 | Tokura et al. | 356/376 |
| 5,272,517 | 12/1993 | Tokura | 356/375 |
| 5,444,537 | 8/1995 | Yoshimura et al. | 356/376 |
| 5,621,814 | 4/1997 | Honda | 382/152 |
| 5,686,994 | 11/1997 | Tokura | 356/394 |
| 5,906,309 | 5/1999 | Hashimoto et al. | 228/9 |
| 5,956,134 | 9/1999 | Roy et al. | 356/394 |

FOREIGN PATENT DOCUMENTS 6-167322  6/1994  Japan .

*Primary Examiner*—Hoa Q. Pham
*Attorney, Agent, or Firm*—Foley & Lardner

[57] ABSTRACT

An inspection beam is cast onto an inspection surface of a bump-attached circuit board, which inspection surface is provided with a plurality of solder bumps, and scanned within the inspection surface two-dimensionally while allowing its reflected beam to be received at PSD (Position Sensing Device). On the basis of detection output from a beam receiving section at that moment, information on heights at respective positions within the inspection surface and information on the brightness of the reflected beam are prepared. On the basis of the prepared reflected beam brightness information, an existing region of a top face of each bump (bump top face existing region) is fixed. By using information on height of each bump which is prepared on the basis of the information on the size or area of the bump top face existing region and the respective heights within the bump top face existing region, information on volume of each bump is prepared. A height value range is divide to a plurality of range sections by means of one or more hold values. The height value range sections are associated one-to-one with depths and/or colors of pixels of a splay device for thereby associating the depths or colors of the pixels corresponding to the respective positions within the inspection surface with height values at the respective positions, which is indicated by the height information. Mapping output representative of the height distribution on the inspection surface is supplied to the display device.

48 Claims, 58 Drawing Sheets

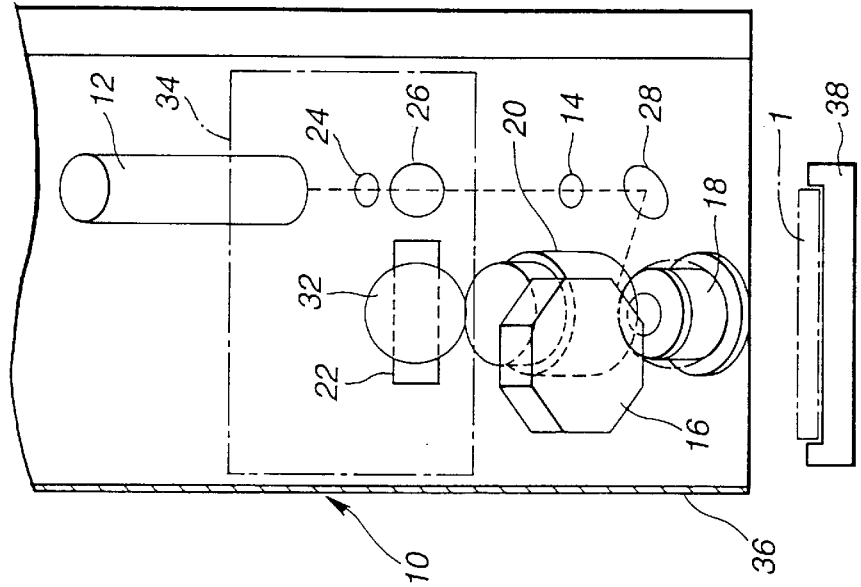
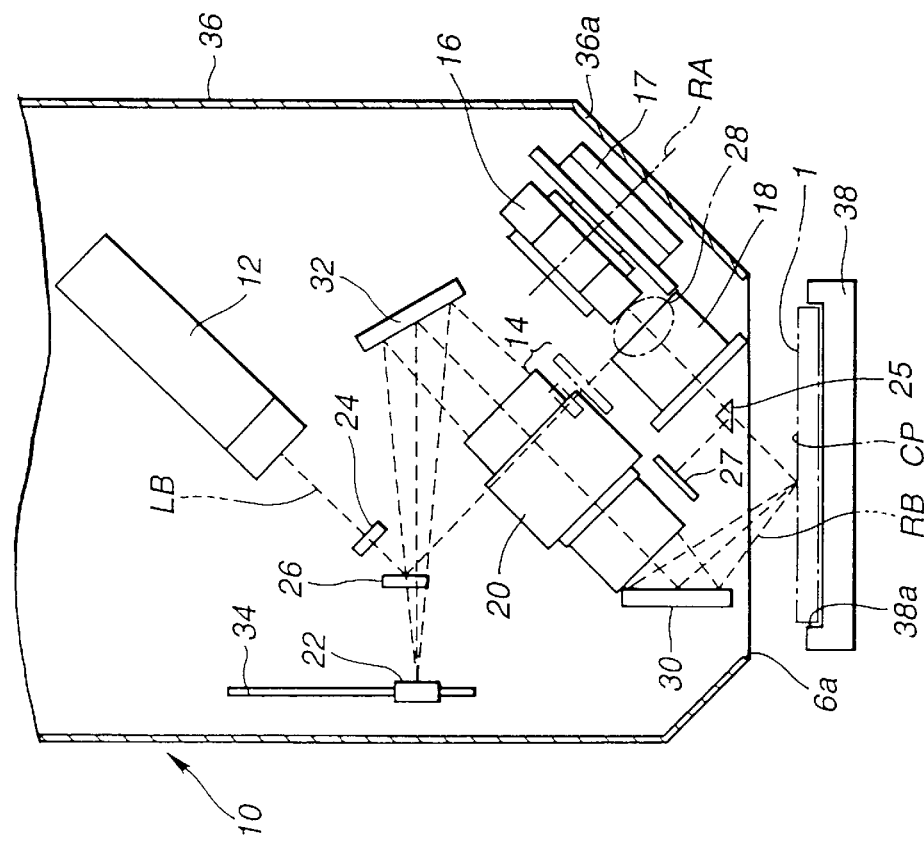

$\phi = 180° - 2\theta$ $\Delta b = L\cos\theta / \sin\phi$

FIG.11
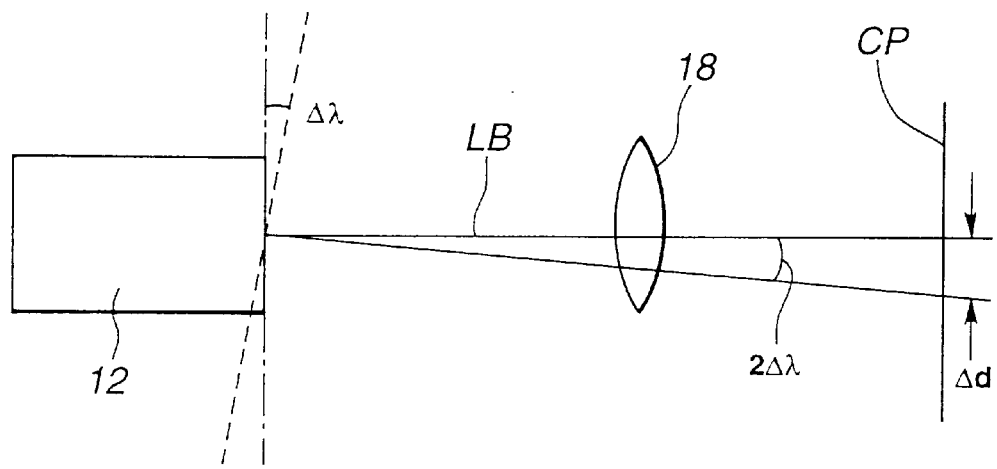
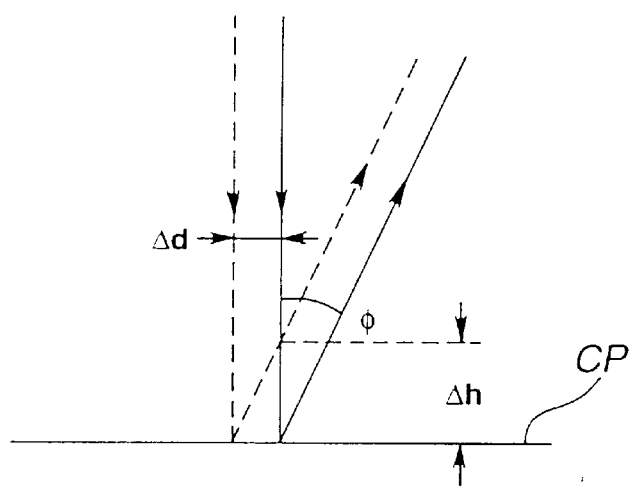

FIG.13A

| 0 | 0 | 0 | 7 | 0 | 0 | 0 | 0 |
|---|---|---|---|---|---|---|---|
| 0 | 0 | 0 | 8 | 8 | 0 | 0 | 0 |
| 0 | 0 | 8 | 7 | 8 | 8 | 0 | 0 |
| 0 | 8 | 8 | 8 | 9 | 7 | 8 | 0 |
| 7 | 8 | 8 | 7 | 8 | 8 | 8 | 7 |
| 0 | 0 | 8 | 8 | 8 | 7 | 0 | 0 |
| 0 | 0 | 0 | 8 | 8 | 0 | 0 | 0 |
| 0 | 0 | 0 | 0 | 7 | 0 | 0 | 0 |

HEIGHT DATA

FIG.13B

| 0 | 0 | 0 | 5 | 0 | 0 | 0 | 0 |
|---|---|---|---|---|---|---|---|
| 0 | 0 | 0 | 7 | 7 | 0 | 0 | 0 |
| 0 | 0 | 8 | 8 | 8 | 8 | 0 | 0 |
| 0 | 7 | 8 | 8 | 8 | 8 | 7 | 0 |
| 5 | 7 | 8 | 8 | 7 | 8 | 7 | 5 |
| 0 | 0 | 7 | 8 | 8 | 7 | 0 | 0 |
| 0 | 0 | 0 | 8 | 8 | 0 | 0 | 0 |
| 0 | 0 | 0 | 5 | 0 | 0 | 0 | 0 |

BRIGHTNESS DATA
(THRESHOLD VALUE : 7)

FIG.13C

|   |   |   | 8 | 8 |   |   |
|---|---|---|---|---|---|---|
|   |   | 8 | 7 | 8 | 8 |   |
|   | 8 | 8 | 8 | 9 | 7 | 8 |
|   | 8 | 8 | 7 | 8 | 8 | 8 |
|   |   | 8 | 8 | 8 | 7 |   |
|   |   |   | 8 | 8 |   |   |

BUMP EXISTING REGION

REFERENCE AREA ( NUMBER OF BITS ) $S_0$ $BA_1 : S_1 > S_0$    $BA_3 : S_3 > S_0$    $BA_5 \cdots$ 1BIT
$BA_2 : S_2 > S_0$    $BA_4 : S_4 < S_0$    $BA_6 \cdots$ 2BITS BUMP DIAMETER  D = 2$r_m$ $r_m = \frac{1}{N} \sum_{i=1}^{N} r_i$

FIG.22
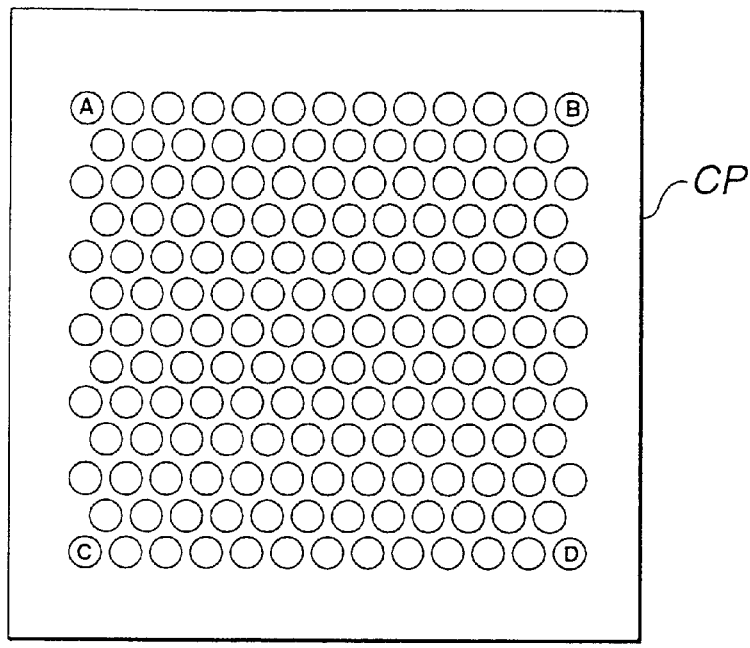
WAVINESS VALUE : $T_A = \dfrac{1}{N} \sum_{i=1}^{N} T_{mi}$
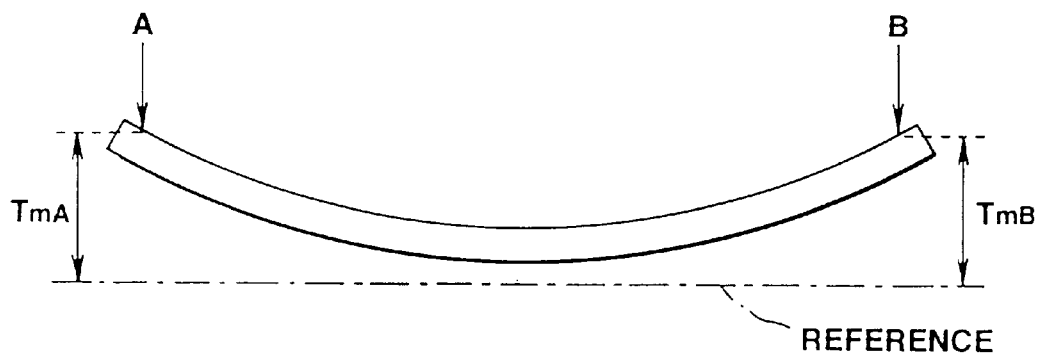
WAVINESS VALUE : $T_A = \dfrac{T_{mA}+T_{mB}+T_{mC}+T_{mD}}{4}$

FIG.34
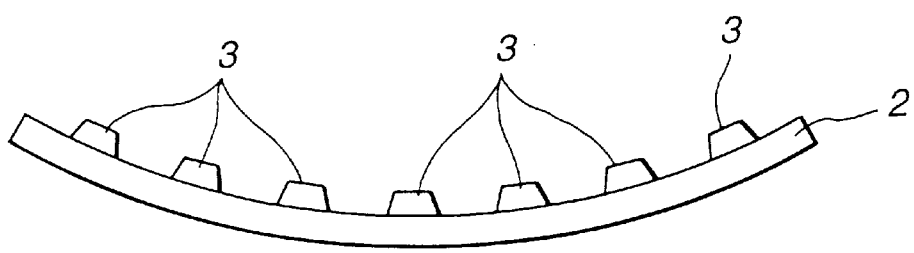
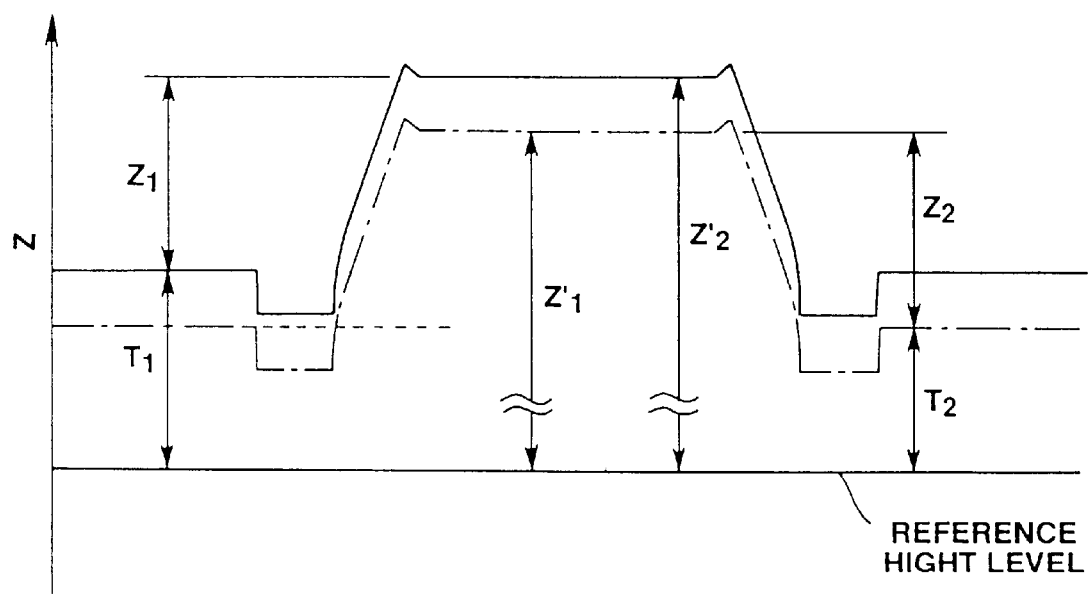
REFERENCE HIGHT LEVEL

FIG.36
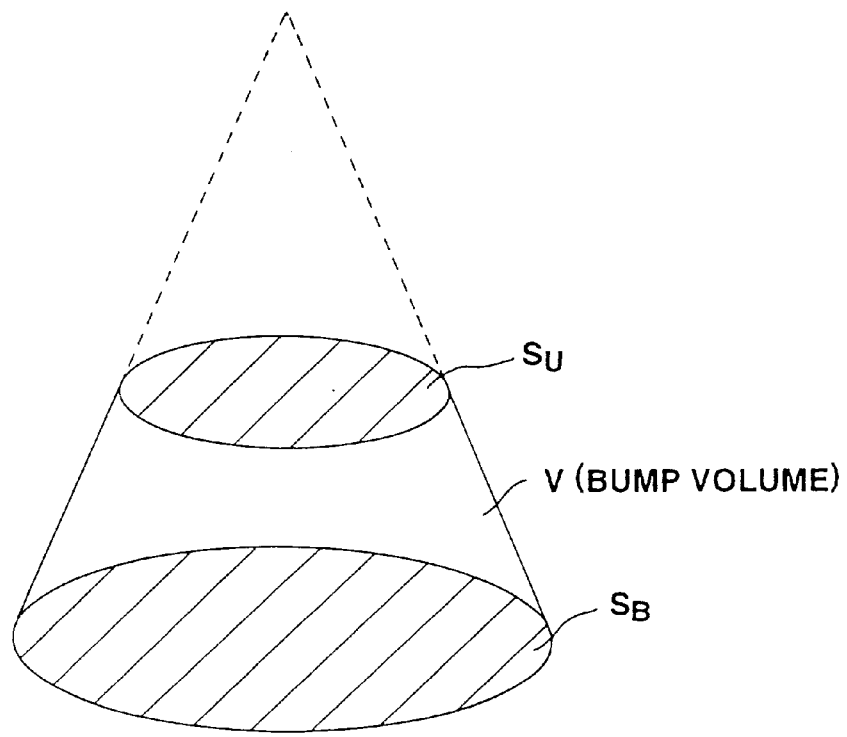
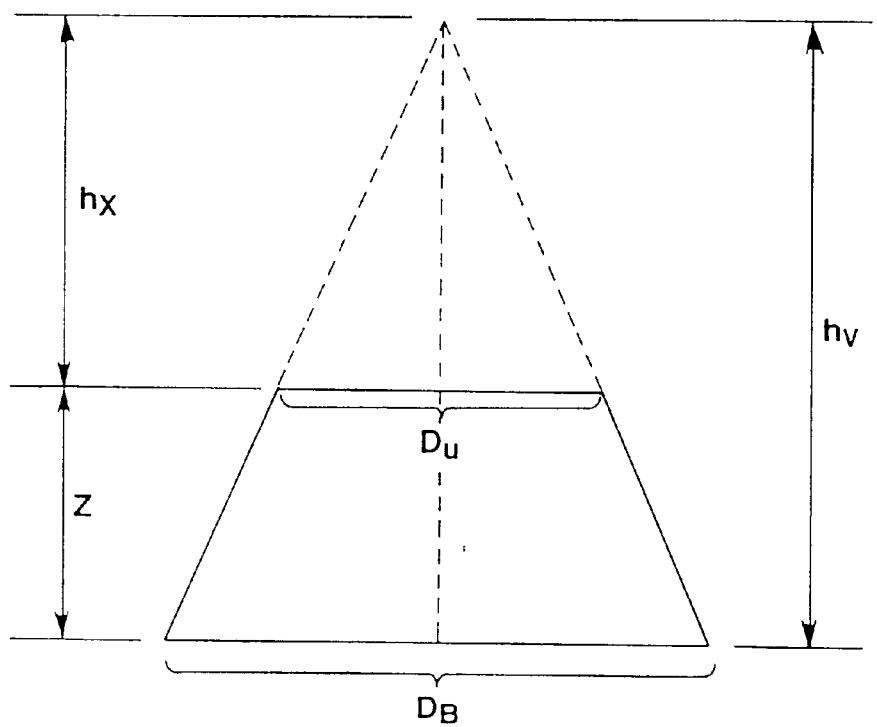

FIG.45
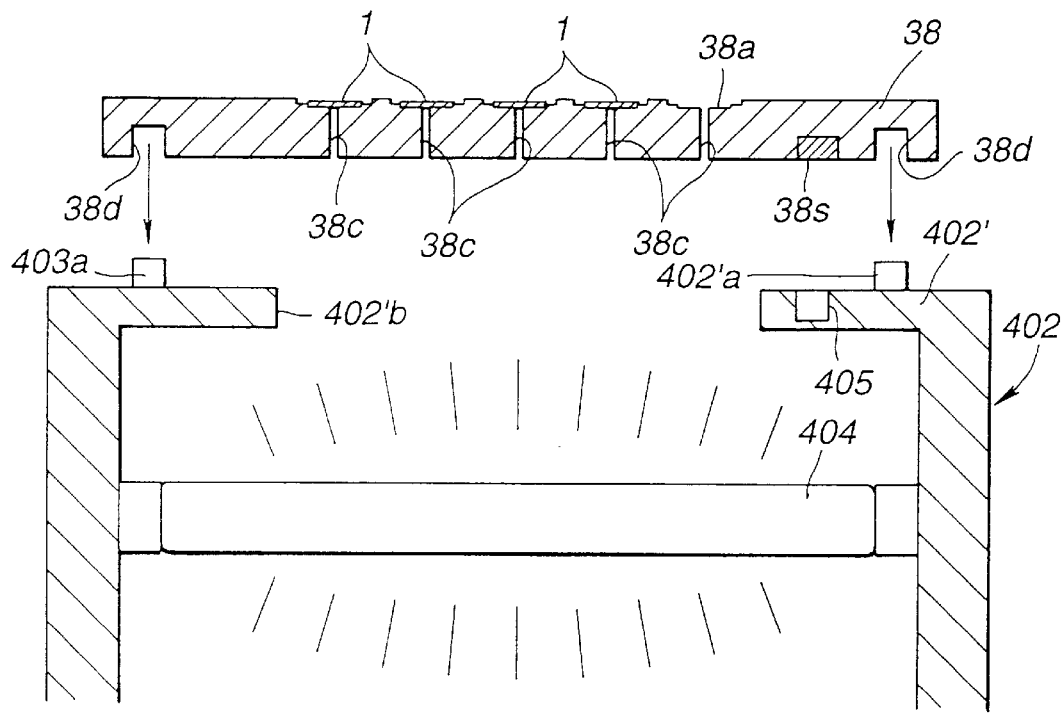
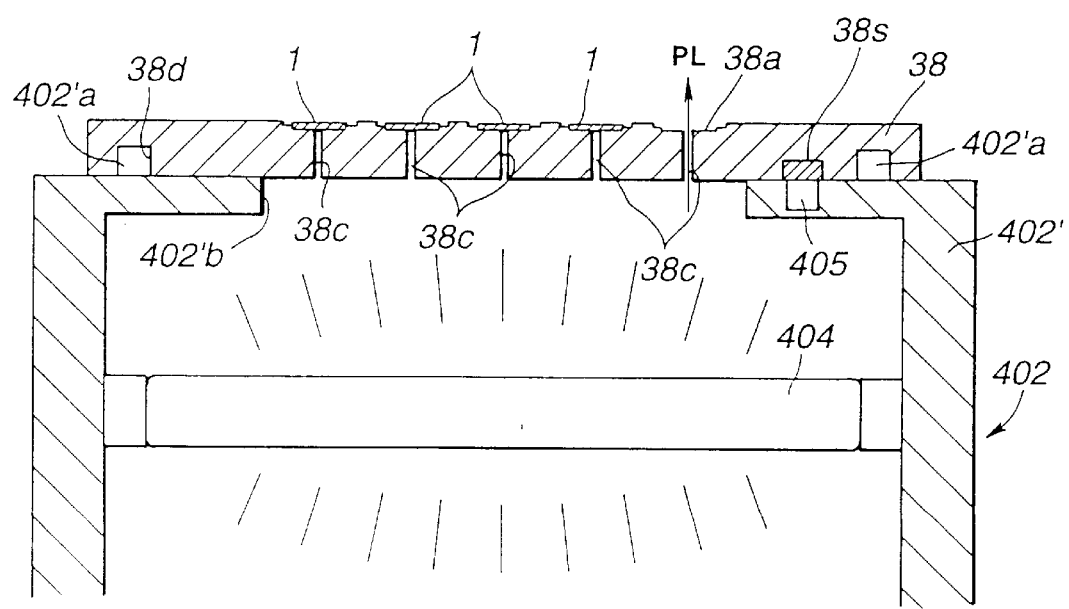

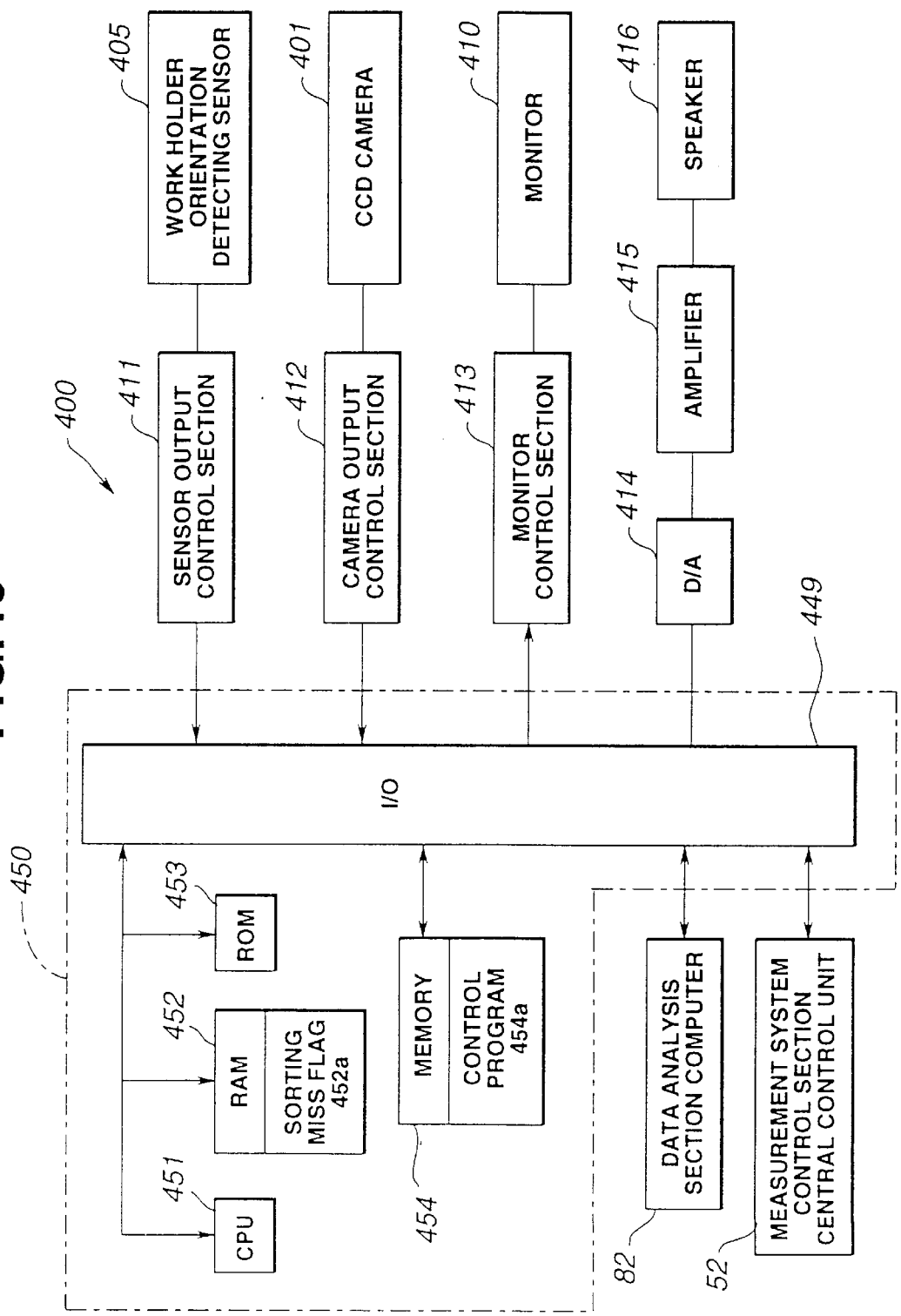

INSPECTION OF SOLDER BUMPS OF BUMP-ATTACHED CIRCUIT BOARD

BACKGROUND OF THE INVENTION

1. Field of the Invention

The present invention relates to a method of and apparatus for inspecting a circuit board, such as a flip-chip bonding circuit board and a ball grid array (BGA) circuit board, on which is arranged two-dimensionally a plurality of solder balls or bumps for electrical connection with a chip or another circuit board (circuit board with solder bumps being herein refered to as "bump-attached circuit board"). The present invention further relates to a method of producing a bump-attached circuit board by the use of such an inspection method and apparatus.

2. Description of the Related Art

In recent years, there is an increasing tendency that integrated circuit chips, such as microprocessor chip and computer chips are becoming higher in the density of integration and rapidly increasing in the number of input/output terminals. For connecting such a chip to a circuit board substrate by the flip-chip technology, solder bumps formed on the substrate are several hundreds at least and several thousands at most in number. In this connection, if the solder bumps formed on the substrate are, for example, not in place or the height and other dimensions thereof are not included within predetermined ranges, there arises a problem that a defective connection is caused between the circuit board and a mating chip and a malfunction of an integrated circuit chip may possibly be caused, so strict inspection of the solder bumps is needed.

Heretofore known as the most popular inspecting technique for inspecting the dimensions of the solder bumps of such a bump-attached circuit board, for example, the heights of the solder bumps is a measurement technique using a laser beam. However, by this measurement technology, it takes several seconds to measure the height of one solder bump. Thus, in case of the substrate having a great number of solder bumps, it takes a time ranging from several tens of minutes to several hours to measure the heights of all the solder bumps on one circuit board, so it is actually impossible to carry out 100% inspection of mass-produced circuit boards.

To solve such a problem, there is proposed, as disclosed in JP 6-167322, an apparatus for carrying out high-speed inspection of the heights of solder bumps by scanning a main surface of a circuit board in its entirety with a spot light, inputting a data on the heights of all the surface sections of the circuit board including the surface sections provided with the solder bumps, and determining a height of a solder bump on the basis of the difference between the height of the top of the solder bump and the height of the main surface of the circuit board.

The object to be inspected by such an apparatus disclosed in the above described Japanese patent provisional publication is a semiconductor silicon circuit board having spherical solder bumps, and the apparatus is adapted to measure the heights of the solder bumps by the use of the reflected beam reflected from the place around the top of each solder bump, which is masked by the data on brightness. However, in the case this technique is used for measuring the height of a solder bump having a flat or flattened top (hereinafter referred to as flat solder bump), there occurs the following problem. That is, in the case the outer surface of the solder bump is spherical, there is caused, in measurement of the brightness of beam reflected from the solder bump, a region which is high in the reflection brightness (hereinafter referred to as high brightness region) and which is located limitedly adjacent the top of the solder bump, so that it can be easily judged which of high brightness regions corresponds to which of the solder bumps. Further, when viewing this matter from another angle, in the circuit board having a plurality of spherical solder bumps, there is caused at a point adjacent the top of each solder bump only one data on height corresponding to each solder bump. Thus, there will not be caused any confusion about judgment on which of two or more of data on height being derived from which of the solder bumps.

However, in the case of the flat solder bump, the high brightness region derived from one solder bump has a certain extent since the top of the solder bump is flat, so a number of height data corresponding to various places on the top are prepared even when the top of only one solder bump is scanned with a laser beam. That is, a number of height data are obtained for only one solder bump. As a result, a relation of one to one correspondence does no more exist between a height data and a solder bump, for example, it will become unclear whether two height data which are relatively close in position to each other are derived from the same solder bump or different solder bumps, resulting in a drawback that it becomes impossible to determine the heights of the solder bumps accurately.

In this instance, two height data derived from different solder bumps belong to two high brightness regions which are separated by a low brightness region, so it appears seemingly possible to determine whether two high brightness regions belong to different solder bumps or to the same solder bump. However, in the case of the solder bump having a depression on the top, a low brightness region corresponding to the depression is produced within a reflected image of one solder bump, so that two height data with a low brightness region therebetween can not be readily judged as being derived from two different solder bumps.

Further, in the apparatus disclosed by the above described Japanese patent provisional publication, for inspecting a surface luster, a line sensor is used for picking up image of bumps on a circuit board surface. In this instance, the information represented by the picked-up image reflects the intensity of the reflected beam at respective positions on the circuit board and does not include information on height. For this reason, while a pair of bumps which are different in the surface condition due to oxidation or the like can be distinguished from each other, it is impossible to distinguish a bump of a normal height from a bump of an abnormal height on the basis of a picked-up image unless there is a difference in the surface condition between them. In the above described prior art apparatus, in addition to the information based on the picked-up image, reference is also made to the information on the bump height measured by PSD (position sensing device). However, it is impossible to grasp intuitively whether the height of each bump formed on the circuit board is good or not, and there arises a problem that even an obvious height defect cannot be found unless reference is made to the height information which is measured separately.

Further, in case a variation in the height level of the surface of the circuit board is caused due to warping, waviness or the like, the absolute height level of the top position of each bump is not uniform even if the protruding height of each bump is uniform, thus possibly causing a connection defect or the like. However, since evaluation of the bump height is performed on the basis of only the protruding height above the circuit board surface by the above described prior art apparatus, there results a problem that such a height level defect of the height level being not uniform (i.e., a so-called coplanarity defect) cannot be found. Further, since the above described picked-up image does not almost reflect any information on the bump top position, height level distribution, warping or waviness of the circuit board surface, etc., it is almost hopeless to find the above described defects on the basis of the picked-up image.

SUMMARY OF THE PRESENT INVENTION

According to the first aspect of the present invention, there is provided a novel and improved apparatus for inspecting a circuit board with a plurality of solder bumps disposed on a circuit board substrate two-dimensionally. The apparatus comprises:

a beam source for supplying an inspection beam onto an inspection surface of the circuit board, the inspection surface including a surface region where the solder bumps are disposed;

a beam receiving section for receiving a reflected beam resulting from the inspection beam and reflected from the inspection surface;

scanning means for scanning the inspection surface with the inspection beam;

height information preparing means for preparing information on height at various places within the inspection surface on the basis of the inspection output at the beam receiving section;

reflected beam brightness information preparing means for preparing information on reflected beam brightness at respective positions on the inspection surface on the basis of the inspection output at the beam receiving section;

high brightness region fixing means for fixing a plurality of high brightness regions which are located on the inspection surface and which exhibit a reflected beam brightness equal to or higher than a predetermined threshold value, on the basis of the information on brightness prepared by the reflected beam brightness information preparing means;

bump principal portion existing region recognizing means for recognizing, of the fixed high brightness regions, those that have an area equal to or larger than a criterion area as bump principal portion existing regions where principal portions of corresponding those of the solder bumps exist, respectively;

inspection information preparing means for preparing inspection information including at least information on height of the solder bumps corresponding to the bump principal portion existing regions, on the basis of information on height at respective positions within the bump principal portion existing regions; and inspection information output means for outputting the inspection information prepared by the inspection information preparing means.

According to the second aspect of the present invention, there is provided a novel and improved method of inspecting a bump-attached circuit board with a plurality of solder bumps arranged on a circuit board substrate two-dimensionally. The method comprises the steps of:

supplying an inspection beam onto an inspection surface of the circuit board, the inspection surface including a surface region where the solder bumps are disposed, and scanning the inspection beam within the inspection surface two-dimensionally while receiving, at a beam receiving section, a reflected beam resulting from the inspection beam and reflected from the inspection surface;

preparing information on height at respective positions within the inspection surface, on the basis of an inspection output at the beam receiving section;

preparing, on the basis of the inspection output at the beam receiving section, information on brightness of the reflected beam at respective positions on the inspection surface, and fixing, within the inspection surface, a plurality of high brightness regions each of which exhibits a reflected beam brightness higher than a predetermined threshold value, on the basis of the information on brightness of the reflected beam;

recognizing, of the fixed high brightness regions, those that have an area equal to or larger than a criterion area as bump principal portion existing regions where principal portions of corresponding those of the solder bumps exist; and obtaining, on the basis of information on height at respective positions within the bump principal portion existing regions, inspection information including at least information on height of the solder bumps corresponding to the bump principal portion existing regions.

In the above described inspection apparatus and method according to the first and second aspects of the present invention, the regions of the inspection surface of the bump-attached circuit board, which exhibit a reflected beam brightness equal to or higher than a threshold value, are fixed as high brightness regions, and only those of the high brightness regions that have an extent of space equal to or larger than a criterion area are recognized as bump principal portion existing regions. That is, even in the case of a flat bump or the like having a flat top, the extent of space of each of the high brightness regions is defined two-dimensionally to be processed, so there is not any possibility of mistaking two or more height data resulting from one high brightness region for those resulting from different solder bumps, thus resultantly making it possible to perform inspection of a circuit board provided with any kind of solder bumps accurately and rapidly. As a result, even in the case of a bump which is formed with a depression at the top, it can be recognized assuredly on the basis of an extent of space of a high brightness region. Further, there may occur such a case in which the high brightness region originating from one bump is separated into two or more sections. In this instance, since a high brightness region which is of such an area smaller than a criterion area is not regarded as a bump principal portion existing region, it is hard to occur such a trouble that the above two sections are regarded as two solder bumps, thus resultantly making it possible to identify a plurality of solder bumps formed on a circuit board accurately. As a result, it becomes possible to perform inspection of a flat bump (i.e., bump with a flat top) whose high brightness region is wider as compared with that of a spherical bump and likely to cause separation of its high brightness region, without any trouble. Further, by using information on height at respective positions within each of the bump principal portion existing regions, it becomes possible to know a height of a corresponding bump accurately, thus enabling to make higher the accuracy of inspection.

According to the third aspect of the present invention, there is provided a novel and improved method of producing a circuit board with a plurality of solder bumps arranged on a circuit board substrate two-dimensionally, comprising the steps of:

forming the solder bumps on the circuit board substrate;

supplying an inspection beam onto an inspection surface of the circuit board, the inspection surface including a surface region where the solder bumps are disposed, and scanning the inspection beam with the inspection surface two-dimensionally while receiving, at a beam receiving section, a reflected beam resulting from the inspection beam and reflected from the inspection surface;

preparing information on height at respective positions on the inspection surface, on the basis of an inspection output at the beam receiving section;

preparing, on the basis of the inspection output at the beam receiving section, information on brightness of the reflected beam at respective positions on the inspection surface, and fixing, within the inspection surface, a plurality of high brightness regions each of which exhibits a reflected beam brightness higher than a predetermined threshold value, on the basis of the information on brightness of the reflected beam;

recognizing, of the fixed high brightness regions, those that have an area equal to or larger than a criterion area as bump principal portion existing regions where principal portions of corresponding those of the solder bumps exist, respectively;

measuring, on the basis of information on height at respective positions within the recognized bump principal portion existing region, a height of each of the solder bumps corresponding to each of the bump principal portion existing regions; and detecting and sorting out only a bump-attached circuit board, all of the solder bumps of which have heights within a predetermined range.

Thus, by making the most of the advantage of the inspection method according to the third aspect of the present invention, it becomes possible to carry out easily and readily selection of bump-attached circuit boards which are obtained by forming solder bumps on a circuit board substrate, on the basis of whether the heights of the solder bumps are within a predetermined range or not, thus resultantly making it possible to produce a bump-attached circuit board which is guaranteed in quality with efficiency.

Specifically, the inspection information preparing means can consist of bump height determining region setting means for setting, in regard to the inspection surface, a plurality of bump height determining regions each having a predetermined size and a predetermined positional relation to each of the bump principal portion existing regions so that each of the bump height determining regions includes therewithin each of the bump principal portion existing regions, and bump height calculating means for calculating a height of each of the solder bumps on the basis of the information on height at respective positions within each of the set bump height determining regions. In case of a flat bump which is flat at the top, a bump principal portion existing region appears considerably wide according to the flat top, and there may occur in many cases distribution of irregular or varying heights of the bump within the bump principal portion existing region. Thus, as described above, the bump height determining region is set so as to include the bump principal portion existing region, and the height of the bump is calculated on the basis of information on height at the respective positions within the bump height determining region, whereby it is hard to occur an error in measurement of the height due to such distribution of varying heights and it becomes possible to attain more accurate information on height of solder bumps.

In the meantime, the bump height determining region can be set so as to be substantially or practically equal to the bump principal portion existing region or can be set so as to be wider than the bump principal portion existing region. In case of the former, a height of a solder bump is calculated on the basis of information on height at respective positions within the bump principal portion existing region.

Further, in case of the latter, it is provided bump height determining high brightness region extracting means for extracting, from the high brightness regions existing within the set bump height determining regions, those that have an area equal to or larger than a predetermined threshold area which is set so as to include therewithin each of the bump principal portion existing regions and be smaller than the criterion area, for use as bump height determining high brightness regions. Then, the bump height calculating means is constructed so as to calculate, on the basis of the information on height at those of respective positions within each of the bump height determining regions and belonging to each of the extracted bump height determining high brightness regions, a height of corresponding one of the solder bumps. By this, in addition to a bump principal portion existing region a high brightness region or regions separated from the bump principal portion existing region for various factors are used for calculation of the height of the bump, thus making it possible to measure the height of the bump more accurately. In this instance, the above described threshold area can be zero but it is preferable to set to a predetermined value which is not zero for the purpose of excluding a high brightness region or regions which may be detected erroneously due to the influence of noise or the like.

In the meantime, the bump height determining region setting means can set the bump height determining region to be one of a circular region with a center coincident with a geometric center of gravity of each of the bump principal portion existing regions, a quadrilateral region with a point of intersection of its diagonal lines coinciding with the geometric center of gravity of each of the bump principal portion existing regions, and a quadrilateral region circumscribed about each of the bump principal portion existing regions. By setting the bump height determining region in this manner, the proportion of the region where solder bumps do not exist inherently to the bump height determining region can be made smaller, thus resultantly enabling to make further higher the accuracy in measurement of the heights of the solder bumps.

Further, the bump height calculating means can be constructed so as to calculate one of an average height which is obtained by averaging heights at respective positions within each of the bump height determining high brightness regions, a maximum height which is a maximum of the heights at the respective positions, a minimum height which is a minimum of the heights at the respective positions, and a most frequent height which is the most numerous one of the heights at the respective positions, and determines calculated one of them as a height of corresponding one of the solder bumps. By this, even in the case the bump is flat at the top as a flat bump and there is caused a distribution of varying heights at the top face of the bump, it becomes possible to carry out rational or reasonable evaluation or judgment. Further, according to the necessity, two of the above described average height, maximum height, minimum height and the most frequent height (e.g., average height and maximum height) are calculated and combined to carry out the above described evaluation, whereby the more accurate evaluation of the height of the bump can be done.

Further, the apparatus according to the first aspect of the present invention can be further provided with position tolerance defining window setting means for setting, in regard to the inspection surface, a plurality of position tolerance defining windows each of which defines a tolerance of a position where each of the solder bumps is formed, area calculating means for calculating an area of each of the high brightness regions within each of the set position tolerance defining windows or an area proportion at which each of the high brightness regions occupies each of the position tolerance defining windows, and judgment means for judging whether each of the solder bumps corresponding to each of the position tolerance defining windows is in a state of being formed good or not, on the basis of the area or the area proportion of each of the high brightness regions calculated by the area calculating means. By this, a defective bump which is moved out of place or incomplete in shape due to chipping or the like can be recognized with ease on the basis of judgment on whether the high brightness region is produced within the position tolerance defining window at a predetermined proportion or more.

Then, the inspection information preparing means can comprise bump center calculating means for calculating a geometric center of gravity of each of the bump principal portion existing regions and determining the calculated geometric center of gravity as a center of corresponding one of the solder bumps. In this instance, as the inspection information, information on the coordinates of the center of the solder bump can be produced. Further, the inspection information preparing means can comprise bump size calculating means for calculating, on the basis of a size of each of the bump principal portion existing regions, a size of corresponding one of the solder bumps. In this instance, as the inspection information, information on the size of the bump can be prepared.

For example, in the prior art disclosed in the aforementioned publication, the diameter of the bump and the center of the bump are obtained on the basis of the silhouette of the solder bump. However, since the laser beam is incident obliquely to the surface of the circuit board, it is generally impossible for the silhouette to be accurately reflective of the actual shape of the bump. Further, in case a pad, groove or the like is formed around the solder bump or in case a surface portion of the circuit board around the solder bump is not in an uniform state, the silhouette may be influenced thereby and its variation may result. Accordingly, there results a problem that the size and center of the bump determined by the use of such a silhouette have an error which is not small unless a suitable correction is made thereto. However, the bump principal portion existing region formed by the reflected beam can be a profile directly reflecting the shape of the solder bump so that by the use of the bump principal portion existing region it becomes possible to obtain the size and center of the bump more accurately.

In the meantime, the bump center calculating means can be constructed so as to calculate a point of intersection of diagonal lines of a quadrilateral region (e.g., rectangular region) circumscribed about each of the bump principal portion existing regions, and determine the calculated point of intersection as a center of corresponding one of the solder bumps. For example, a method of calculating a center of gravity as representing a center of a bump, is more accurate among center determining methods but requires to use coordinate values of a number of brightness data constituting a high brightness region at the time of calculation, so that the number of operations is a little larger. However, in case of the method of obtaining a quadrilateral region circumscribed about the bump principal portion existing region (and a point of intersection of diagonal lines) as described above, its operation is far easier as compared with an operation for obtaining coordinates of a center of gravity, thus making it possible to make higher the processing speed.

Further, the inspection information preparing means can be structured so as to comprise bump arranging interval calculating means for calculating the bump arranging interval on the basis of a distance between the centers of the solder bumps calculated by the bump center calculating means. In this instance, it can be constructed so as to produce bump arranging interval information as inspection information. By using the result of calculation, inspection of the arranging intervals of solder bumps on the circuit board can be performed with ease.

In the meantime, under the condition of the bump-attached circuit board being held by a circuit board holder, an inspection beam may be cast onto its inspection surface. In this instance, the bump height calculating means can be structured so as to calculate a coplanarity determining which is a height of each of the solder bumps above a reference height level having a constant relation with the circuit board holder and determine the coplanarity determining height as the height of corresponding one of the solder bumps. The inspection data preparing means can be structured so as to comprise coplanarity information preparing means for preparing coplanarity information reflecting an irregularity of heights of the solder bumps of the bump-attached circuit board, on the basis of a maximum $z'_{max}$ and a minimum $z'_{min}$ of coplanarity determining heights calculated by the bump height calculating means.

It is considered desirable that the solder bumps disposed on the circuit board are as uniform in height as possible in order to improve the adherence thereof to a joining object such as an integrated circuit chip (e.g., in case of flip-chip), printed circuit board (e g., in case of BGA circuit board), etc. In this instance, a simple parameter is a difference of $z'_{max}$ and $z'_{min}$ ($z'_{max}-z'_{min}$) and it means that as the difference becomes smaller the solder bumps become more uniform in height, so it can serve as an indicator for indicating the irregularity of the solder bumps.

In this invention, an indicator for indicating the irregularity of the heights of the solder bumps, which is calculated not only by the above described $z'_{max}-z'_{min}$ but by the use of $z'_{max}$ and $z'_{min}$ is referred to in a broad sense as coplanarity. For example, there can be employed in this embodiment, other than $z'_{max}-z'_{min}$, various indicators such as a coplanarity in a narrow sense which is defined by the distance between planes $P_{max}$ and $P_{min}$ wherein it is assumed that a least squares plane corresponding to the top position of each bump (in case of a flat bump a predetermined place on the top face, for example, the place on the top face corresponding to the above described center of the bump) is a top reference surface $P_0$, $P_{max}$ is a plane parallel to the top reference surface $P_0$ and in contact with the top of the bump which is maximum height, and $P_{min}$ is a plane parallel to the top reference surface P0 and in contact with the top of the bump which is minimum height. Further, a coplanarity per unit length, which is obtained by dividing the above described distance to serve as an indicator by the distance $L_D$ between a remotest pair of solder bumps among a number of solder bumps formed on the circuit board (for example, in case the solder bumps are arranged in the form of matrix so as to constitute a rectangular or square region in which they are arranged, a pair of solder bumps located on the opposite ends of a diagonal line of a the rectangular or square region) can be used. In any case, by the provision of the above described coplanarity information preparing mean, it becomes possible to evaluate the coplanarity of the bump-attached circuit board easily.

In the meantime, the height of the bump can be expressed by the height of the top of the bump (or top face) above the reference level. For example, in case the reference level is set at the surface of the circuit board on which the solder bumps are formed so as to protrude therefrom, the height of the bump means a protruded height from that surface. However, in case the surface of the circuit board is warped or curved as shown in FIG. 20A, the tops of the solder bumps may become irregular due to the influence of such warp or curve to cause a coplanarity defect even if the protruded heights of the solder bumps from the surface of the circuit board substrate are uniform. Accordingly, in the above described structure, in order that the above described influence from the circuit board holder side to the coplanarity can also be considered, the height of the bump is expressed by a height from a reference level which has a predetermined relation with the circuit board holder.

According to the fourth aspect of the present invention, there is provided an apparatus for inspecting a circuit board with a plurality of solder bumps disposed on a circuit board substrate two-dimensionally, the circuit board substrate having a background surface which is an exposed surface exposed between the solder bumps, the background surface being different in reflectivity for a predetermined inspection beam from a surface of each of the solder bumps, the apparatus comprising:

a beam source for supplying the inspection beam onto an inspection surface of the circuit board, the inspection surface including a surface region where the solder bumps are disposed;

a beam receiving section for receiving a reflected beam resulting from the inspection beam and reflected from the inspection surface;

beam scanning means for scanning the beam within the inspection surface two-dimensionally;

height information preparing means for preparing information on height at respective positions within the inspection surface, on the basis of an inspection output at the beam receiving section;

reflected beam brightness information preparing means for preparing information on reflected beam brightness at respective positions on the inspection surface, on the basis of an inspection output at the beam receiving section;

bump existing region fixing means for fixing a plurality of bump existing regions which are located on the inspection surface, on the basis of the difference in reflected beam brightness between the background surface and a surface of each of the bumps, which difference in reflected beam brightness reflects the information on reflected beam brightness prepared by the reflected beam brightness information preparing means;

inspection information preparing means for preparing inspection information including at least information on height of the solder bumps corresponding to the bump principal portion existing regions, on the basis of information on height at respective positions within the bump principal portion existing regions fixed by the bump principal portion existing region fixing means; and inspection information output means for outputting the inspection information prepared by the inspection information preparing means.

According to the fifth aspect of the present invention, there is provided a method of inspecting a bump-attached circuit board with a plurality of solder bumps disposed on a circuit board substrate two-dimensionally, the circuit board substrate having a background surface which is an exposed surface exposed between the solder bumps, the background surface being different in reflectivity for a predetermined inspection beam from a surface of each of the solder bumps, the method comprising the steps of:

supplying an inspection beam onto an inspection surface of the circuit board, the inspection surface including a surface region where the solder bumps are disposed, and scanning the inspection beam within the inspection surface two-dimensionally while receiving, at a beam receiving section, a reflected beam resulting from the inspection beam and reflected from the inspection surface;

preparing information on height at respective positions within the inspection surface, on the basis of an inspection output at the beam receiving section;

preparing, on the basis of the inspection output at the beam receiving section, information on brightness of the reflected beam at respective positions on the inspection surface, and fixing, within the inspection surface, a plurality of bump existing regions where the respective solder bumps exist, on the basis of the difference in reflected beam brightness between the background surface and a surface of each of the bumps; and obtaining, on the basis of information on height at respective positions within the bump existing regions, inspection information including at least information on height of the solder bumps corresponding to the bump existing regions.

In the apparatus and method according to the fourth and fifth aspect of the present invention, the bump existing regions are fixed on the inspection surface of the bump-attached circuit board on the basis of the difference in the reflected beam brightness between the background surface and the surface of each bump. By this, in case the bump and the circuit board substrate forming the background surface are constructed of materials which are different in reflectivity (e.g., the former is made of metal such as solder, and the latter is made of a high polymer material such as plastics), the both can be distinguished from each other with ease. As a result, it becomes possible to carry out inspection of the bump height or the like with ease in case the circuit board is constructed of such a combination of materials.

According to the sixth aspect of the present invention, there is provided a method of producing a bump-attached circuit board with a plurality of solder bumps disposed on a circuit board substrate two-dimensionally, the circuit board substrate having a background surface which is an exposed surface exposed between the solder bumps, the background surface being different in reflectivity for a predetermined inspection beam from a surface of each of the solder bumps, the method comprising the steps of:

forming the solder bumps on the circuit board substrate;

supplying an inspection beam onto an inspection surface of the circuit board, the inspection surface including a surface region where the solder bumps are disposed, and scanning the inspection beam within the inspection surface two-dimensionally while receiving, at a beam receiving section, a reflected beam resulting from the inspection beam and reflected from the inspection surface;

preparing information on height at respective positions on the inspection surface, on the basis of an inspection output at the beam receiving section;

preparing, on the basis of the inspection output at the beam receiving section, information on brightness of the reflected beam at respective positions on the inspection surface, and fixing, within the inspection surface, a plurality of bump existing regions where the respective solder bumps exist, on the basis of the difference in reflected beam brightness between the background surface and a surface of each of the bumps;

measuring, on the basis of information on height at respective positions within the recognized bump existing regions, a height of each of the solder bumps corresponding to each of the bump existing regions; and detecting and sorting out only a bump-attached circuit board, all of the solder bumps of which have heights within a predetermined range. Thus, by making the most of the advantage of the inspection method according to the third aspect of the present invention, it becomes possible to carry out easily and readily selection of bump-attached circuit boards which are obtained by forming solder bumps on a circuit board substrate, on the basis of whether the heights of the solder bumps are within a predetermined range or not, thus resultantly making it possible to produce a bump-attached circuit board which is guaranteed in quality with efficiency.

In the above described method according to the sixth aspect of the present invention, the circuit board substrate is of such a kind that is made of, for example, a high polymer material which is lower in the reflectivity against the inspection beam than the bump, so that the bump existing region fixing means for such a high polymer material surface can be structured so as to fix a region at which a reflected beam brightness higher than a predetermined threshold value is detected as a bump existing region. The threshold value is set higher than a reflected beam brightness level at a high polymer material surface. By this, the bump existing regions corresponding to the bumps on the circuit board substrate made of a high polymer material such as plastics, as an organic package substrate, can be recognized with ease. Further, by using the information on the height at respective positions within the thus recognized bump existing region, the height of the corresponding bump can be obtained accurately and therefore the inspection accuracy can be made higher.

The apparatus according to the fourth aspect of the present invention can be provided with high brightness region fixing means for fixing a plurality of high brightness regions which are located on the inspection surface and which exhibit a reflected beam brightness equal to or higher than a predetermined threshold value, on the basis of the information on brightness prepared by the reflected beam brightness information preparing means, and bump principal portion existing region recognizing means for recognizing, of the fixed high brightness regions, those that have an area equal to or larger than a criterion area as bump principal portion existing regions where principal portions of corresponding those of the solder bumps exist, respectively. In this instance, the inspection information preparing means can produce inspection information including at least information on height of the solder bumps corresponding to the bump principal portion existing regions, on the basis of information on height at respective positions within the bump principal portion existing regions.

Further, the apparatus according to the fourth aspect of the present invention can be provided with background height determining region setting means for setting, at locations outside of the respective set bump height determining regions, background height determining regions for obtaining the height of the background surface around each of the solder bumps, and background height calculating means for calculating the height of the background surface on the basis of information on height of respective positions within each of the set background height determining regions. By this, the height of the background surface around each bump can be obtained with ease. In this instance, by preparing a bump protruding height calculating means for calculating a protruding height of a bump above the background surface, it becomes possible to calculate a protruding height of each bump above the background surface therearound highly accurately.

For example, in the event that the circuit board substrate is constructed of a high polymer material, there may possibly occur such a case in which the height level of the background surface varies largely to cause waviness or warping of the circuit board surface due to the difference in the coefficient of thermal expansion between the metal constituting the metallic wiring inside the circuit board substrate and the high polymer material when the circuit board is subjected to heating during a manufacturing process. In this connection, if, in measurement of the protruding height of the bump, the protruding height is calculated by determining the height level of the background surface as uniformly the same value, there may occur such a case in which a measurement error becomes larger due to the influence of the above variations of the height level of the background surface. However, in the above described method, the protruding height of the bump is determined by measuring, for each bump, the height level of its surrounding background surface and calculating the difference in the height level between the bump and the background surface, so the method is hard to be influenced by such variations of the height level of the background surface and can make higher the measurement accuracy.

The background height determining region setting means can be structured so as to set an inner boundary line which is disposed outside of each of the bump principal portion existing regions in a way as to surround each of the bump principal portion existing regions and an outer boundary line which is disposed outside of the inner boundary line in a way as to surround the inner boundary line, for thereby setting a region between the inner boundary line and the outer boundary line as the background height determining region. For example, in many cases, there is formed around the bump principal portion existing region resulting from the reflected beam reflected from the bump, a region (silhouette region) at which there is scarcely any reflected beam to be detected. Thus, it is set outside the bump principal portion existing region (for example, at a location a predetermined distance away from its outer peripheral line), an inner boundary line surrounding the region so that the above described silhouette region do not overlap the background height determining region, whereby it becomes possible to make higher the accuracy of calculation of the background height.

In the meantime, the background height determining region setting means can be structured so as to set, for example, a circular or quadrilateral outer boundary line outside the bump height determining region, concentrically with the bump height determining region, and determine the outer profile line of the bump height determining region as an inner boundary line, for thereby setting a region between the outer boundary line and the inner boundary line as the background height determining region.

Further, the background height calculating means can be constructed so as to calculate one of an average height which is obtained by averaging heights at respective positions within each of the background height determining high brightness regions, a maximum height which is a maximum of the heights at the respective positions, a minimum height which is a minimum of the heights at the respective positions, and a most frequent height which is the most numerous one of the heights at the respective positions, and determines calculated one of them as a height of corresponding part of the background surface.

The inspection information preparing means can be structured so as to include surface waviness information preparing means for preparing surface waviness information reflecting a waviness condition of the background surface on the basis of the heights, which are calculated by the background height calculating means, of the background surface at the background height determining regions which are set at different positions on the inspection surface. By this structure, the height of the background surface, which is obtained for calculation of the bump protruding height, is positively used further so that surface waviness information of the circuit board substrate can be obtained, thus enabling to attain a many-faceted inspection.

According to the seventh aspect of the present invention, there is provided an apparatus for inspecting a circuit board with a plurality of solder bumps disposed on a circuit board substrate two-dimensionally and having flat tops. The apparatus comprises:

a beam source for supplying an inspection beam onto an inspection surface of the circuit board, the inspection surface including a surface region where the solder bumps are disposed;

a beam receiving section for receiving a reflected beam resulting from the inspection beam and reflected from the inspection surface;

beam scanning means for scanning the beam within the inspection surface two-dimensionally;

height information preparing means for preparing information on height at respective positions within the inspection surface, on the basis of an inspection output at the beam receiving section;

reflected beam brightness information preparing means for preparing information on reflected beam brightness at respective positions on the inspection surface, on the basis of an inspection output at the beam receiving section;

bump top face region fixing means for fixing bump top face existing regions which are regions where top faces of the respective bumps exist and which are located on the inspection surface, on the basis of the information on brightness prepared by the reflected beam brightness information preparing means;

inspection information preparing means for preparing inspection information including at least information on height of the solder bumps corresponding to the bump principal portion existing regions, the inspection information preparing means including bump top face size information preparing means for preparing bump top face size information which is information on a size or an area of each of the bump top face existing regions, bump height information preparing means for preparing bump height information which is information on height of corresponding one of the solder bumps on the basis of the information on height at the respective positions within the inspection surface, and bump volume information preparing means for preparing bump volume information which is information on volume of corresponding one of the solder bumps, on the basis of the bump top face size information and the bump height information; and inspection information output means for outputting the inspection information prepared by the inspection information preparing means.

According to the eighth aspect of the present invention, there is provided a method of inspecting a circuit board with a plurality of solder bumps disposed on a circuit board substrate two-dimensionally and having flat tops. The method comprises the steps of:

supplying an inspection beam onto an inspection surface of the circuit board, the inspection surface including a surface region where the solder bumps are disposed, and scanning the inspection beam within the inspection surface two-dimensionally while receiving, at a beam receiving section, a reflected beam resulting from the inspection beam and reflected from the inspection surface;

preparing information on height at respective positions within the inspection surface, on the basis of an inspection output at the beam receiving section;

preparing information on reflected beam brightness at respective positions on the inspection surface, on the basis of an inspection output at the beam receiving section;

fixing bump top face existing regions which are regions where top faces of the respective bumps exist and which are located on the inspection surface, on the basis of the information on brightness prepared by the reflected beam brightness information preparing means; and preparing inspection information including at least bump volume information which is information on volume of the solder bumps, by using the size or area of the bump top face existing regions and the bump height information at the respective positions within the inspection surface.

In the inspection apparatus and method according to the seventh and eighth aspects, in case bumps having nearly flat top faces, i.e., flat bumps are formed on the circuit board substrate, the volume information of each bump is prepared by using information on the size or area of the bump top face existing region which is fixed on the basis of the reflected beam brightness information and the information on bump height prepared on the basis of the height information at the respective positions within the bump top face existing region. That is, since calculation of the volume is performed after the area or size of the bump top face existing region is grasped on the basis of the reflected beam brightness, the volume of the flat bump can be calculated without any problem. Further, the bump top face existing region formed on the basis of the reflected beam reflected from the bump top face is not extended in the incident direction of the laser beam, differing from the silhouette region appearing around the bump top face existing region, the accuracy of calculation of the volume can be high.

According to the ninth aspect of the present invention, there is provided a method of producing a circuit board with a plurality of solder bumps disposed on a circuit board substrate two-dimensionally and having flat tops. The method comprises the steps of:

forming the solder bumps on the circuit board substrate;

supplying an inspection beam onto an inspection surface of the circuit board, the inspection surface including a surface region where the solder bumps are disposed, and scanning the inspection beam within the inspection surface two-dimensionally while receiving, at a beam receiving section, a reflected beam resulting from the inspection beam and reflected from the inspection surface;

preparing information on height at respective positions on the inspection surface, on the basis of an inspection output at the beam receiving section;

preparing, on the basis of the inspection output at the beam receiving section, information on brightness of the reflected beam at respective positions on the inspection surface, and fixing, within the inspection surface, a plurality of bump top face existing regions where top faces of the respective bumps exist, on the basis of the prepared information on brightness;

measuring a volume of each of the bumps by using the size or area of corresponding one of the bump top face existing regions and bump height information which is information on height of corresponding one of the bumps and which is prepared on the basis of information on height at respective positions within corresponding one of the bump top face existing regions;

detecting and sorting out only a bump-attached circuit board, all of the solder bumps of which have volumes within a predetermined range. Thus, by making the most of the advantage of the inspection method according to the eighth aspect of the present invention, it becomes possible to carry out easily and readily sorting or selection of bump-attached circuit boards which are obtained by forming solder bumps on a circuit board substrate, on the basis of whether the volumes of the solder bumps are within a predetermined range or not, thus resultantly making it possible to produce a bump-attached circuit board which is guaranteed in quality with efficiency.

In the inspection apparatus according to the seventh aspect of the present invention, the bump top face size information preparing means can be structured to prepare, as the bump top face size information, information which reflects a diameter or an area of a circle which is of nearly the same area of the bump top face existing region of corresponding one of the bumps and to which the bump top face existing region of the corresponding one bump is approximated. In case a bump is in the form of a circular post or a truncated cone, the diameter or area of the bump top face can be calculated rapidly by approximating the shape of the bump top face to a circle.

The inspection apparatus according to the seventh aspect of the present invention can further comprise silhouette region fixing means for fixing silhouette regions on the basis of the reflected beam brightness information prepared by the reflected beam brightness information preparing means, each of the silhouette regions being formed along and outside of an outer peripheral end of the bump top face of corresponding one of the bumps and showing a lower brightness with respect to the reflected beam received by the reflected beam receiving section than either of each of the bump top faces and an exposed surface of the circuit board substrate around each of the bumps. Further, the inspection information preparing means can include a silhouette region size information preparing means for preparing silhouette region size information which is information on a size or an area of the silhouette region, and bump bottom face size information preparing means for preparing bump bottom face size information which is information on a size or an area of a bump bottom face of corresponding one of the bumps, on the basis of the silhouette region size information.

The bump volume information preparing means can be structured so as to produce the bump volume information on the basis of the bump top face size information, the bump bottom face size information and the bump height information. With the above structure, by using information on the size or area of both of the bump top face and bottom face, more accurate calculation of the bump volume can be attained. In the meantime, the size or area of the bump bottom face can be obtained directly from the size or area of he silhouette region if the silhouette region results from only irregular reflection of the inspection beam cast onto a bump side surface. Further, in case there exists additionally around the bump bottom face a groove or the like portion that is causative of irregular reflection, the size or area of the bump bottom face can be obtained by excluding a corresponding region from the silhouette region if the shape and size of that portion is known. In this instance, the silhouette region size information preparing means includes a silhouette region maximum size calculating means for calculating a maximum size of the silhouette region with respect to a plane perpendicular to an incident direction of the inspection beam cast onto the inspection surface, and prepares, as the silhouette region size information, information reflecting a diameter or an area of a circle to which the silhouette region is approximated in such a manner that a maximum size of the silhouette region is determined as the diameter of the circle. As described hereinbefore, the silhouette region is shaped as to elongate in the incident direction of the inspection beam but almost not in the direction intersecting the incident direction at right angles or with respect to a plane perpendicular to the incident direction, so the size of the silhouette region on that plane reflects the size of the bump bottom face relatively correctly. In case a bump is in the form of a circular post or a truncated cone, the diameter or area of the bump bottom face can be calculated by approximating the silhouette region to a circle of such a diameter that is equal to the maximum diameter of the silhouette region on the plane perpendicular to the incident direction. Further, the bump volume information preparing means can be structured so as to include bump volume calculating means for calculating a volume of each of the bumps by approximating a shape of each of the bumps to a truncated cone which has a circular top face of a diameter fixed by the bump top face size information, a circular bottom face of a diameter fixed by the bump bottom face size information, and a height fixed by the bump height information. In case both of the bump top face and the bump bottom face are circular and the bump top face is smaller than the bump bottom face, the volume of the bump can be calculated rapidly by such an approximation.

According to the tenth aspect of the present invention, there is provided an apparatus for inspecting a circuit board with a plurality of solder bumps disposed on a circuit board substrate two-dimensionally. The apparatus comprises a measurement system including:

a beam source for supplying an inspection beam onto an inspection surface of the circuit board, the inspection surface including a surface region where the solder bumps are disposed;

a beam receiving section for receiving a reflected beam resulting from the inspection beam and reflected from the inspection surface;

beam scanning means for scanning the beam within the inspection surface two-dimensionally; and height information preparing means for preparing height information which is information on height at respective positions within the inspection surface, on the basis of detection output of the beam receiving section;

the apparatus further comprising:

inspection information preparing means for preparing inspection information reflecting a formed condition of each of the bumps on the inspection surface; and inspection information output means for outputting the inspection information prepared by the inspection information preparing means;

wherein the inspection information output means includes height distribution display means for supplying a mapping output representing the height distribution on the inspection surface to a display device by dividing a range of height by one or more threshold values and associating divided range sections of height with respective depths and/or colors of each of pixels of the display device one to one for thereby associating depths and/or colors of pixels corresponding to the respective positions on the inspection surface with heights at the respective positions, which are indicated by the height information.

That is, a mapping output of the height at the respective positions within the inspection surface on the bump-attached circuit board, which is the inspection information, is supplied to the display device in such a manner that different height are indicated by different depths or colors, so the height distribution within the inspection surface is visualized and can be grasped very intuitively, whereby it becomes possible to obtain in formation on the position and height of each bump, the height level distribution of bump top faces, warping or waviness of the circuit board substrate, etc. with accuracy.

The inspection apparatus according to the tenth aspect can further comprise reflected beam brightness information preparing means for preparing information on brightness of the reflected beam at the respective positions on the inspection surface, on the basis of the detection output of the beam receiving section In this instance, the inspection information preparing means can be structured so as to prepare the inspection information reflecting a formed condition of each of the bumps on the inspection surface, on the basis of the reflected beam brightness information and the height information. By the combination with the brightness information, it becomes easier to grasp the defect resulting from a factor other than the height, such as an oxidized bump surface. Further, the bump existing region within the inspection surface can be grasped with accuracy. The inspection information can include at least one of height information of each bump, coplanarity information, waviness information of the circuit board substrate, positional information, arranging interval information, information on area of a bump existing region on the inspection surface, and volume information. The preparation of those information will be described in detail hereinlater.

The inspection apparatus according to the tenth aspect can further comprise bump quality judging means for judging good/no good of each of the bumps on the basis of whether the formed condition of each of the bumps, which reflects on the inspection information, satisfies a predetermined judgment condition or not, and defective bump position display control means for controlling so that the display device displays an existing position of a defective bump which are judged, on a mapping output display (hereinafter will be sometime referred to as "mapping display") of the height distribution, as being defective by the bump quality judging means. That is, in case a defective bump is detected in the middle of inspection, it is displayed on the mapping output display of the height distribution so that it becomes possible to grasp rapidly and accurately where it is located within the inspection surface and what kind of defect is caused.

In this connection, the apparatus according to the tenth aspect can further comprise defective bump existing region selecting means for selecting, on the mapping output display of the height distribution, the existing region of the defective bump whose position is indicated, and defective bump existing region enlarged display means for displaying an enlarged mapping image of a height distribution of the selected defective bump existing region. Thus, by enlarging the condition of the defective bump on the mapping display, it becomes possible to grasp the detail of the defect by visual enlargement, and therefore analysis of the cause of the defect or the like can be attained with ease.

The defective bump position display control means can be structured so as to display, on the mapping output display of the height distribution, a region of a predetermined area including the defective bump existing region for use as an enlargement designating region. In this instance, the defective bump existing region selecting means can be structured so as to select the defective bump existing region by using the enlargement designating region as a unit for selection of the defective bump existing region, and the defective bump existing region enlarged display means can be structured so as to display while enlarging a mapping image within the selected enlargement designating region. By this, the enlarged display process is carried out by taking the enlargement designating region displayed on the mapping output display as a unit, so it is easy to associate the display region in a low magnification state and the display region in a high magnification state with each other, and therefore it is easy to grasp where the existing enlarged display is located within the entire inspection surface.

In this connection, the defective bump existing region selecting means can be structured so as to select the enlargement designating region by moving, on the mapping output display, a pointer which is displayed on the mapping output display by an operation of a pointing device and placing a position indicated by the pointer within the enlargement designating region while executing, under such a condition, a region selection command. By this, it becomes possible to carry out a selection operation on the mapping output display of the defective bump existing region quite intuitively.

The defective bump position display control means can be structured so as to set the enlargement designating region in such a manner that the enlargement designating region includes a plurality of bump existing regions. In this instance, the apparatus can further comprise individual bump selection region setting means for setting a region of a predetermined area including only optional one of the individual bump existing regions within the enlargement designating region, as an individual bump selection region, and individual bump mapping image enlarged display means for displaying while further enlarging a mapping image within the set individual bump selection region. By this, the condition of the defective bump can be confirmed on the mapping output display, together with the conditions of the bumps located adjacently therearound. Further, a mapping image of optional one of bumps including a defective bump can be displayed individually and in an enlarged scale, so it becomes possible to obtain more precise information on the condition of each bump.

The apparatus according to the tenth aspect can further comprise the inspection information content display means for displaying a content of the inspection information of one of the bumps corresponding to the bump existing region selected by the individual bump selection region. By this, the inspection information of each bump on the mapping image is visualized by numerical values or the like, so it is easy to measure and grasp the formed condition of each bump. Further, the apparatus can comprise pixel selecting means for selecting optional one of pixels constituting the mapping image within the individual bump selection region, and detection information-by-position display means for displaying a content concerning at least one of the height information and the reflected beam information and corresponding to a position on the inspection surface, which is indicated by the selected pixel. By this, it becomes possible to measure the height or the reflected beam brightness at the respective positions within the bump existing region.

Further, the apparatus can comprise a work holder for detachably holding thereon a plurality works which are arranged on a plane, each of the works being a bump-attached circuit board which is an object for inspection, and work holder drive means for driving said work holder to move relative to the beam source for thereby moving the arranged works sequentially into an inspection position to which the inspection beam is cast. In this instance, the measurement system can be structured so as to perform detection of height at respective positions within an inspection surface of each of the works which are moved into the inspection position, and the inspection information preparing means prepares inspection information of each of the works on the basis of corresponding one of the height information. By this structure, it becomes possible to inspect a plurality of works attached to the work holder one after another efficiently.

In this instance, the apparatus can further comprise work arrangement display means for displaying arrangement of the works on the work holder, work quality judging means for judging good/no good of each of the works on the basis of the inspection information, and defective work display control means for controlling the work arrangement display means and making it display, in relation to the arrangement of the works, a position of a defective work which is judged as having a defective bump or bumps by means of the work quality judging means. That is, as the progress of inspection, it is display visually which one of the work on the work holder is defective, so in case a number of works are inspected consecutively, grasp of defect is quite easy.

More specifically, the work arrangement display means can include individual work display sections which correspond one-to-one to the respective works on the work holder. In this instance, the defective work display control means can be structured so as to cause the work arrangement display means to display the position of the defective work by making those of the individual work display sections corresponding to a defective work and a normal work different in a display condition from each other. By this, it becomes easier to recognize the position of a defective work in the arrangement of the work.

Further, the apparatus can comprise measurement system operation control means for suspending measurement operation of the work holder drive means and the measurement system in case a work is judged as being defective by the work quality judging means in the middle of detection of the height at the respective positions within the inspection surface, which is carried out sequentially for the works. That is, when a defective work is found during an inspection process, it is desired, in many cases, to confirm the condition or the like of the defective work on the spot for thereby fixing a factor that has caused the defect or for the like purpose. In this instance, by the above structure the inspection process is automatically stopped temporarily, so it is easy to obtain the time for recognition of the above matter or the like.

In case a work holder is subjected to an inspection process as a unit, it is desirable, when a defective work is found, to remove the defective work from the work holder as quickly and certainly as possible for the purpose of preventing a defective article from being included in a lot of articles (or for some reason, there can be such a case in which a normal (good) work is removed from the work holder). Thus, the apparatus according to the tenth aspect can comprise work quality judgment result display means for displaying a result of judgment on whether each of the works on the work holder is a defective work or normal work, work detecting means for detecting individually whether the works are attached to respective work attaching positions on the work holder, sorting result judging means for judging whether a work sorting operation is carried out correctly or not, on the basis of a detection content of the work detection means with respect to the work holder which is subjected to a work sorting operation for removing a defective work and leaving a normal work, while looking at a display content of the work quality judgment result display means, and judgment result output means for outputting a result of judgment by the sorting result judging means. By this, it becomes possible to manually sort or select defective works and good works while looking at the display of the work good/no good judgment result. Then, it is automatically judged by the sorting result judging means whether the sorting condition is good or not. When there occurs a sorting miss, a suitable judgment result output is produced for the process onward, so it becomes possible to prevent a defective article from being erroneously included in the lot of articles, effectively.

In this instance, by providing the inspection apparatus with warning output means for outputting a warning by means of a sound, line or a combination thereof, in response to an output of a judgment result from the judgment result output means when a work sorting operation is not carried out correctly, an oversight of a sorting miss is hard to occur and an effect of preventing erroneous inclusion of defective article can be further heightened.

Specifically, the work detecting means can be structured so as to detect whether the works are attached to the work attaching positions, with respect to the work holder in a state of being removed from said measurement system. By this, it becomes possible to remove the work holder having finished inspection and measurement, to the outside of the measurement system and carry out sorting of a defective work or works, so during the time or such sorting it becomes possible to carry out inspection of a new work, thus making it possible to maker higher the inspection efficiency. In this instance, the apparatus can further comprise measurement system operation control means for controlling the work holder drive means and the measurement system in a way as to inhibit them from performing a measurement operation for a next work holder, in response to an output of a judgment result from the judgment result output means in case the work sorting operation is not carried out correctly. That is, if inspection of the following works is carried out continuously without solving the sorting miss, it becomes high the possibility that a defective work or works are included in the lot of articles. Thus, by constructing, as in the above structure, so that the operation of the work holder drive means and the measurement system for the following work holder (works) is inhibited until the sorting miss condition is cancelled or eliminated, such a drawback can be overcome quite rationally.

The work holder can be formed with a plurality of work attaching portions in which the works are installed respectively, and each work attaching portion can be formed with a light transmitting portion (such as a through hole). In case the work attaching portion is formed into a depression, the above described light transmitting portion can be formed at the bottom of the depression. In this instance, the work detecting means can include a sorting light source for illuminating the work holder from a lower side thereof and leaking light detecting means disposed on a side of the work holder opposite to the sorting light source for detecting a leaking light from the light transmitting portion at each of the depressions, so that the work detecting means can detect whether the works are installed in or attached to the respective work attaching portions (depressions) on the basis of existence of the leaking light. That is, with the above structure, depending upon whether the light transmitting portion is covered or closed by the work, it becomes possible to detect whether a work exists within the work attaching portion assuredly.

On the other hand, the work detecting means can comprise a light casting section for casting a light toward each work attaching portion on the work holder, and a reflected light detecting section for detecting a reflected light reflected from the work which is attached to the work attaching portion, so that the work detecting means can detect whether a work is attached to each work attached portion on the basis of existence of the reflected light. That is, with this structure, it becomes possible to detect whether a work exists within the work attaching portion on the basis of existence of a reflected light with ease and accuracy.

It is accordingly an object of the present invention to provide a novel and improved inspection apparatus which can discriminate or recognize a plurality of solder bumps formed on a circuit board accurately and can carry out inspection of a circuit board with any kind of solder bumps accurately and rapidly even in the case of a flat bump which is flat at the top by grasping its high brightness region two-dimensionally and manipulating it.

It is another object of the present invention to provided a novel and improved inspection apparatus of the foregoing character which can inspect a formed condition of each bump in case a circuit board substrate is made of a high polymer material or the like resinous material, accurately and rapidly.

It is a further object of the present invention to provide a novel and improved apparatus of the foregoing character which can inspect a volume of each bump accurately and rapidly.

It is a further object of the present invention to provide an inspection apparatus of the foregoing character which enables an operator or worker to grasp height information of each bump quite intuitively and obtain precise information on a distribution of height levels of tops of the bumps, warp or waviness of the surface of the circuit board, etc. assuredly.

It is a further object of the present invention to provide an inspection method of inspecting a bump-attached circuit board, which is of the foregoing character which can inspect a volume of each bump accurately and rapidly.

It is a further object of the present invention to provide a method of producing a bump-attached circuit board by using the foregoing inspection apparatus and inspection method of the foregoing character.

BRIEF DESCRIPTION OF THE DRAWINGS

FIG. 3A is a schematic, side elevational view of a specific structural example for the measurement system of FIG. 2;

FIG. 3B is a schematic, rear elevational view of the specific structural example of FIG. 3A;

FIG. 11 is an illustration of movement of a position on a scanning surface onto which a laser beam is to be cast or thrown and its measurement error, respectively;

FIGS. 13A to 13C are illustrations of bump existing regions in a state of being represented by the use of bit map data;

FIG. 22 is an illustration of a method of calculating a waviness value;

FIG. 34 is an illustration of an influence of a height level of a circuit board surface on measurement of a bump height;

FIG. 36 is an illustration of a concept for calculating a volume of a bump by approximating a shape of a bump to a truncated cone;

FIG. 45 is a sectional view for illustration of an internal structure of a beam source box and its operation;

FIG. 46 is a block diagram of an electrical structure of the sorting unit of FIG. 44;

DETAILED DESCRIPTION OF THE PREFERRED EMBODIMENTS

Figure 1:
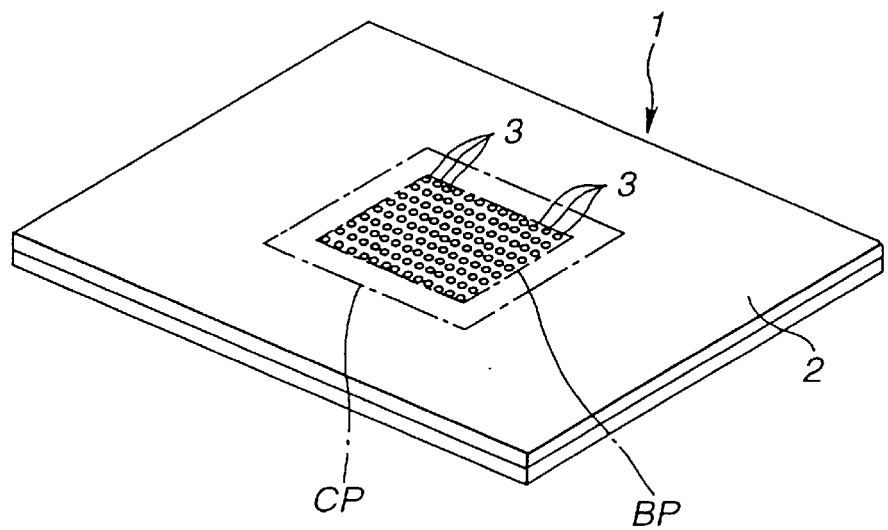
FIG. 1 is a perspective view of a bump-attached circuit board which is an object to be inspected by an inspection apparatus of the present invention.

FIG. 1 shows by way of example a bump-attached circuit board 1 which is an object to be inspected by an inspection apparatus of the present invention. The bump-attached circuit board 1 is constructed as a flip chip circuit board and includes a substrate 2 which is, for example, made of a resinous material, and is about 25 mm square and about 1 mm thick. The substrate 2 has at a central portion thereof a bump arranged region BP which is for example square. At the bump arranged region BP, there are provided a number of solder bumps 3 made of a brazing alloy such as Sn—Pb binary alloy. The solder bumps 3 are arranged in a two-dimensional array such as a grid pattern or checkered pattern and fixedly attached to the substrate 2. An inspection surface is set so as to include or encompass the bump arranged region BP.

Figure 6:
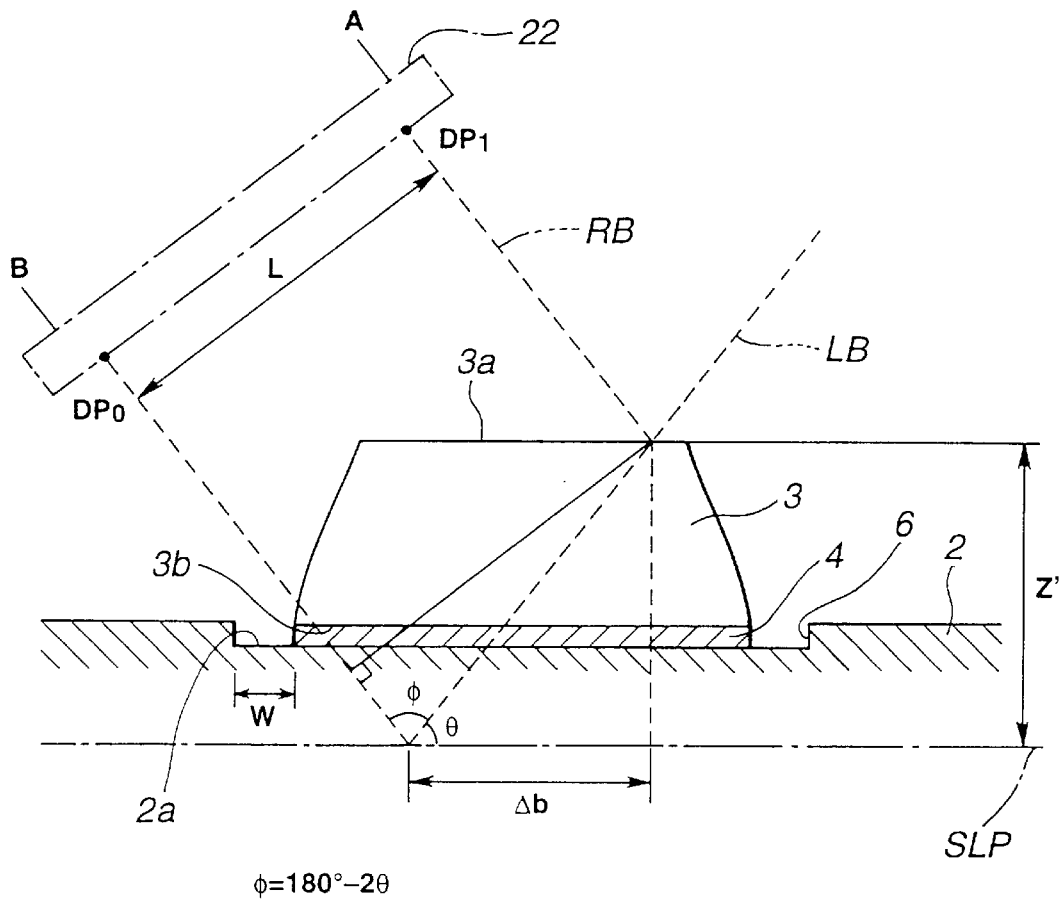
FIG. 6 is an illustration of a principle of the method of detecting a height by the use of a laser beam.

In this embodiment, each solder bump 3 is formed into a flat bump which is flat at the top as shown in FIG. 6. The circuit board substrate 2 has at an upper surface thereof depressions 2a corresponding in position to the respective solder bumps 3. At the bottom of each depression 2a is formed an underlying conductive pad 4 (hereinlater referred to simply as pad) which consists of, for example, a non-electrolytic Ni—P-plated layer and a non-electrolytic Au-plated layer covering the Ni—P-plated layer. Each solder bump 3 is fixedly attached onto each pad 4. Further, between the inner circumferential surface of the depression 2a and each bump 3 is formed an annular groove 6. In the meantime, at the other upper surface portion of the circuit board substrate 2 there is formed a solder resist layer (not shown) which is made of acrylic resin, epoxy resin or the like.

In this connection, the surface of the bump 3 has a metallic luster, whereas the surface of the circuit board substrate 2 which is made of a high polymer material or resinous material such as plastics, so the former is higher in the reflectivity against visible light (i.e., laser beam serving as inspection beam which will be described hereinlater) than the latter.

Such a bump-attached circuit board can be produced by various known techniques. An example of such known techniques is a solder paste printing technique of forming solder bumps on a circuit board substrate 2 by printing masses of solder paste onto a predetermined portion of the circuit board substrate 2 by way of a screen mask or metal mask and melting the printed masses of solder past by heating.

Figure 2:
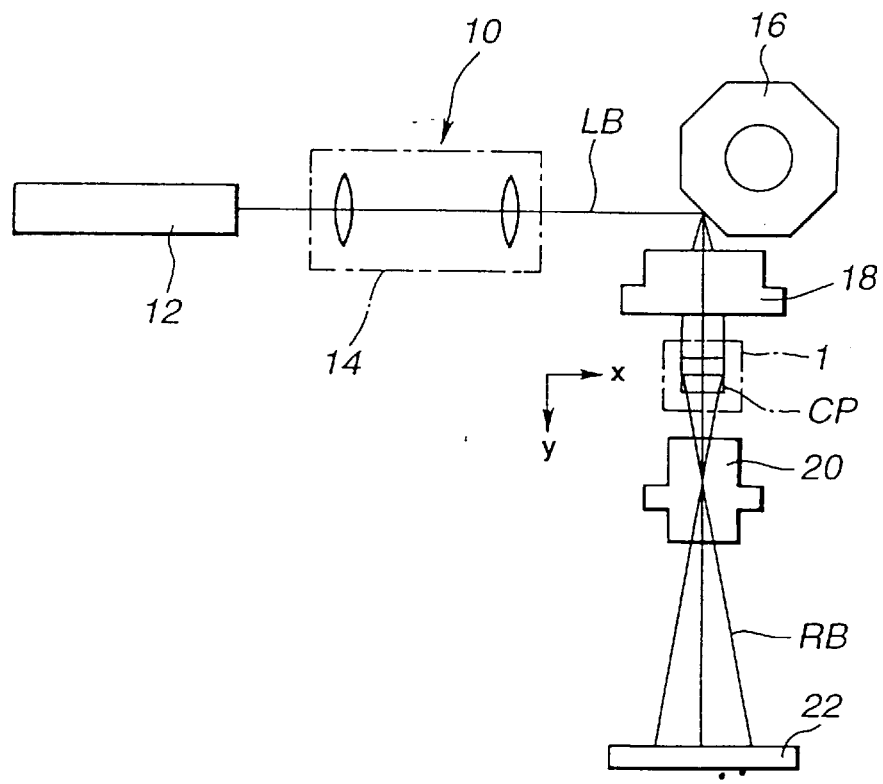
FIG. 2 is a schematic view of an important portion of a measurement system of an inspection apparatus according to the first embodiment of the present invention.

FIG. 2 schematically shows an important portion of a measurement system 10 of an inspection apparatus according to an embodiment of the present invention. The measurement system 10 consists of a semiconductor laser beam source 12, a beam expander 14, a polygon mirror 16, an f·θ lens 18, an image formation lens 20, and a semiconductor position sensing device (PSD) 22 at a beam receiving section. A laser beam (incident beam) LB transmitted from the laser beam source 12 is reflected by the rotating polygon mirror 16 and irradiated or cast onto the inspection surface CP of the bump-attached circuit board 1 while being caused to swing along either of a lengthwise array or breadthwise array of solder bumps (hereinafter referred to as x-direction). The incident laser beam LB thus cast is reflected by the inspection surface CP and transmitted therefrom as a reflected beam RB to be received by the PSD 22 by way of the image formation lens 20.

FIGS. 3A and 3B show a specific structural example of the measurement system 10, in which FIG. 3A is a side elevation and FIG. 3B is a rear elevation. In this structure, as shown in FIG. 3B, the semiconductor laser beam source 12 is disposed within a vertically elongated case 36 in a way as to be positioned at an upper portion thereof. As shown in FIG. 3A, the semiconductor laser beam source 12 emits from a beam hole formed in the lower end face thereof a laser beam LB forward and downward thereof. The laser beam LB is transmitted through a collimator lens 24 and reflected by an optical path changing mirror 26 backward and downward. The laser beam LB is then transmitted through a beam expander 14 disposed on an optical path and reflected by a second optical path changing mirror 28 sideways and upward as shown in FIG. 3B.

The laser beam LB reflected by the second optical path changing mirror 28 is incident onto the polygon mirror 16 disposed a little upper sideways of the second optical path changing mirror 28. As shown in FIG. 3A, the polygon mirror 16 is disposed within the casing 36 and has an axis RA of rotation which is attached to an inclined wall 36a at the lower back of the polygon mirror 16 in a way as to incline upward as it extends forward. The laser beam LB reflected by the polygon mirror 16 is transmitted through the f·θ lens 18 disposed diagonally under the polygon mirror 16 and an opening 6a formed in the bottom wall of the casing 36 and incident onto the inspection surface CP of the bump-attached circuit board 1 (hereinafter referred to as work) which is disposed under the opening 6a and held horizontally by a work holder or circuit board holder 38.

The laser beam LB is reflected forward and upward from the inspection surface CP and transmitted as a reflected beam RB. The reflected beam RB is then reflected backward and upward by a third optical path changing mirror 30 which is disposed in front of the f·θ lens 18 and nearly vertically. The reflected beam RB is transmitted through the image formation lens 20 which is disposed diagonally above and in front of the f·θ lens 18, then reflected forward by a fourth optical path changing mirror 32 which is disposed diagonally above the polygon mirror 16, and finally received by the PSD (semiconductor position detector) 22 which is disposed at the front and inside of the casing 36.

In this instance, a first optical system group including the semiconductor laser beam source 12, the collimator lens 24 and the beam expander 14 (in this embodiment, the semiconductor laser beam source 12, the collimator lens 24, the first optical path changing mirror 26, the beam expander 14, and the second optical path changing mirror 28 which are arranged in sequence from the upper side) are disposed within the casing in a way as to be placed next to one side in the widthwise direction. On the other hand, a second optical system group including the polygon mirror 16, the f·θ lens 18, the image formation lens 20 and the semiconductor position detector 22 (in this embodiment, the polygon mirror 16, the f·θ lens 18, the third optical path changing mirror 30, the image formation lens 20, the fourth optical path changing mirror 32 and the semiconductor position detector 22) is disposed side by side, in the widthwise direction of the casing 36, with the first optical system group. The laser beam LB from the first optical system group is introduced by the optical path changing mirror 28 to the second optical system group side. By employing such a layout, it becomes possible to reduce the dead space otherwise caused within the casing 36 effectively and make the entire apparatus quite compact.

Figure 4:
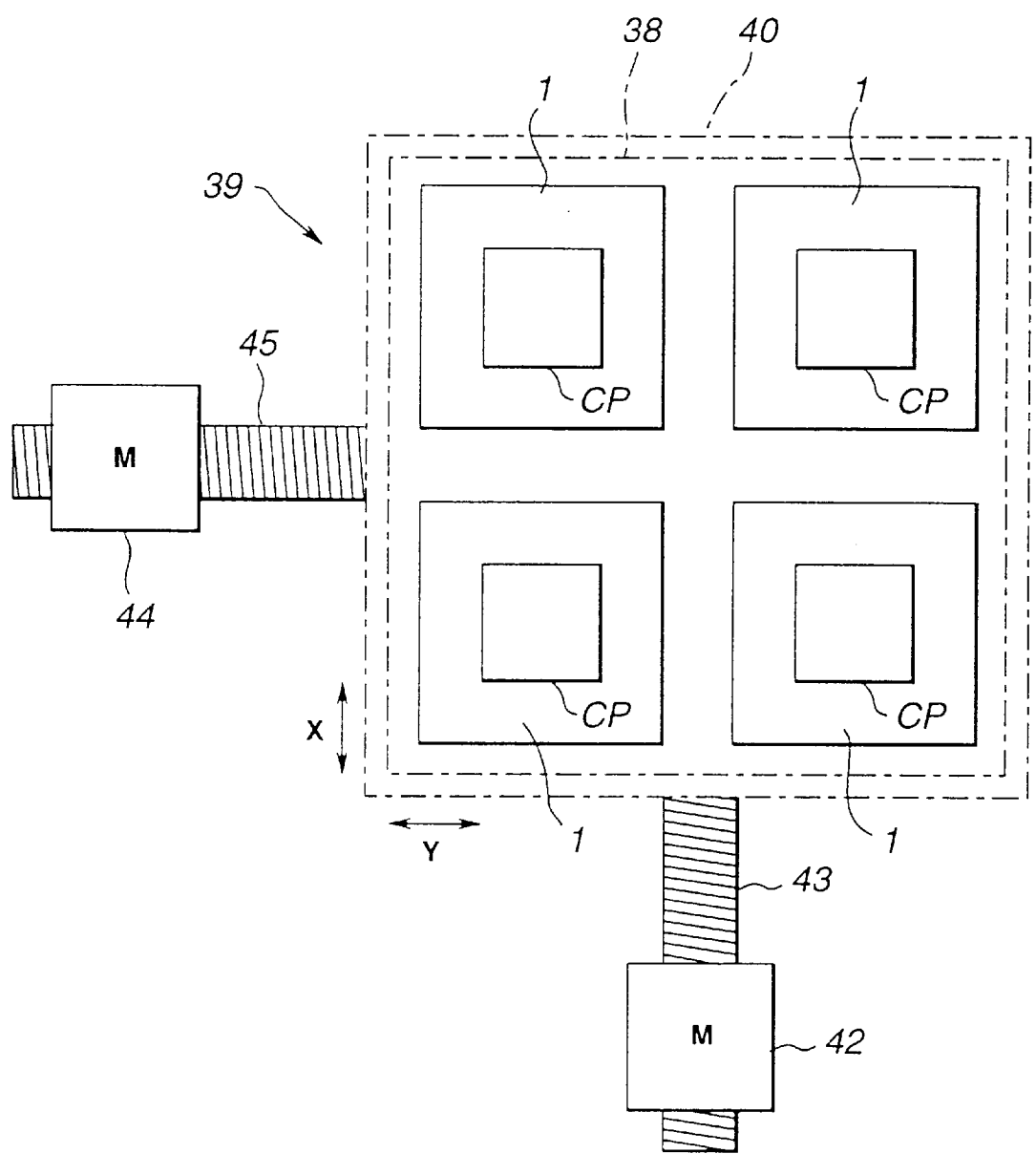
FIG. 4 is a schematic plan view of an x-y table of the inspection apparatus of FIG. 2.

Then, the work 1 which is an object to be inspected, is mounted on a work mounting or attaching portion 38a in the form of a depression or the like formed in the work or circuit board holder 38. In this embodiment, a plurality of works 1 are mounted on one work holder 38 in such a manner as to form a matrix pattern or grid pattern. As shown in FIG. 4, the work holder 38 is detachably mounted on an x-y table 40 which is driven to move in the x-direction and y-direction independently by means of, for example, an x-drive screw shaft 43 and x-drive motor 42(hereinafter referred to as an x-drive system), and a y-drive screw shaft 45 and a y-drive motor 44 (hereinafter referred to as a y-drive system). In this instance, the y-direction is determined so as to cross at right angles the x-direction in the plane along the inspection surface CP of the work 1, i.e., in FIG. 2, the direction in which scanning with the laser beam LB is made by the polygon mirror 16 to which the laser beam LB is transmitted by way of the f·θ lens 18. In FIG. 4, by inching the table 40 with a predetermined interval in the y-direction while conducting scanning with the laser beam LB in the x-direction by means of the polygon mirror 16, the inspection surface CP is scanned with the laser beam LB two-dimensionally. Accordingly, in this embodiment, the polygon mirror 16 and the y-drive system of the x-y table 40 constitute a beam scanning means. On the other hand, the x-drive system is used, in case for example a plurality of works 1 are arranged on the work holder 38 so as to form a plurality of rows which extend in the x-direction and are located adjacent to each other, for moving the works 1 in the next row to the position to which the laser beam is cast or irradiated.

Figure 5:
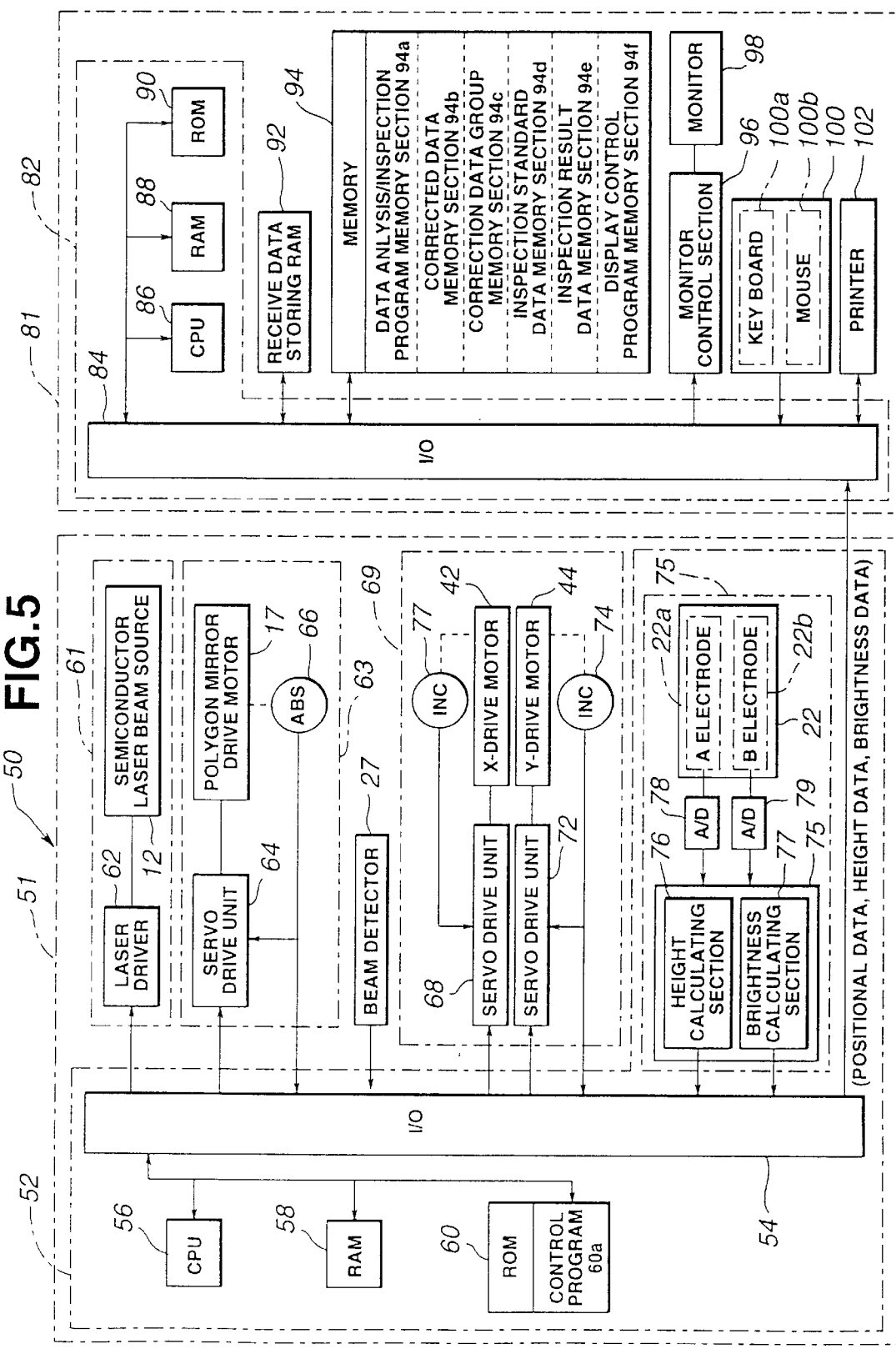
FIG. 5 is a block diagram of a control system of the inspection apparatus of FIG. 2.

FIG. 5 shows a structural example of a control system of the inspection apparatus of the present invention. A control system 50 can be divided into two large groups, i.e., a measurement system control section 51 and a data analyzing section 81. A central control unit 52 of the measurement system control section 51 mainly consists of an I/P (input/output) port 54, and those connected to the I/O port 54, i.e., a CPU (central processing unit) 56, RAM 58, ROM 60 and a height-brightness detecting section 75. Further, there are connected to the I/O port 54, other than those described above, a laser producing section 61, a polygon mirror operating section 63, and an x-y table operating section 69, respectively. In the meantime, the CPU 56 constitutes major or principal portions of a height information preparing means and a reflected beam brightness information preparing means, together with a height calculating section 76 and a brightness calculating section 77.

The laser producing section 61 consists of the semiconductor laser beam source 12 and a laser driver 62 which is responsive to an instruction from the central control unit 52 to drive the semiconductor laser beam source 12 to produce a laser beam LB. Further, the polygon mirror operating section 63 consists of a polygon mirror drive motor 17 for driving the polygon mirror 16 (refer to FIG. 3) to rotate, a servo drive unit 64 responsive to an instruction from the central control unit 52 for controlling the operation of the polygon mirror drive motor 17, and a rotary encoder (used in this embodiment is an absolute type and hereinafter abbreviated as ABS) 66 for detecting a rotation speed and an angular position of the polygon mirror drive motor 17, i.e., the polygon mirror 16. The servo drive unit 64 controls the operation of the polygon mirror drive motor 17 on the basis of a rotation speed information fed back thereto from the ABS 66. On the other hand, such an angular position detected by the ABS 66 is used as an x-coordinate determining information for determining an x-coordinate of a point to be scanned with a laser beam LB and a mirror face determining information for determining a mirror surface of the polygon mirror 16 which is in use.

The x-y table operating section 69 consists of the x-drive motor 42, y-drive motor 44, servo drive units 68 and 72 responsive to a instruction from the central control unit 52 for controlling the operations of those drive motors 42 and 44, and rotary encoders (used in this embodiment is an increment type and hereinafter abbreviated as INC) 70 and 74 for detecting the angular positions of the respective motors 42 and 44. The servo drive units 68 and 72 control the respective operations of the x-drive motor 42 and the y-drive motor 44 on the basis of a rotation speed information fed back thereto from the INCs 70 and 74. Further, the angular position of the y-drive motor 44, which is detected by the INC 74, is also used as a y-coordinate determining information for determining the y-coordinate of the point to be scanned with the laser beam LB.

The height-brightness detecting section 75 consists of the above described PSD 22, A/D converters 78 and 79 for converting outputs from respective electrodes of the PSD 22, a height calculating section 76 and a brightness calculating section 77 for calculating a height and brightness by using the outputs of the PSD 22 which are digitally converted by the A/D converters 78 and 79, and so on. Hereinlater, a principle of detecting a height by using a laser beam will be described.

As shown in FIG. 6, a height reference surface (i.e., a basic surface for measurement of height) SLP substantially parallel to the surface of the circuit board substrate 2 is set so that the laser beam LB is incident upon the height reference surface SLP at an incident angle θ. In this connection, if reflection takes place upon the height reference surface SLP, the PSD 22 will receive the reflected beam at a reference beam receiving position DP0. However, in case the reflection surface position becomes higher by z' due to the presence or existence of the bump 3 or the like, the beam receiving position is shifted or deviated to DP1. The amount L of shift or deviation of the beam receiving position DP1 from the reference beam receiving position DP0, i.e., the height z' of the reflection surface can be measured on the basis of the output currents IA and IB of two output terminals A and B of the PSD (position-detecting semiconductor device) 22. In the meantime, the height z' on the basis of the height reference surface SLP will hereinlater be referred to as "height level value (or height level) z'".

In this connection, assuming that $I_{A0}$ represents the output current of the output terminal A when the reflected beam is received at the reference beam receiving position $D_{P0}$ and similarly $I_{B0}$ represents the output current of the output terminal B, and if adjustment of the beam receiving position of the PSD is made so that $I_{A0}=I_{B0}$, the above described amount L of deviation becomes larger proportionately with $(I_A-I_B)/(I_A+I_B)$. As shown in FIG. 5, the height calculating section 76 calculates a value equivalent to $(I_A-I_B)/(I_A+I_B)$ on the basis of the information of $I_A$ and $I_B$ and outputs a height level signal representative of the calculated value. On the other hand, since the sum $I_A+I_B$ of the output currents of the both terminals of the PSD 22 becomes larger proportionately with the intensity (brightness) of the beam to be received, the brightness calculating section 77 calculates a value equivalent to $(I_A+I_B)$ similarly and outputs a brightness signal representative of the calculated value.

The above described $I_A$ and $I_B$ are amplified by voltage conversion, and an electric signal corresponding to $(I_A-I_B)/(I_A+I_B)$ is created by a calculation circuit and is produced as a height level signal. On the other hand, the sum $(I_A+I_B)$ of the output current at the both terminals of the PSD 22 becomes larger nearly in proportion to the intensity (brightness) of the light to be received, so the brightness calculating section 77 creates at a predetermined calculation circuit a signal corresponding to $(I_A+I_B)$ and transmits it as a brightness signal.

The CPU 56 of the central control unit 52 controls the operation of the laser producing section 61, the polygon mirror operating section 63 and the x-y table operating section 69 on the basis of a program 60a stored in a ROM 60 and by using a RAM 58 as a work area. On the other hand, the CPU 56 fetches from the ABS 66 an output value $X_{ABS}$ that gives an x-coordinate of a laser beam scanning position or point and from the INC 74 a pulse count value $Y_{INC}$ that similarly gives a y-coordinate in accordance with a timing given by a clock pulse (produced by a clock circuit which is not shown) and produces a positional data ($X_{ABS}$, $Y_{INC}$). At the same time, the CPU 56 fetches from the height-brightness detecting section 75 a digitized height level signal and brightness signal in sequence and produces a height level data z" and a brightness data I corresponding to the scanning point. A set of height level data z", brightness data I and positional data ($X_{ABS}$, $Y_{INC}$) obtained for each scanning point is transmitted from the I/O port 54 to the data analyzing section 81.

In the meantime, as shown in FIGS. 3A, a prism 25 and a beam detector 27 are provided in the place corresponding to the starting point at which scanning of the inspection surface CP in the x-direction starts and to the intermediate point of the optical path of the laser beam LB from the polygon mirror 16. The prism 25 and the beam detector 27 are provided for detecting a start timing at which data sampling-in-the x-direction of height data and brightness data on the basis of the laser beam LB starts. That is, when the laser beam LB comes to a data sampling start position on the work 1 in response to rotation of the polygon mirror 16, it is incident on the prism 25 and its branch beam is detected by the beam detector 27. In response to this, the measurement system control section 51 starts the data sampling in the x-direction.

Returning to FIG. 5, the data analyzing section 81 is mainly comprised of an I/O port 84 and an analysis computer 82 having a CPU 86, RAM 88, ROM 90, etc. which are connected to the I/O port 84. To the I/O port 84 of the computer 82 are connected a receive data storing RAM 92 for temporary storing of a set of a height level data z", brightness data I and positional data ($X_{ABS}$, $Y_{INC}$) transmitted from the measurement system control section 51, a memory 94 made up of a hard disk or the like, a monitor control section 96, a monitor 98 connected to the monitor control section 96, an input section 100 such as a key board and mouse, a printer 102, and so on. In the meantime, the monitor 98, printer 102, etc. function as an inspection result output means. Further, the CPU 86 functions as, on the basis of a data analysis/inspection program which will be described hereinlater, a bump existing region fixing means (or high brightness region fixing means), a bump principal portion existing region recognizing means, a bump principal portion existing region recognizing means, an inspection information preparing means, a height determining region setting means, a bump height calculating means, a height determining high brightness region extracting means, a background height determining region setting means, a background height calculating means, a position tolerance defining window setting means, an area calculating means, a judgment means, a bump center determining means, a bump arranging interval calculating means, a bump size calculating means, a coplanarity information preparing means, a surface waviness information preparing means, a bump volume information preparing means, a silhouette region fixing means, and a bump bottom face size information preparing means.

Further, the memory 94 is provided with a data analysis/inspection program storing section 94$a$, a corrected data storing section 94$b$, a correction data group storing section 94$c$, an inspection standard data storing section 94$d$, an inspection result data storing section 94$e$ which store corresponding programs or data, and a display control program memory section 94$f$, respectively. In the meantime, the contents of the respective data and the details of the program processing will be described hereinlater.

Referring to the flowchart of FIG. 23, the flow of control process at the measurement system control section 51 will hereinafter be described. Firstly, at D10, the work holder 38 having mounted thereon the work 1 is set on the x-y table 40 (refer to FIG. 4). At D20, the x-y table 40 is moved to the scanning start position for the first work. In the meantime, at the time of rising the measurement system, the starting point of the x-y table 40 is recognized by means of a starting point sensor (not shown) and hereinafter used as a criterion for various positioning processes. Then, at D40, the laser beam LB is cast upon the inspection surface CP, while at the same time it is made to start y-drive of the x-y table 40 and rotation of the polygon mirror 16. At D50, a set of the above described height level data z", brightness data I and positional data ($X_{ABS}$, $Y_{INC}$) for each scanning point is created and transmitted to the data analyzing section 81.

In the meantime, for simplification of the analyzing process to be carried out later, the number of data to be fetched can be reduced by making the data sampling distance in the y-direction larger than that in the x-direction (or converse will do). In this instance, for making larger, for example, the data sampling distance in the y-direction, the scanning speed in the y-direction can be made larger than that in the x-direction while holding the time intervals of data sampling in the x-direction and y-direction nearly equal to each other or reversely the time interval of data sampling in the y-direction can be made longer than that in the x-direction while holding the scanning speeds in the y-direction and in the x-direction nearly equal to each other. As a further method, it will do to fetch data under the condition where data sampling distances in the x-direction and y-direction are nearly equal to each other and thin the data sets fetched in either of the x-direction or y-direction at the time of analysis so that the number of used data sets is reduced.

Then, when fetch/transmission of data for the work 1 is completed, the x-y table 40 is moved to the scanning start position of the next work (D60→D61), and the control is returned back to the step D40 to repeat thenceforth the same process steps. In this manner, the above described sets of data with respect to the row of works arranged in the y-direction are fetched in sequence. When the fetch/transmission of data for all the works arranged in that row is finished, x-drive of the x-y table 40 is carried out so that the x-y table 40 is moved to the scanning start position for the first work of the next row, and the similar process steps are repeated (D62→D63→D40). When preparation/transmission of data for all the works is completed, the process is ended.

Figure 12A:
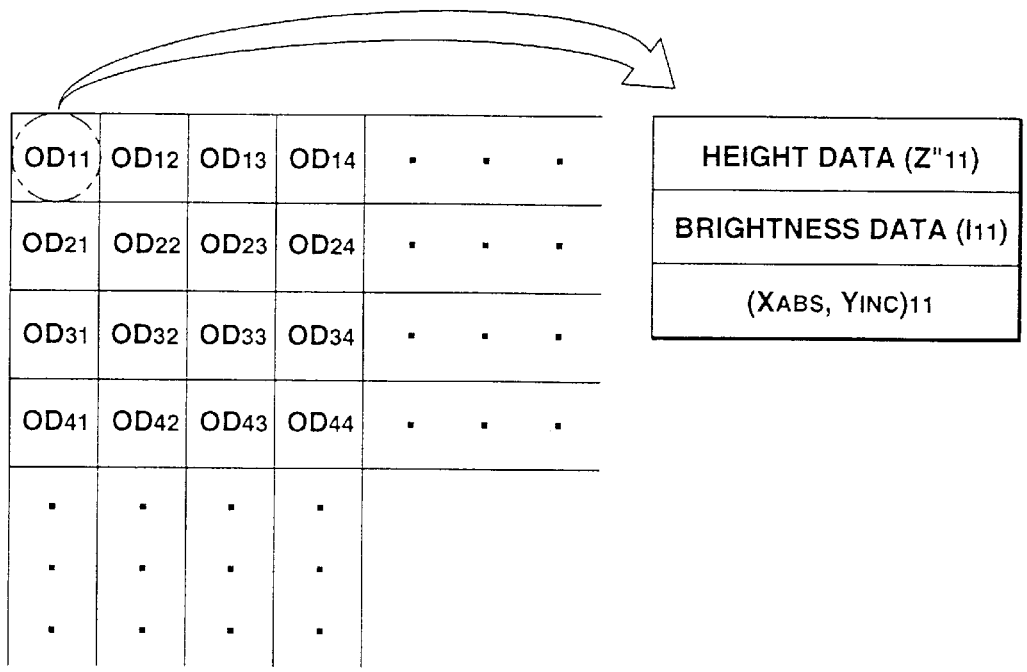
FIGS. 12A and 12B are illustrations of a content of a receive data storing RAM and a content of a corrected data memory section of the control system of FIG. 5, respectively.

On the data analyzing section 81 side, the data from the measurement system control section 51 is received and stored in the receive data storing RAM 92 (refer to FIG. 5) in such a manner that each set OD of data z", I and ($X_{ABS}$, $Y_{INC}$) correspond to each scanning point, as shown in FIG. 12A. Hereinlater, the flow of processing on the data analyzing section 81 side will be described with reference to the flowcharts of FIGS. 24 to 33. In the meantime, it is the CPU 86 of the computer 82 (refer to FIG. 5) that executes the process on the basis of the data analysis/inspection program stored in the memory 94 and by using the RAM 88 as a work area.

Figure 24:
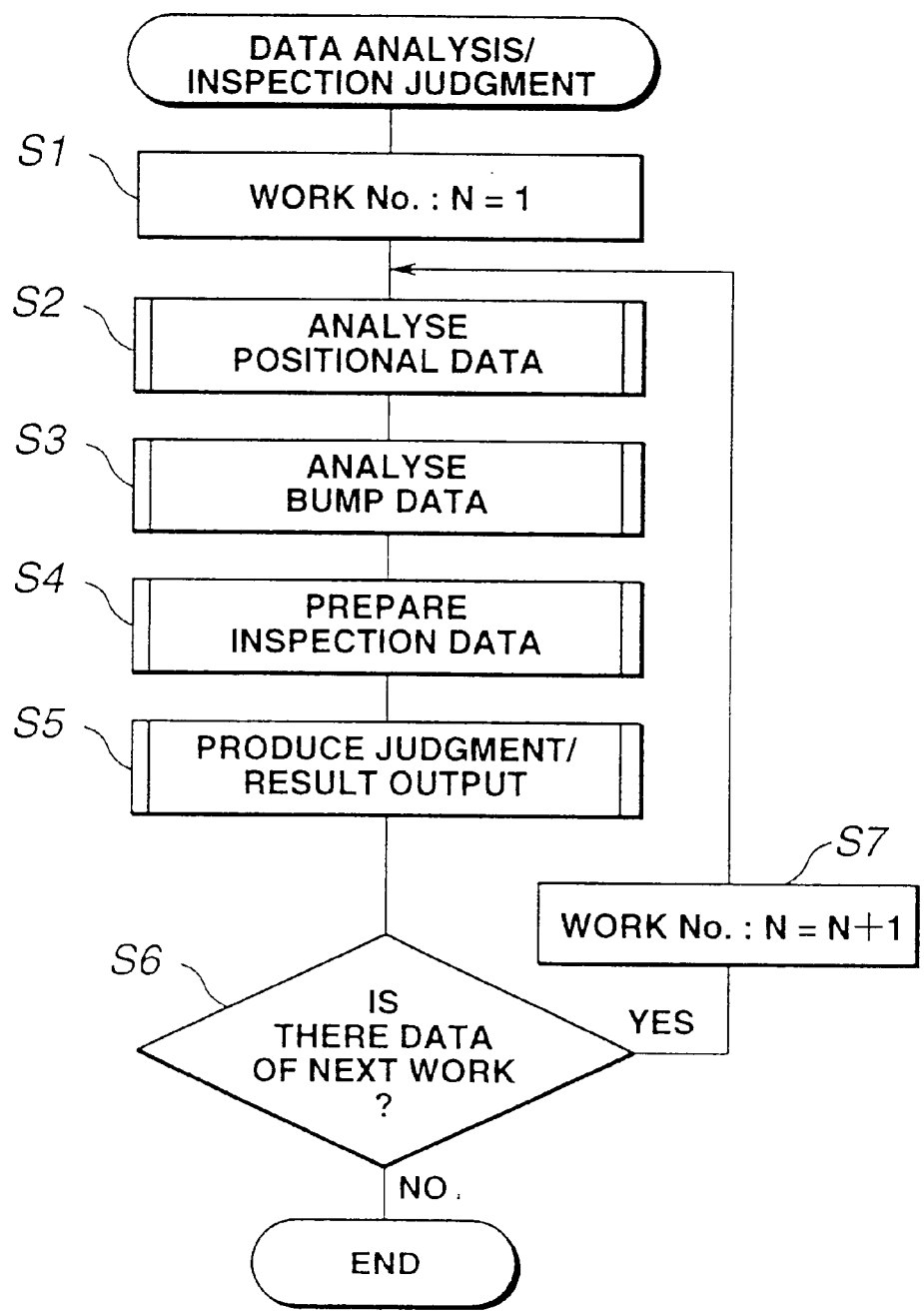
FIG. 24 is a flowchart of a data analysis/judgment process.
Figure 25:
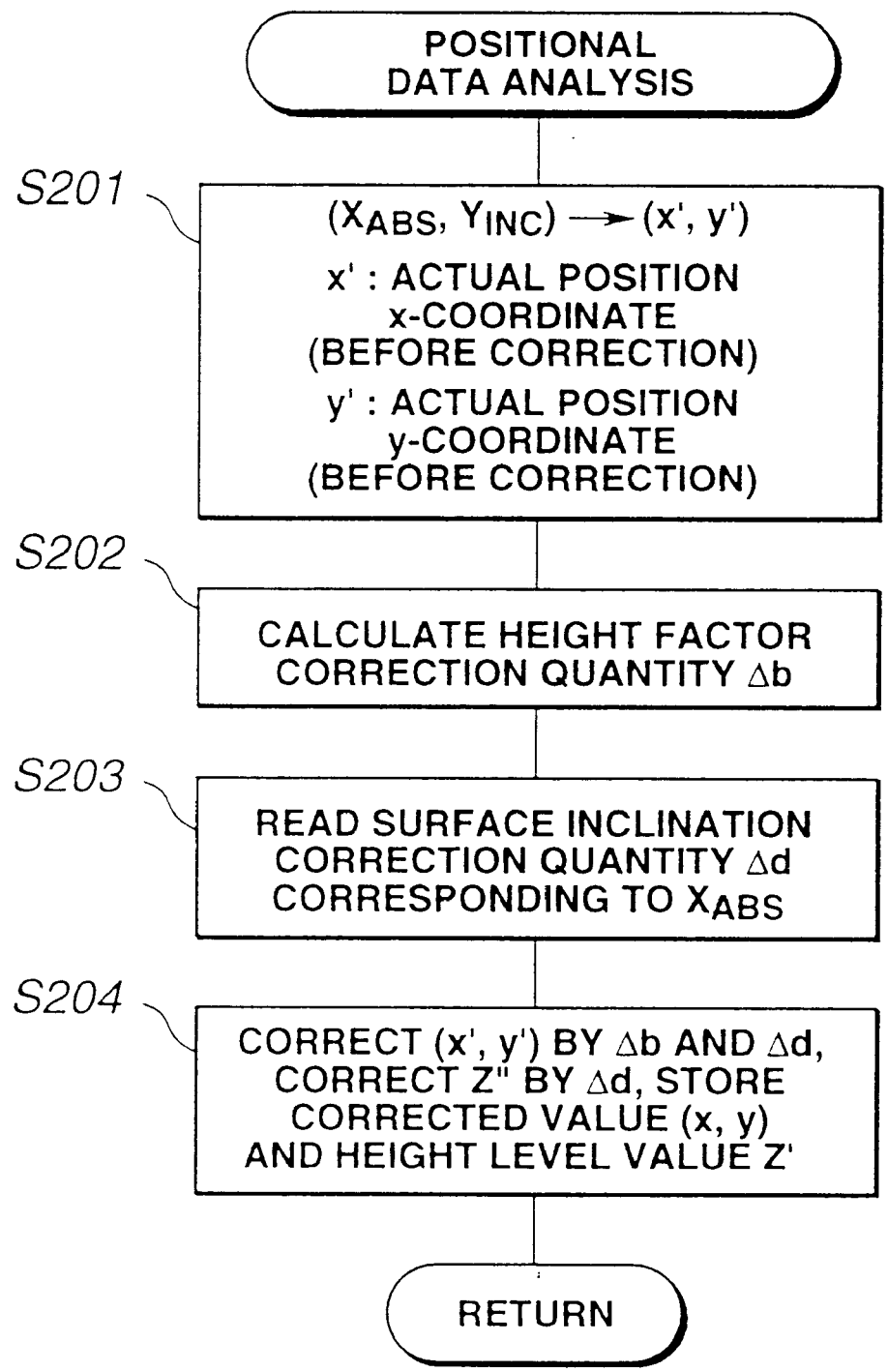
FIG. 25 is a flowchart of details of the positional data analysis process of FIG. 24.

Firstly, at S1 in FIG. 24, the data set OD of the first work is read and the process proceeds to S2 to execute a positional data analyzing process. Its detail is shown in FIG. 25. Firstly, the data ($X_{ABS}$, $Y_{INC}$) is in the form of an output value or a pulse count value from an encoder and is thus converted to the coordinate values (x', y') on the position coordinate (hereinafter referred to as inspection surface coordinates) which is set every inspection surface CP of each work (in the meantime, such conversion may previously be made on the measurement system control section 51 side and be transmitted in the form of data of (x', y') to the data analyzing section 81).

Then, as shown in FIG. 6, the laser beam LB is incident obliquely on the inspection surface at an incident angle θ, so the reflection positions of the same incident beam on the height reference surface SLP and the surface apart therefrom by z' differ by the amount of Δb. In this connection, as will be apparent from FIG. 6, the following equations will be obtained.

$$\Delta b = L \cdot \cos \theta / \sin \phi \quad (1)$$

$$\phi = 180° - 2\theta \quad (2)$$

Figure 7:
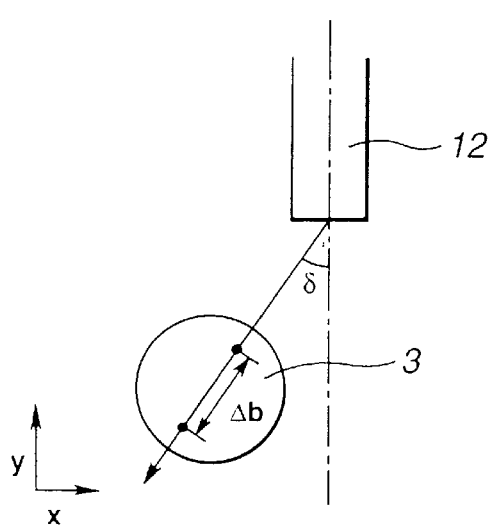
FIG. 7 is an illustration of an amount of correction of a detected height.

Thus, Δb will be obtained from θ and L. By Δb, the coordinate values (x', y') are corrected to such coordinate values that are based on the condition where incidence takes place against, for example, the height reference surface SLP. In this connection, as shown in FIG. 7, the beam from the laser beam source 12 is caused to scan in the x-direction while being changed in the angle δ with respect to the y-direction by means of the polygon mirror 16, so the correction amount in the x-direction is calculated from Δb·sin δ and similarly the correction amount in the y-direction is calculated from Δb·cos δ. In the meantime, for the value of the incident angle θ, one of those stored in the correction data group memory section 94$c$ is selectively read and used.

On the other hand, as shown in FIG. 11, if there is an error Δλ in the surface inclination angle of the polygon mirror 16, the position where the laser beam LB is cast or cast onto the inspection surface CP is caused to deviate by the amount Δd. Assuming that the focal length of the f·θ lens used is f, the deviation amount Δd can be calculated from f 2Δλ. On the other hand, by such deviation of the irradiation position is caused an error Δh in measurement of height. This error Δh in measurement can be calculated from Δd/tan φ by using the above described angle φ (=180°−2θ).

Figure 10:
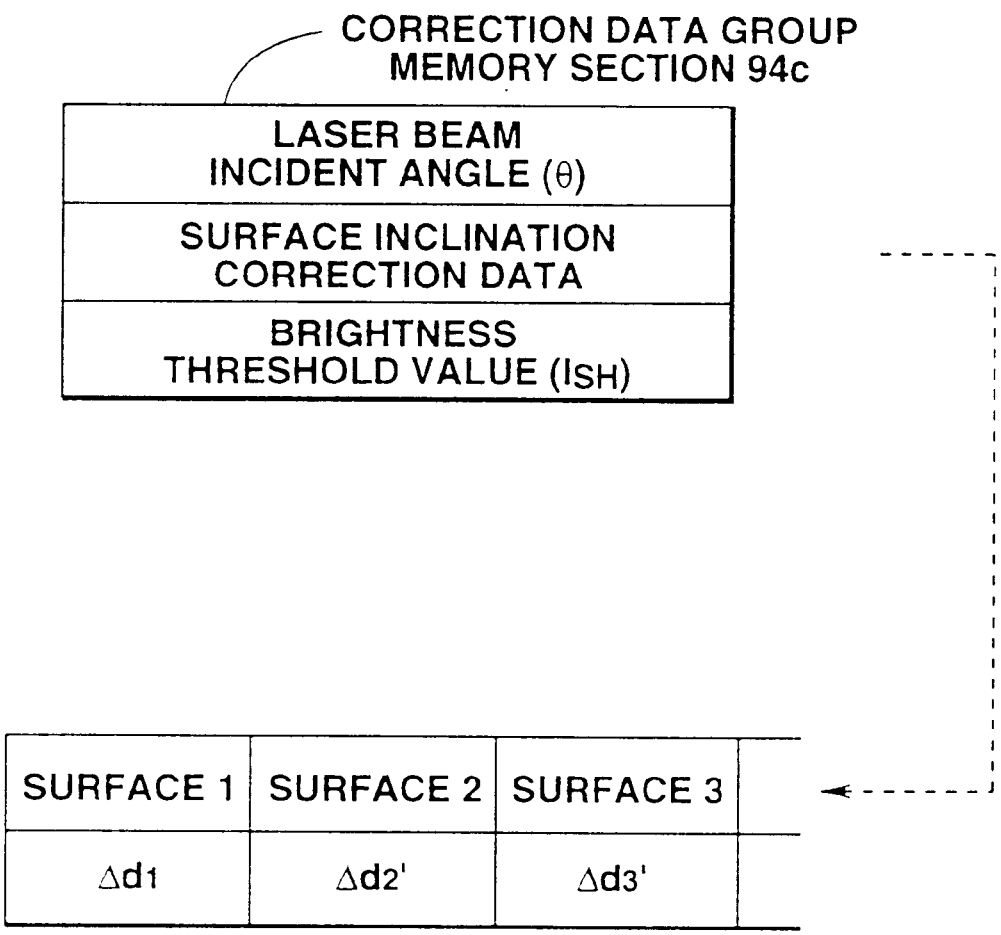
FIG. 10 is an illustration of a content of data stored in a correction data group memory section of the control system of FIG. 5.
Figure 12B:
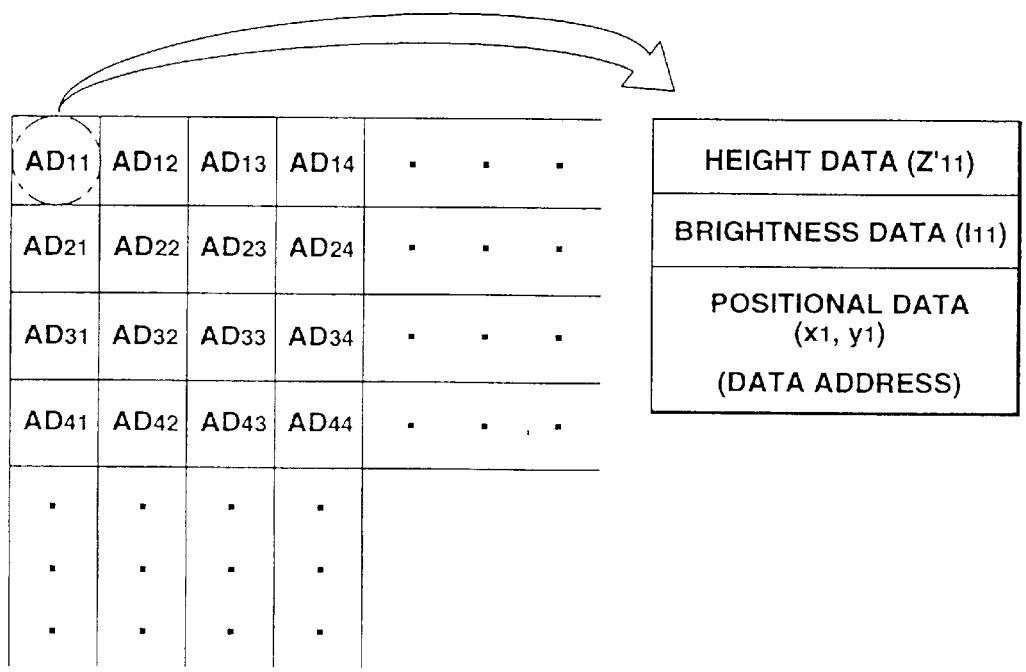

Then, as shown in FIG. 10, by storing in the correction data group storing section 94c a deviated amount Δd on the basis of an inclination angle of each surface of the polygon mirror 16 and fixing from the above described value of $X_{ABS}$ the surface of the polygon mirror 16 which is in use, a deviation amount Δd corresponding to the mirror surface in use is read (S203 in FIG. 25). At step S204 in FIG. 25, from the deviation amount Δd are obtained the correction values in the x-direction and the y-direction and the correction amount of the height level z". The thus corrected coordinate values and height level are formed into a group AD of corrected coordinate values (x', y') and height level z' in the inspection surface coordinate system and stored in the form of being correspondent to each scanning point (its stored condition is shown in FIG. 12B), and the positional data analyzing process is completed. In the meantime, the corrected coordinate values (x, y) are associated with each picture element or pixel in a display screen of a monitor (display device) 98 which will be described later, so they can be substituted for a data address corresponding to each picture element in the corrected data memory section on the assumption that the picture elements are arranged at constant intervals.

Figure 26:
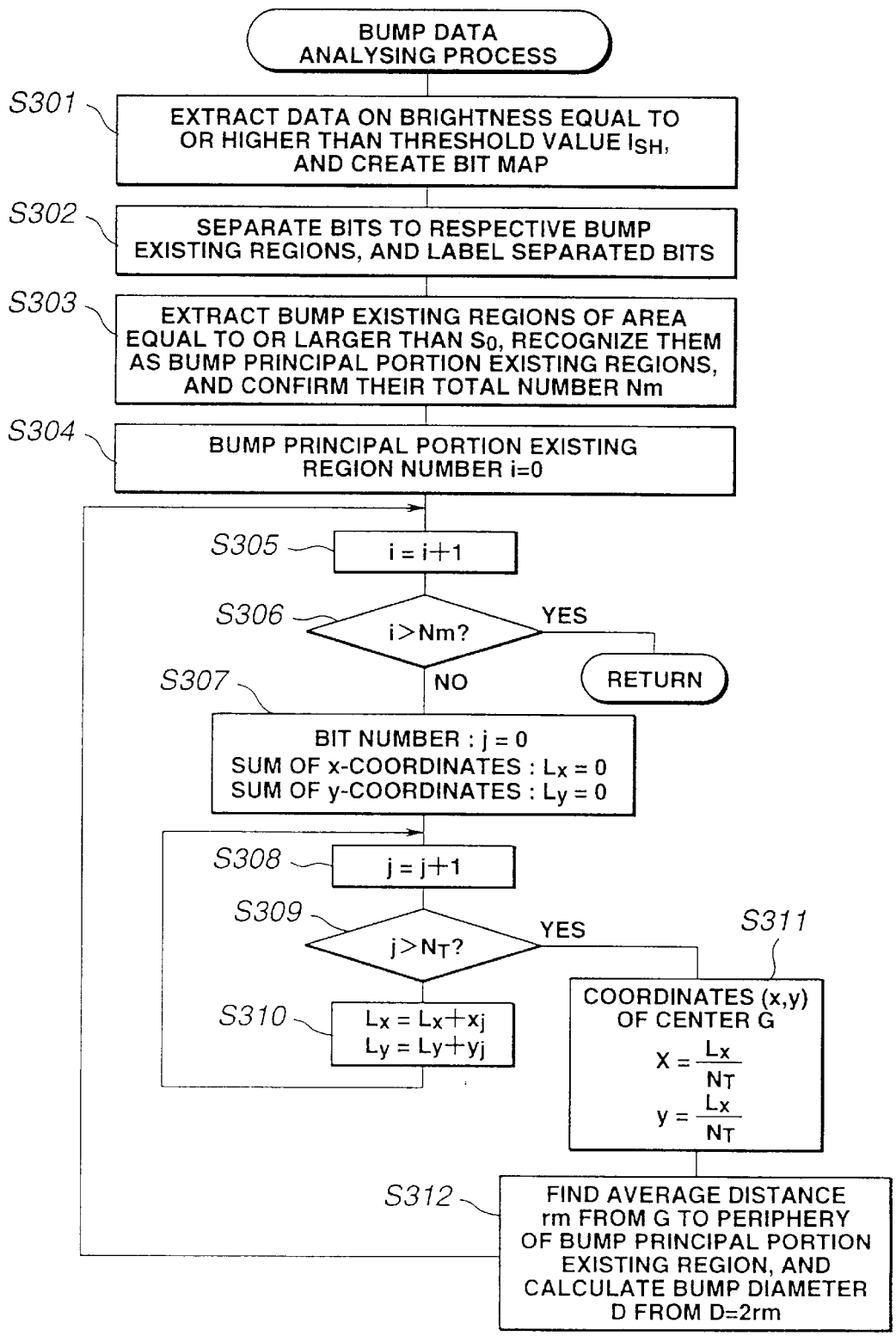
FIG. 26 is a flowchart of details of the bump data analysis process of FIG. 24.

Returning back to FIG. 24, the process then proceeds to the bump data analyzing process step at S3. FIG. 26 shows the detail of its flow. Firstly, at S301, the position coordinate (x, y) of each data group is associated one by one with each bit of a data bit plane set within, for example, an address space of the RAM 88 (refer to FIG. 5), and a bit map data is prepared on the basis of whether the brightness I is equal to or higher than a threshold value $I_{SH}$.

Figure 8:
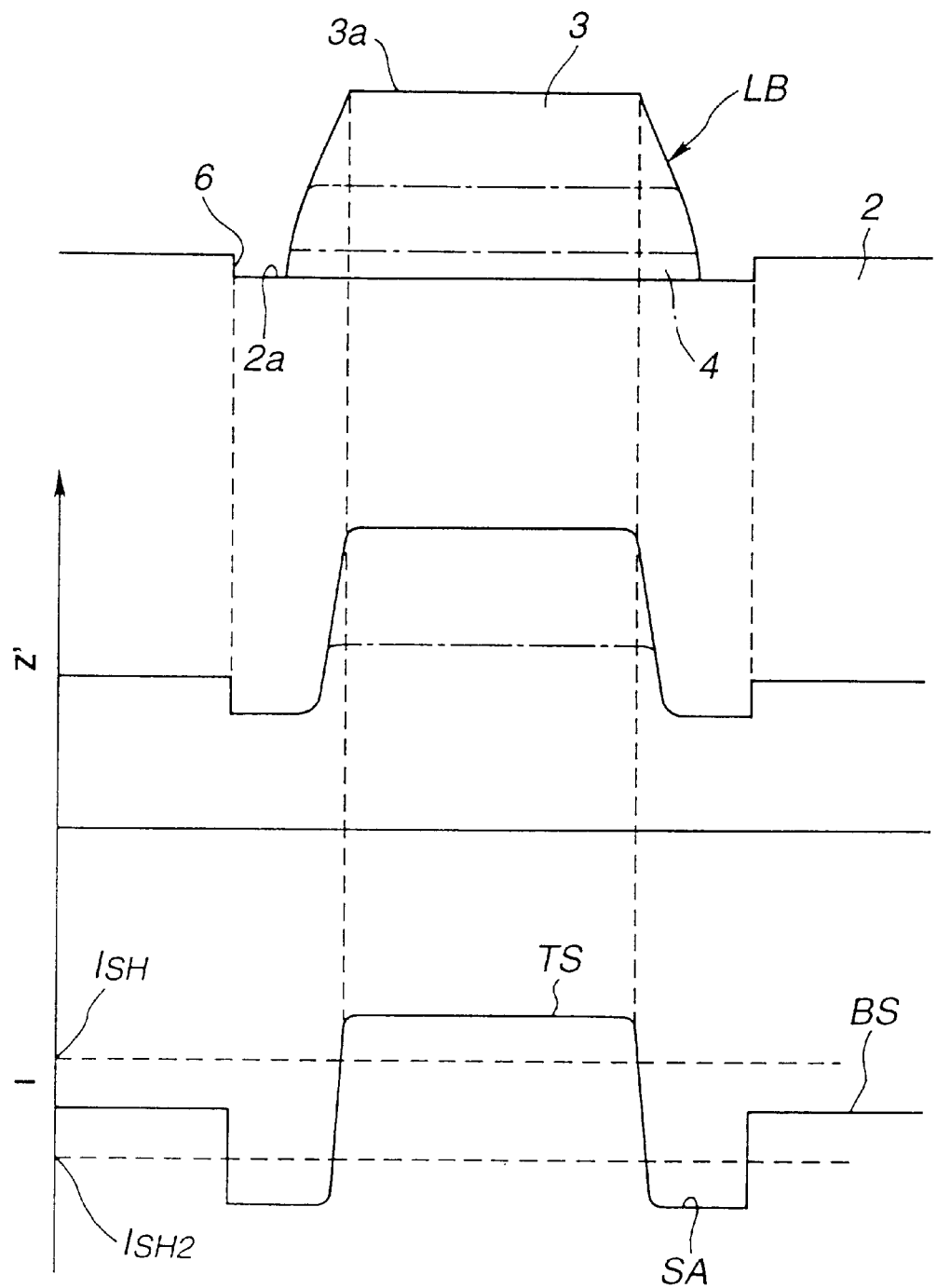
FIG. 8 is an illustration of a height level and a profile of brightness obtained by scanning a solder bump crosswise with a laser beam.

FIG. 8 shows an example of profile of a height level z' and of a brightness I, which is obtained by scanning the laser beam LB across the bump 3. That is, the substrate 2 made of a high polymer material or the like resinous material is lower in the reflectivity than the solder bump 3 made of metal, so that the brightness I is higher at a region TS corresponding to the top of the solder bump 3 and lower in a region where the circuit board substrate 2 is exposed, i.e., at a background region BS around each bump. The above described threshold value $I_{SH}$ is set so as to be higher than an average brightness level of beam reflected from the surface of the circuit board substrate 2 when the a laser beam of a predetermined intensity is incident onto the surface of the circuit board substrate 2. In the meantime, if the surface condition of the bump top is the same, the same level of brightness I results as indicated by the one-dot chain line in FIG. 8 even when the bump height becomes lower.

Figure 14:
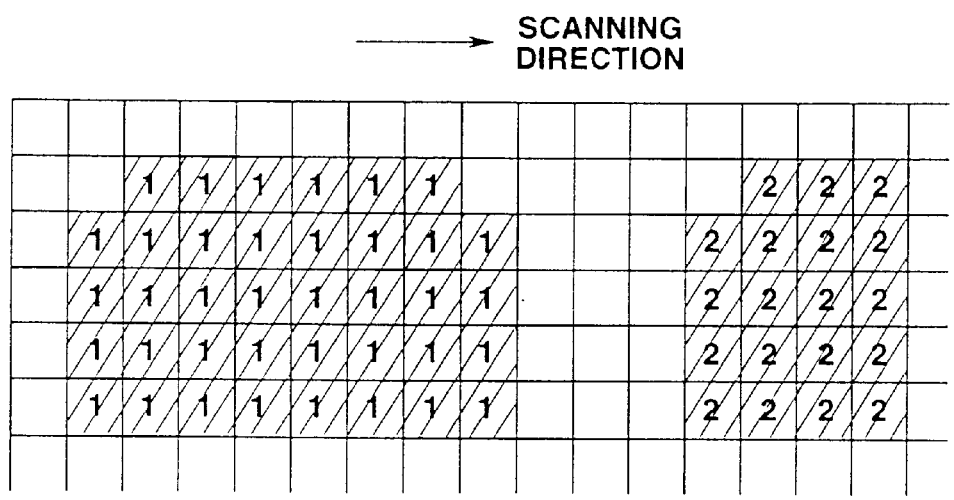
FIG. 14 is an illustration of a method of determining bump existing regions by the use of bit map data.

Thus, by setting the above described threshold value $I_{SH}$ higher than the average brightness level of the reflected beam, a bump 3 existing region on the inspection surface can be fixed on the basis of the above described bit map data. For example, as shown in FIG. 14, assuming that a bit that is higher than the threshold value $I_{SH}$ is represented by "1" (bit that is hatched) and a bit that is not is represented by "0" (bit that is not hatched), an region where the bits "1" appear collectively represents the bump existing region (which corresponds to a high brightness region in claims). Hereinlater, in this embodiment, a bit for a bump existing region is represented by "1" and anregion other than the bump existing region is represented by "0".

On the other hand, at FIG. 8, there is not caused almost any reflected beam by the region corresponding to the side surface of the bump 3 and the groove 6 due to irregular reflection and interception of the laser beam LB incident obliquely thereto, so a silhouette region SA of a quite small brightness I results. Further, since there is not caused almost any reflected beam at that region, the data on the height is in the form of being lost or missing (in actual processing, they can be considered as being a value approximating to zero). Accordingly, the bump existing region that is fixed on the basis of the above described bit map data can be considered as representing the bump top region.

Then, the process proceeds to S302 in FIG. 26 to perform a process for separating the bits to the respective bump existing regions on the basis of the bit map data. That is, as shown in FIG. 14, the bit map data is scanned in a predetermined direction, e.g., in the x-direction, and a label mark (in this embodiment, a numeral such as 1, 2, . . . , and so on) is put to each bit, while making a distinction between the bit that constitutes the same bump existing region and the bit that constitutes another bump existing region on the basis of whether a break in the continuation of bits "1" that is so large as to correspond to a predetermined number of bits "1" (e.g., 3 bits) or more occurs or not. In the meantime, when, in scanning along the second scanning line or row and onward, a bit detecting condition is changed from that detecting a bit "0" to that detecting a bit "1", the labeling condition of, for example, eight bits surrounding that bit "1" at that moment is detected so that the same label mark is put to that bit when a label mark of a bit having already been recognized is detected and a new label mark is put to that bit when nothing is detected. The aggregate sets of bits which are different in the label mark are recognized as different bump existing regions.

For example, in the case of the data set in which the height level data z' is distributed as shown in FIG. 13A and the brightness data I is distributed as shown in FIG. 13B, the bump existing region appears on the bit map data as shown in FIG. 13C by setting the brightness threshold value $I_{SH}$ to 7 (however, it is represented in FIG. 13C by writing the values z' at the respective positions in the corresponding bits). In the meantime, for use as the brightness threshold value $I_{SH}$, suitable one of those stored in, for example, the correction data group memory section 94c is read and used.

Figure 16A:
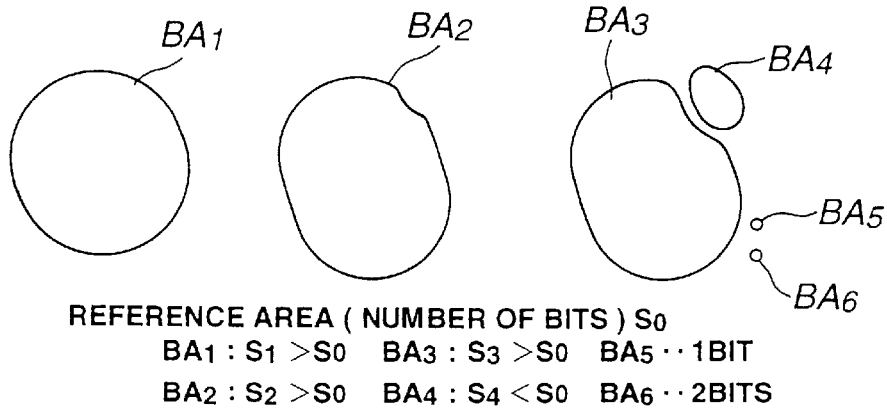
FIGS. 16A to 16D are illustrations of a way of determining a bump principal portion existing region.

Returning to FIG. 26, at S303, the bump existing regions of the area equal to or larger than a suitably set reference area $S_0$ are extracted from those which are separated from each other, as shown in FIG. 16A, and recognized as a region where a principal portion of a top of each solder bump exists, i.e., a bump principal portion existing region (BA1–BA3 in FIG. 16A). The area of each region can be found by the number of bits belonging to that region. In the meantime, the region the number of bits of which is smaller than a certain threshold value (e.g., 3 bits) which is smaller than the number of bits corresponding to the reference area S0, is excluded as noise (for example, BA5, BA6 in FIG. 16A).

Figure 15:
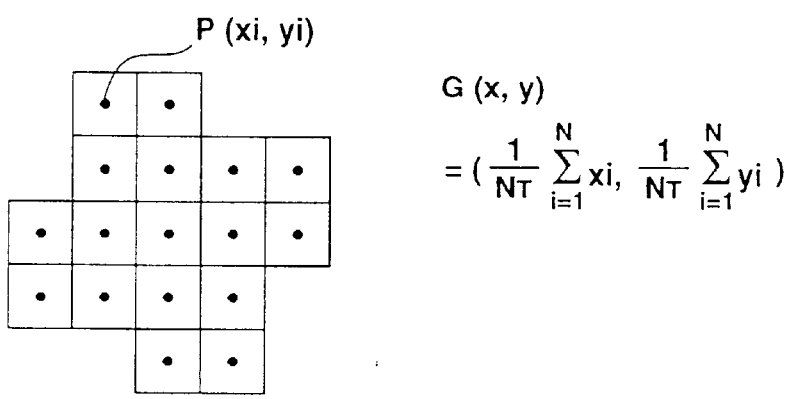
FIG. 15 is an illustration of a method of obtaining coordinates of a center of each solder bump.

Then, at S307 to S311 in FIG. 26, the coordinates of the geometric center of gravity of each extracted bump principal portion existing region are calculated, and a process for determining the calculated coordinates as the coordinates of the center G of each bump. More specifically, as shown in FIG. 15, the coordinates of the center G can be obtained by calculating the sum of the x-coordinate values and y-coordinate values of the points P on the inspection surface, each point P corresponding to each bit, i.e., calculating the sum of the coordinate values for all the bits within the region, and dividing the sum (Lx) of the x-coordinates and the sum (Ly) of the y-coordinates by the total number $N_T$ of bits.

Figure 37:
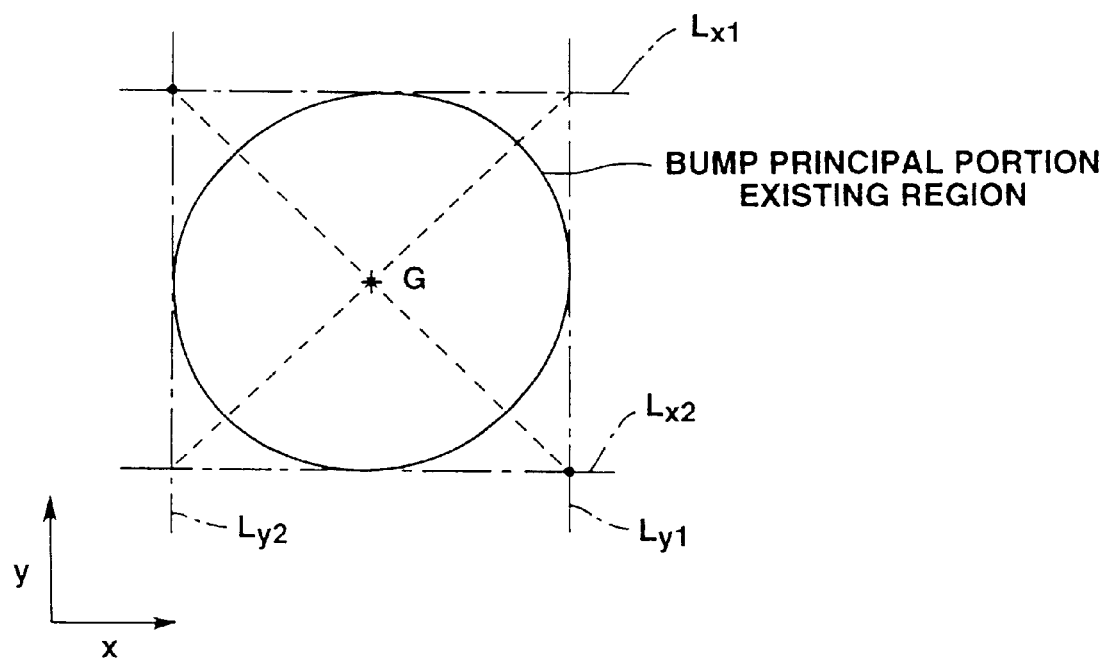
FIG. 37 is an illustration of a variant of a method of calculating coordinates of a center of a solder bump.

In the meantime, as shown in FIG. 37, the coordinates of the center G of the bump can be calculated by first obtaining a quadrilateral region circumscribed about the bump principal portion existing region and then obtaining an intersecting point of diagonal lines of the quadrilateral region. In this instance, for example, a line elongated in the x-direction is moved in parallel with the y-axis, whereby to determine two straight lines Lx1 and Lx2 that touches the bump principal portion existing region at points. Then, a line elongated in the y-direction is moved in parallel with the x-axis, whereby to determine two lines Ly1 and Ly2 that touches the bump principal portion existing region at points. By this, the above described quadrilateral is set as a rectangular region, and the coordinates of the point of intersection of its diagonal lines can be obtained by calculation of the coordinates of the middle point of one of the diagonal lines. By doing so, calculation of the x-coordinate and y-coordinate of each bit can be dispensed with, thus making it possible to simplify the process of calculating the coordinates of the center of the solder bump.

Figure 17:
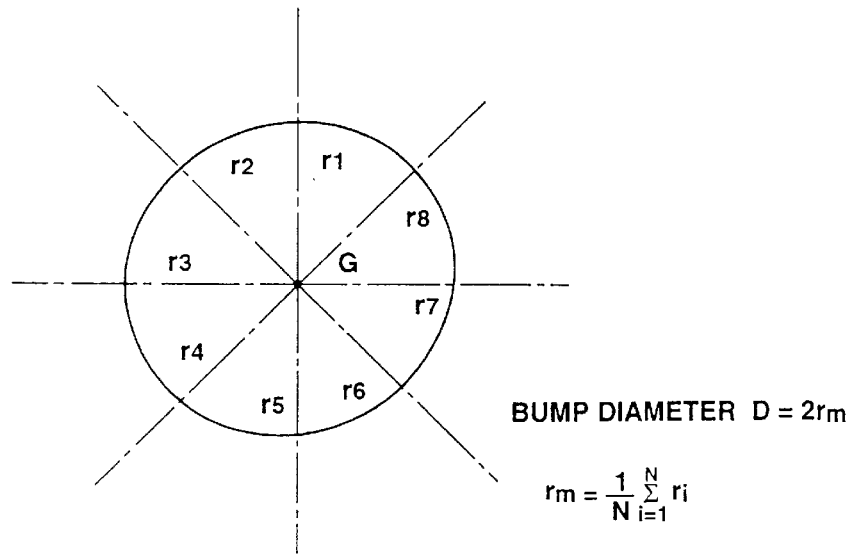
FIG. 17 is an illustration of a method of obtaining a distance from a center to a peripheral boundary of a bump principal portion existing region.
Figure 19:
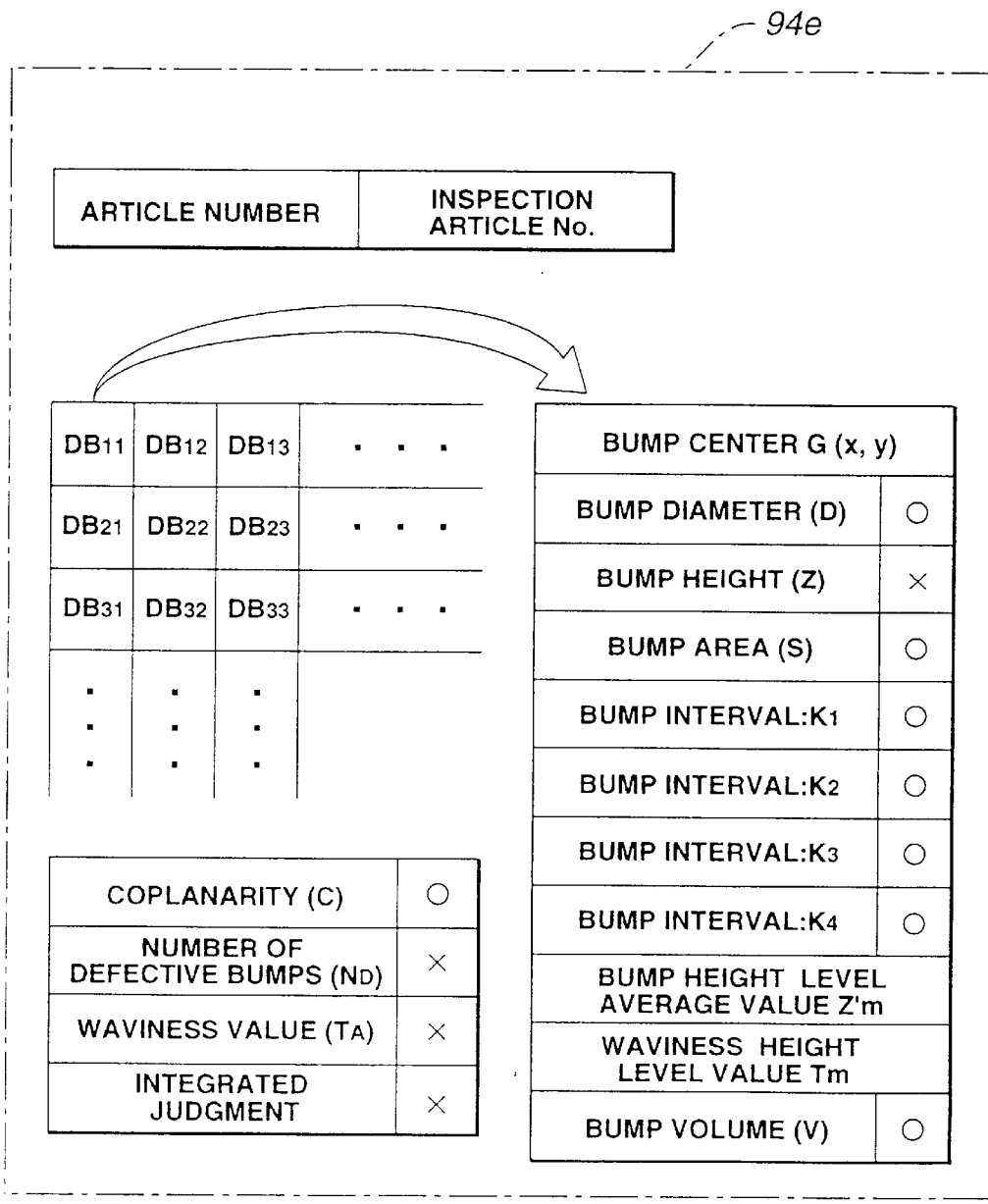
FIG. 19 is an illustration of a content of an inspection result data memory section of the control system of FIG. 5.

Returning to FIG. 26, after calculation of the coordinates of the center G of each bump, the process proceeds to S312 to perform a process step of calculating the diameter D of the bump. That is, as shown in FIG. 17, an average distance rm from the center G of the bump principal portion existing region to its periphery (in this embodiment, an average of the distances in the eight directions arranged at regular intervals) is found, and then the bump diameter D is calculated from 2 rm. This step is repeated for the bump principal portion existing regions (S304 to S306 in FIG. 26). In the meantime, the determined coordinates of the center G and bump diameter D are stored in the inspection result data memory section 94e (its detail is shown in FIG. 19). In the meantime, the bump diameter D can be calculated by finding the area of the bump principal portion existing region from the number of bits within the bump principal portion existing region and determining the diameter of a circle of the same area as the bump principal portion existing region as the bump diameter D.

Figure 16B:
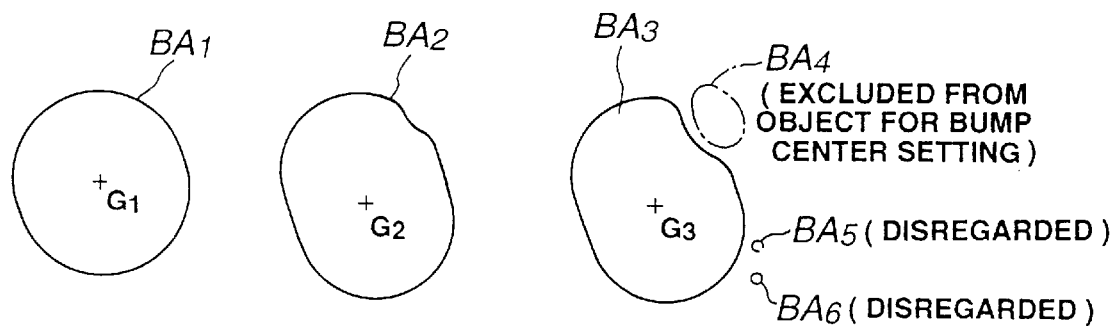

In this instance, in the event that the bump is nearly normal as shown in FIG. 16A, the bump principal portion existing region nearly reflects the shape of the bump top face. On the other hand, in case the surface of the bump is rough or the bump is partially chipped, there can possibly occur such a case in which two or more bump existing regions resulting from the same bump appear as indicated by BA3 and BA4. In this instance, only the bump BA3 whose area is equal to or larger than a reference area S0 is regarded as a bump principal portion existing region as shown in FIG. 16B, and the chip BA4 whose area is smaller than the reference area $S_0$ is excluded from the object about which the process of determining the center of the bump is to be carried out. By this, there can be avoided such a trouble that the chip BA4 is erroneously regarded as another bump. On the other hand, in case the bump existing regions resulting from the same bump are all smaller than the reference area $S_0$, no bump principal portion existing region is recognized with respect to that bump. However, such a result is caused due to the fact that the surface condition or the like of the bump is not good from the first, so by utilizing the result reversely it becomes possible to assume existence of a defective bump.

Figure 21A:
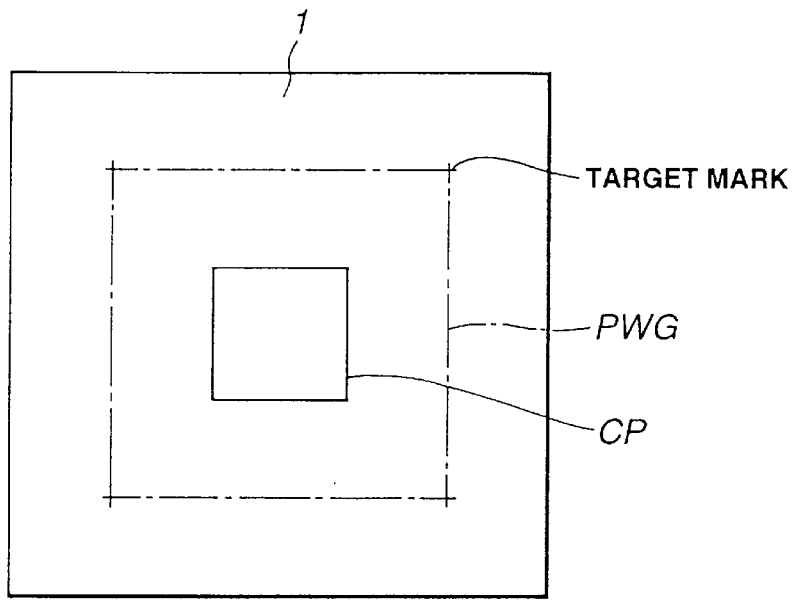
FIGS. 21A and 21B are illustrations of a method of estimating existence of a defective bump.
Figure 21B:
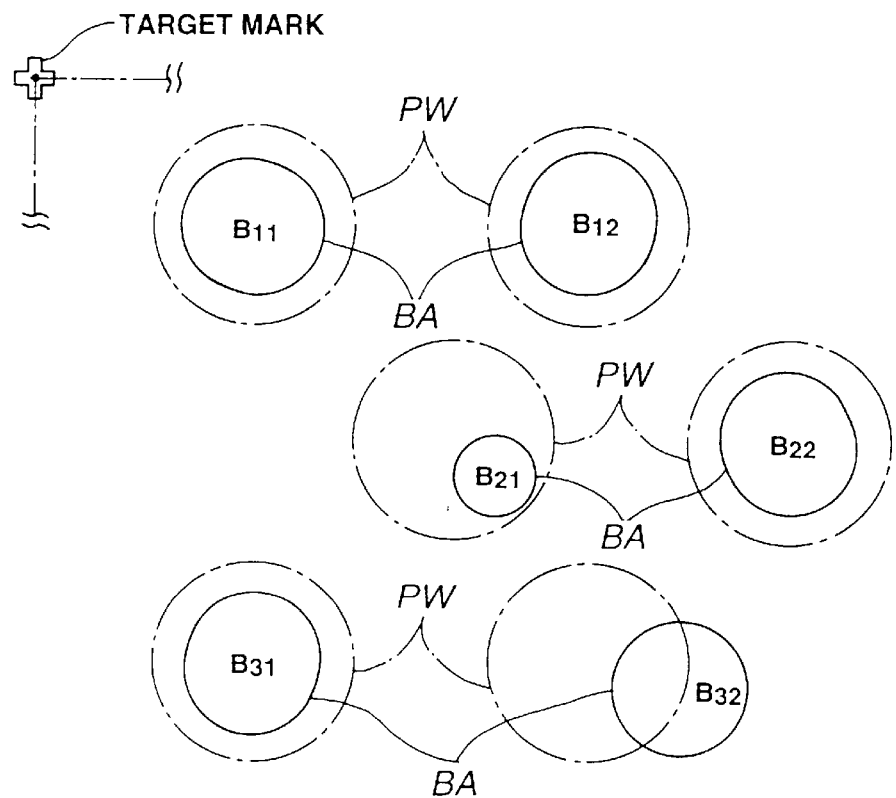

In FIGS. 21A and 21B, an example of a method of carrying out such an assumption about existence of a defective bump is shown. As shown in FIG. 21B, a group of position tolerance defining windows PW for defining the tolerance or permissible range of the position where each solder bump is formed is set on the inspection surface CP of the bump-attached circuit board 1. An area of a bump existing region (high brightness region) BA located within each position tolerance defining window PW is calculated, whereby it becomes possible to judge, in case the ratio of the area BA to the area of the window PW is equal to or smaller than a predetermined ratio, that a defective bump exists within the window PW. In the meantime, the set position of the group of position tolerance defining windows PW on the inspection surface is the same so long as the bump-attached circuit board 1 is of the same kind. Thus, as shown in FIG. 21A, a target mark for determining a positional relation between a window group PWG formed by a group of windows PW and the inspection surface CP is formed on the bump-attached circuit board 1 previously, whereby at the time of inspection alignment or positioning of the window group PWG can be attained by the use of the target mark.

In the meantime, in place of the target mark, the window group PWG may be positioned in place by utilizing the centers of particular solder bumps on the bump-attached circuit board 1 (for example, the centers of four solder bumps at the four corners of the bump-attached circuit board 1).

Figure 27:
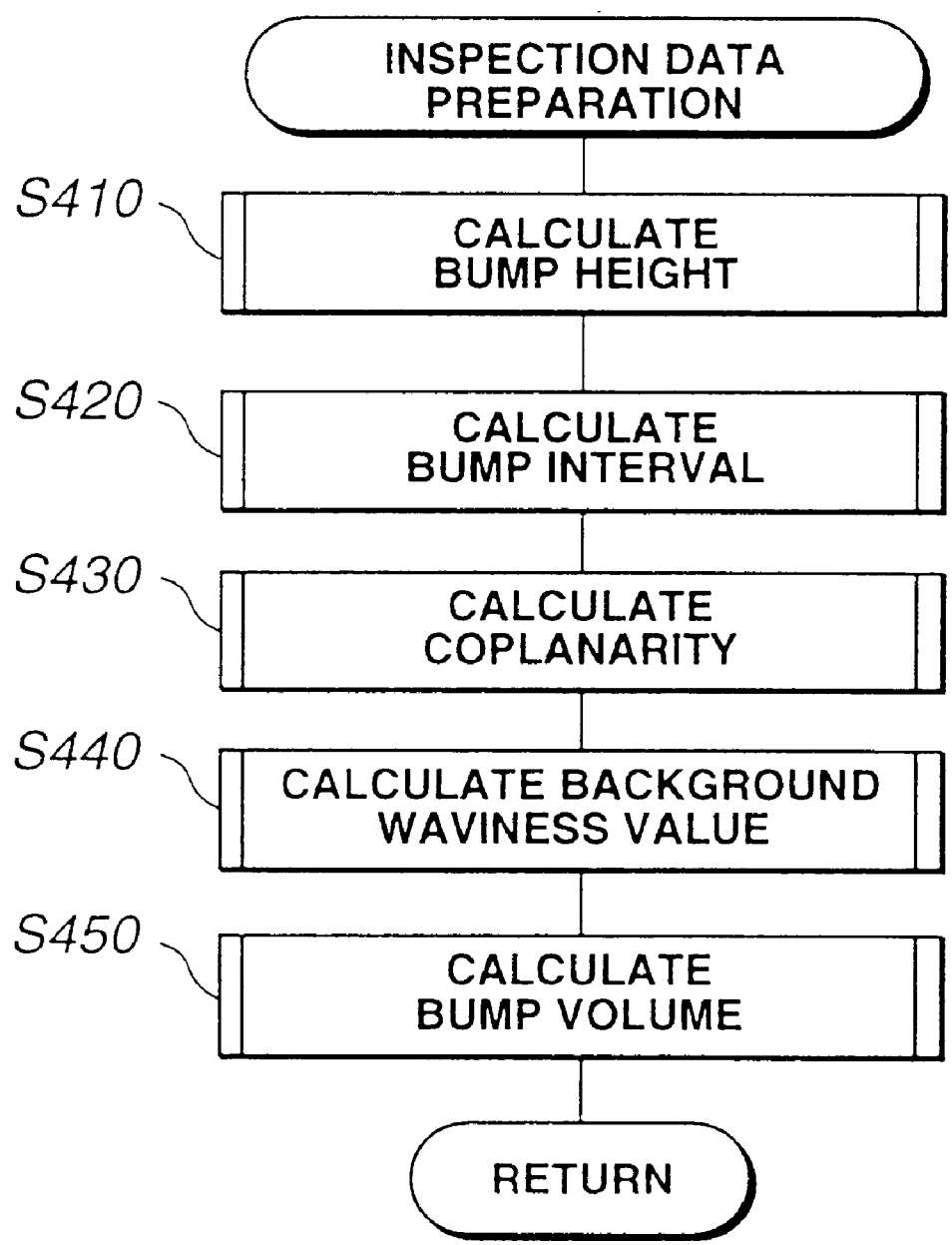
FIG. 27 is a flowchart of details of the inspection data preparing process of FIG. 24.

By the forgoing steps, the bump data analyzing process is completed and the process proceeds to S4 shown in FIG. 24 for carrying out a process for inspection data preparation. As shown in FIG. 27, the inspection data preparing process in this embodiment consists of five steps, i.e., a bump height calculating step (S410), a bump interval calculating step (S420), a coplanarity calculating step (S430), a background waviness value calculating means (S440) and a bump volume calculating process (S450).

Figure 16C:
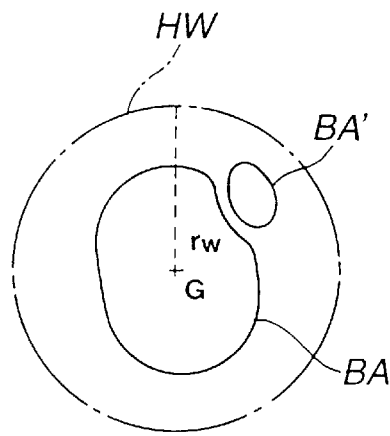
Figure 16D:
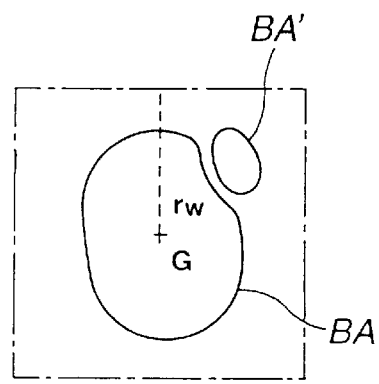
Figure 28:
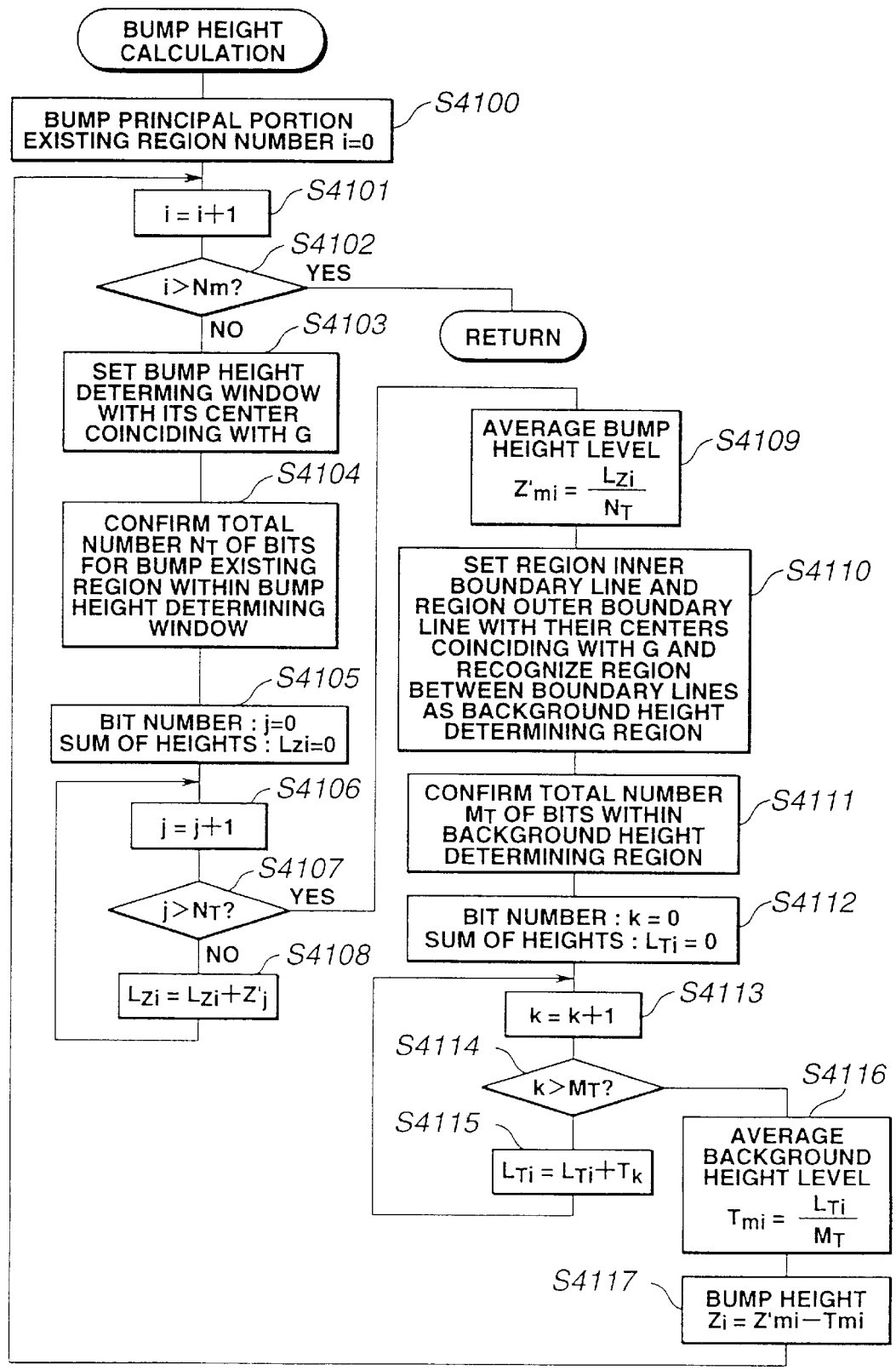
FIG. 28 is a flowchart of details of the bump height calculating process of FIG. 27.

FIG. 28 shows a control flow of the bump height calculating process. A principal portion of the process resides in the steps S4103–S4117. At S4103, for the determined bump principal portion existing region described above, a bump height determining window (bump height determining region) with its center coinciding with G is set to be of such a size as to include therewithin the bump principal portion existing region. For example, in the example shown in FIG. 16C, the bump height determining window HW is set to be of such a circle of a predetermined radius rw that is larger in size than the bump principal portion existing region. Further, as shown in FIG. 16D, the bump height determining region can be formed into a quadrilateral or square. In the following steps S4102–S4107, by performing, for all of the bump height existing regions located within the above described bump height determining window HW (BA and BA' in FIG. 16C), addition of the height levels z' each corresponding to each bit and by dividing the thus added-up value Lz by the total number of bits $N_T$, an average height level $z'm = L_z/N_T$ of the top face of each bump is obtained.

In this instance, if the surface of the circuit board substrate 2 is nearly perfectly flat, the height level of the surface of the circuit board substrate 2, i.e., the height level of the background surface is of a nearly constant value HS when the circuit board substrate 2 is disposed in parallel to the height reference surface. Thus, the protruding height z of the bump above the surface of the circuit board substrate 2 (i.e., hereinafter, when simply referred to as "bump height", it will indicate this protruding height z) can calculated from the following expression.

$$z = z'm - H_S \qquad (3)$$

However, in case the circuit board substrate 2 is made of a high polymer material such as plastics, there may possibly occur such a case in which waviness, warping or the like surface irregularity is caused in the surface of the circuit board substrate 2 as shown in FIG. 34, due to the difference in the coefficient of thermal expansion between the high polymer material constituting the substrate 2 and a metal constituting a metallic wiring disposed inside the substrate 2 when the substrate 2 is subjected to heating during a manufacturing process of the bump-attached circuit board 1, i.e., there may possibly occur such a case in which the height level of the background surface varies widely in places.

Figure 18:
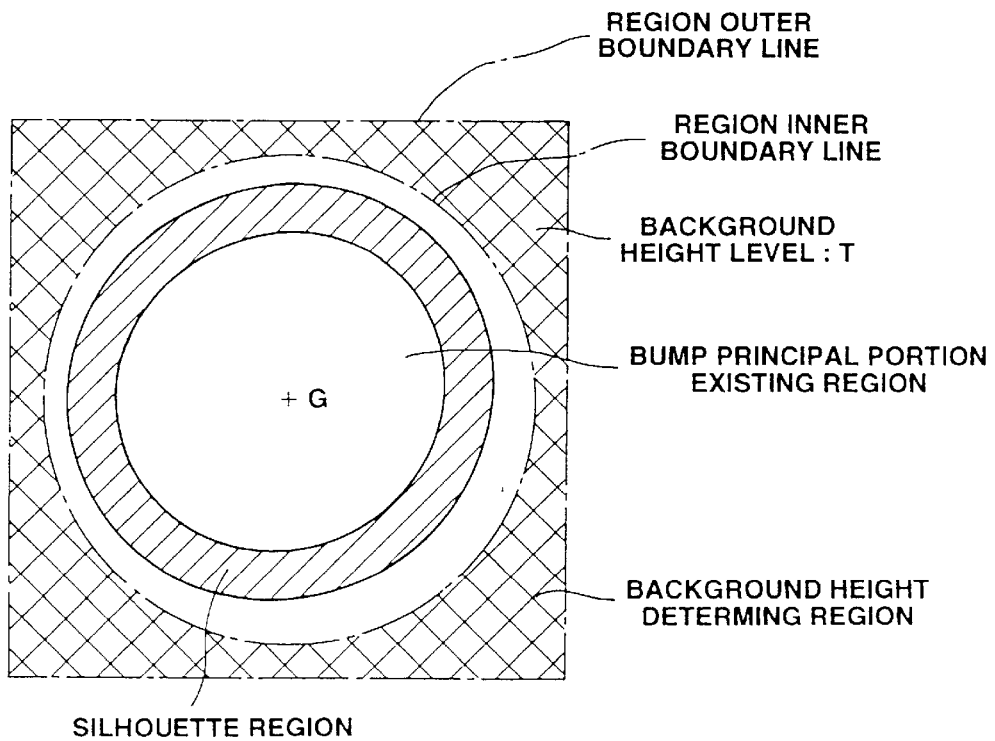
FIG. 18 is an illustration of a background height determining region.

Thus, in the flow of the process of FIG. 28, the average height level Tm (hereinafter will be referred to as "waviness height level") of the background surface around each bump is calculated at steps S4110 to S4116 in the following manner. That is, as shown in FIG. 18, it is set an inner boundary line outside the bump principal portion existing region and a silhouette region caused around the bump principal portion existing region and in a manner as to surround those regions, and it is further set an outer boundary line which is located more outside than the inner boundary line. The region located between those boundary lines is set as a background height determining region (S4110). In this embodiment, the inner boundary line is formed into a circle concentric with the center G of the bump principal portion existing region, and the outer boundary line is formed into a square shape with an intersecting point of its diagonal lines being coincident with the center G (however, they are not limited to those shapes, for example, the outer boundary can be formed into a circle).

The height levels T corresponding to the respective bits within the background height determining region are added up to obtain $L_T$, and the waviness height level Tm is obtained by dividing the calculated value $L_T$ by the total number MT of bits, i.e., can be calculated from the following expression (S4112–S4116).

$$Tm = LT/MT \quad (4)$$

The bump height Z is obtained by subtracting Tm from Z'm which is calculated at step S4116, i.e., can be calculated from the following expression (S4117).

$$Z = Z'm - Tm \quad (5)$$

In the meantime, the above described process is carried out repeatedly for the respective bump principal portion existing regions (S4100–S4102). The height Z of each bump obtained in the above described manner is stored together with the height level Z'm and the waviness height level Tm in the inspection result data memory section 94e of FIG. 5 and FIG. 19. In this connection, for the process of obtaining the coplanarity, the average value Z'm of the height level of the bump top face for each bump principal portion existing area(i.e., coplanarity determining height) is also stored in the memory section 94e.

Figure 20A:
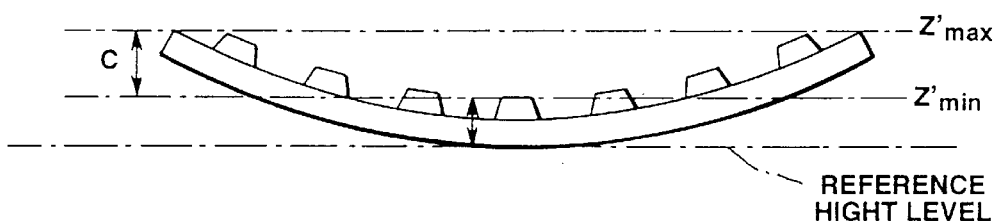
FIGS. 20A and 20B are illustrations of a coplanarity of a circuit board and a process for fixing a state of solder bump array, respectively.
Figure 20B:
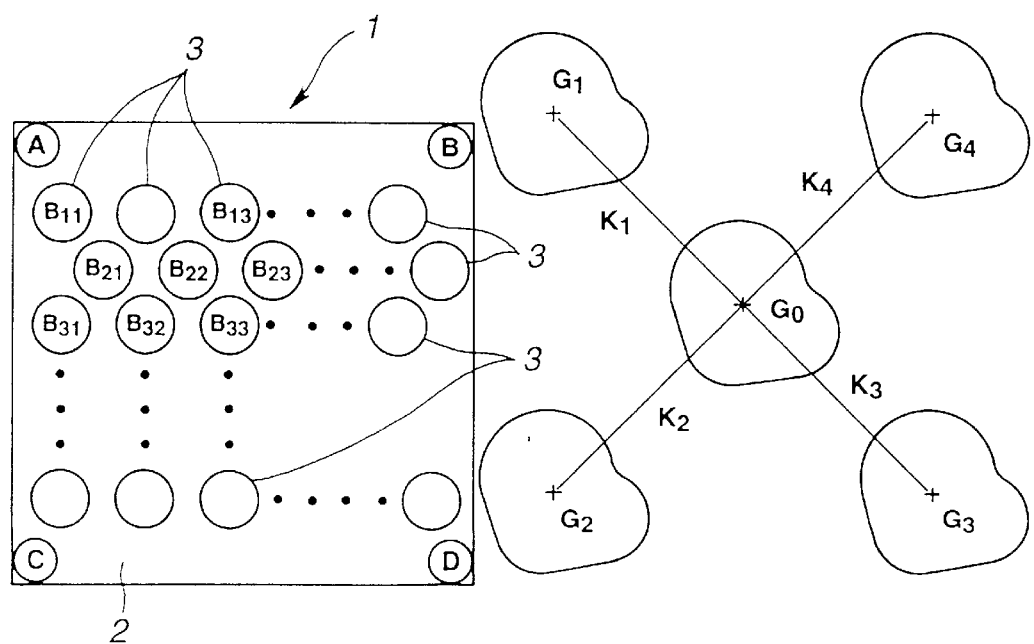
Figure 29:
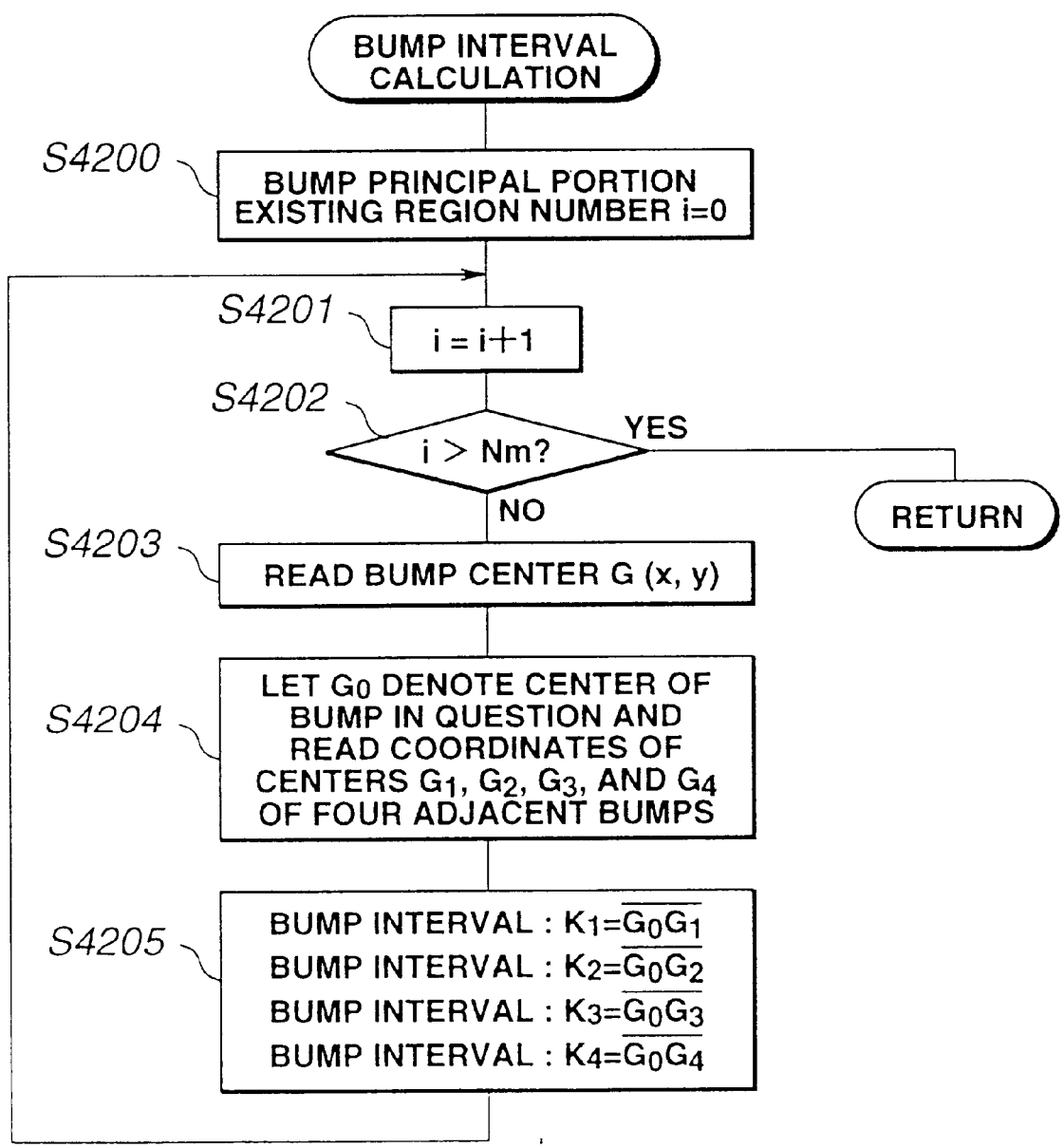
FIG. 29 is a flowchart of details of the bump interval calculating process of FIG. 27.

Then, as shown in FIG. 20B, the array or arrangement (B11, B12 . . . etc.) of the solder bumps 3 on the circuit board 1 can be fixed by the aforementioned, fixed center G of each bump principal portion existing region. FIG. 29 shows a flow of a bump interval calculating process. A principal portion of the process resides in the steps S4203–S4205, and at S4203 the coordinates of the center G of the bump which is watched at present is read. Then, at S4204, let $G_0$ denote the center of the watched bump, and the coordinates G1–G4 of the centers of four solder bumps adjacent the watched bump are read. At S4205, the distance between that watched bump and each of its adjacent solder bumps is represented by the distance between the centers thereof (K1–K4) and calculated. The thus obtained bump distance K1–K4 for every each bump (or, bump principal portion existing region) is stored in the inspection result data memory section 94e shown in FIG. 5 or FIG. 19. In the meantime, the above described process is carried out repeatedly for treatment of each bump principal portion existing region (S4100–S4102).

Figure 30:
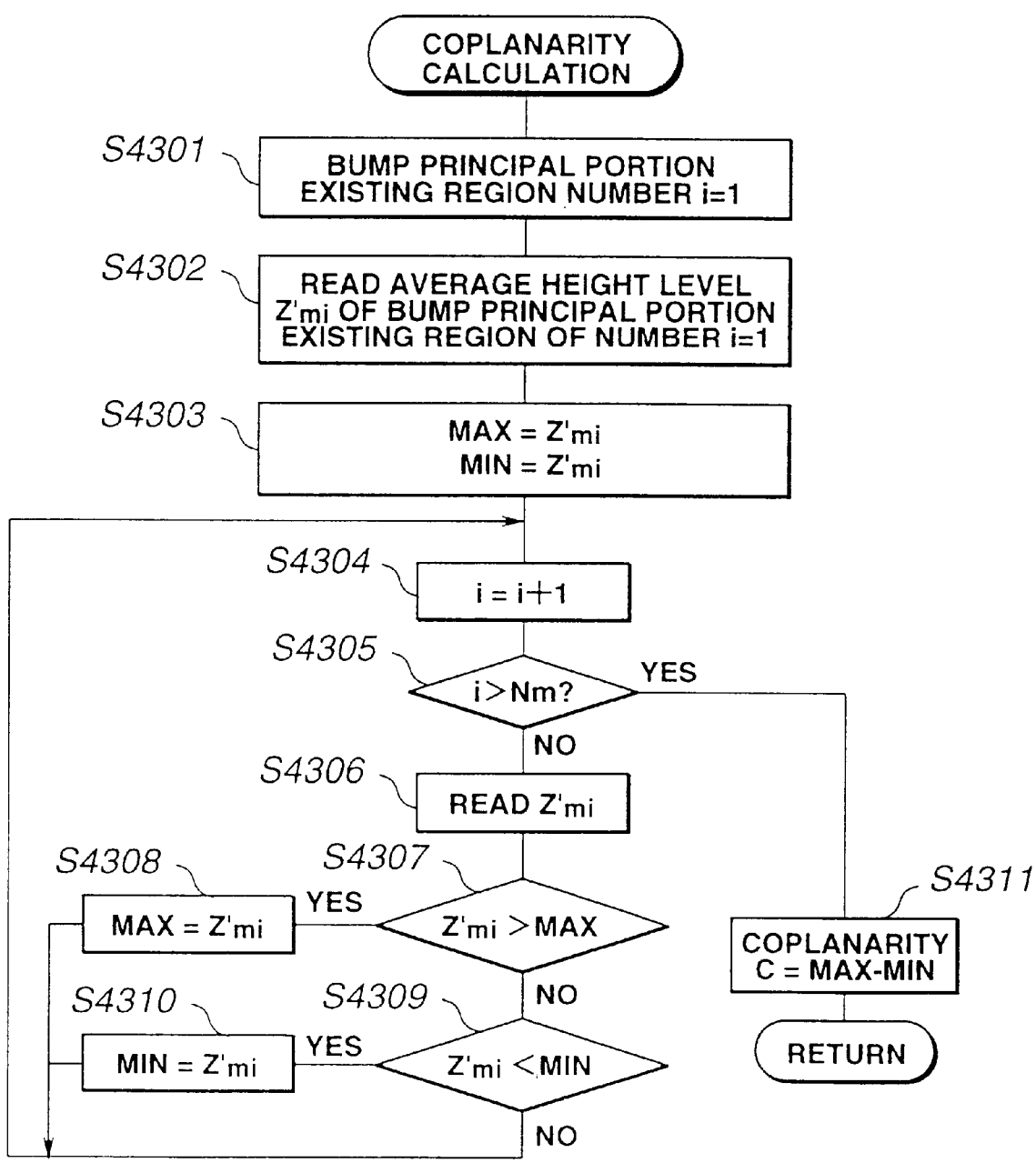
FIG. 30 is a flowchart of details of the coplanarity calculating process of FIG. 27.

FIG. 30 shows a flow of the coplanarity calculating process. At the steps S4301–S4310 of this process, comparison of one of the average bump top face height level $z'_m$ with another is made one by one to obtain its maximum value MAX and its minimum value MIN. At S4311, the difference (MAX−MIN) between the both is calculated and is used to represent the coplanarity C. This value is stored in the inspection result data memory section 94e shown in FIG. 5 and FIG. 19.

Figure 38A:
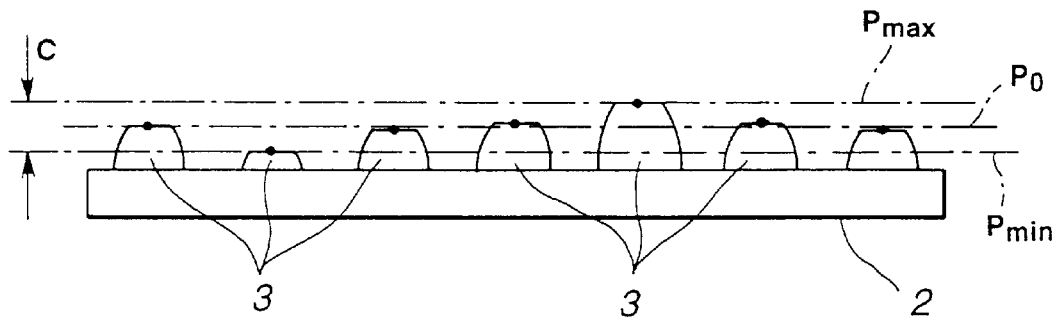
FIGS. 38A and 38B are illustrations of some other concepts of a coplanarity C.

In the meantime, the coplanarity C can be obtained by calculation of the following value. For example, as shown in FIG. 38A, let a least squares plane corresponding to the top position of each bump 3 be a top reference surface $P_0$, let $P_{max}$ be a plane parallel to the top reference surface $P_0$ and in contact with the top of the bump which is maximum in height, and let $P_{min}$ be a plane parallel to the top reference surface P and in contact with the top of the bump 3 which is minimum in height, the coplanarity C is can be represented by the distance between the planes $P_{max}$ and $P_{min}$. In the meantime, the coordinates of the top position can be determined by the use of three-dimensional coordinates (x, y, z) of the position which is maximum in height within the bump top face or by the use of $(x_p, y_p, z'_m)$ resulting from a combination of, for example, the coordinates $(z_p, y_p)$ of the bump center G and the aforementioned, calculated average value z'm of the height levels z' of the bump top face.

Figure 38B:
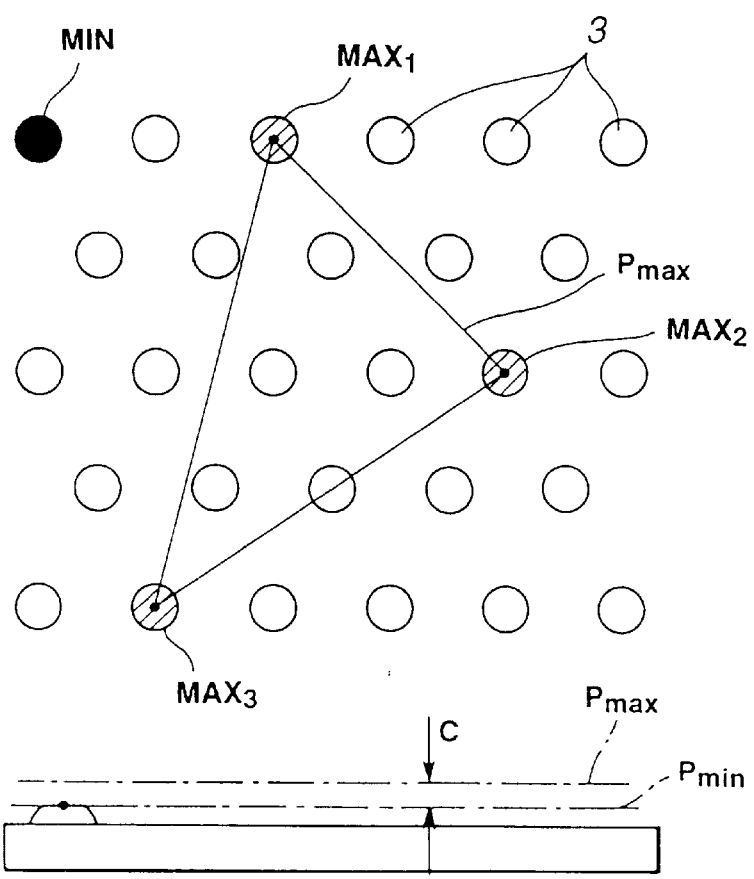
Figure 39A:
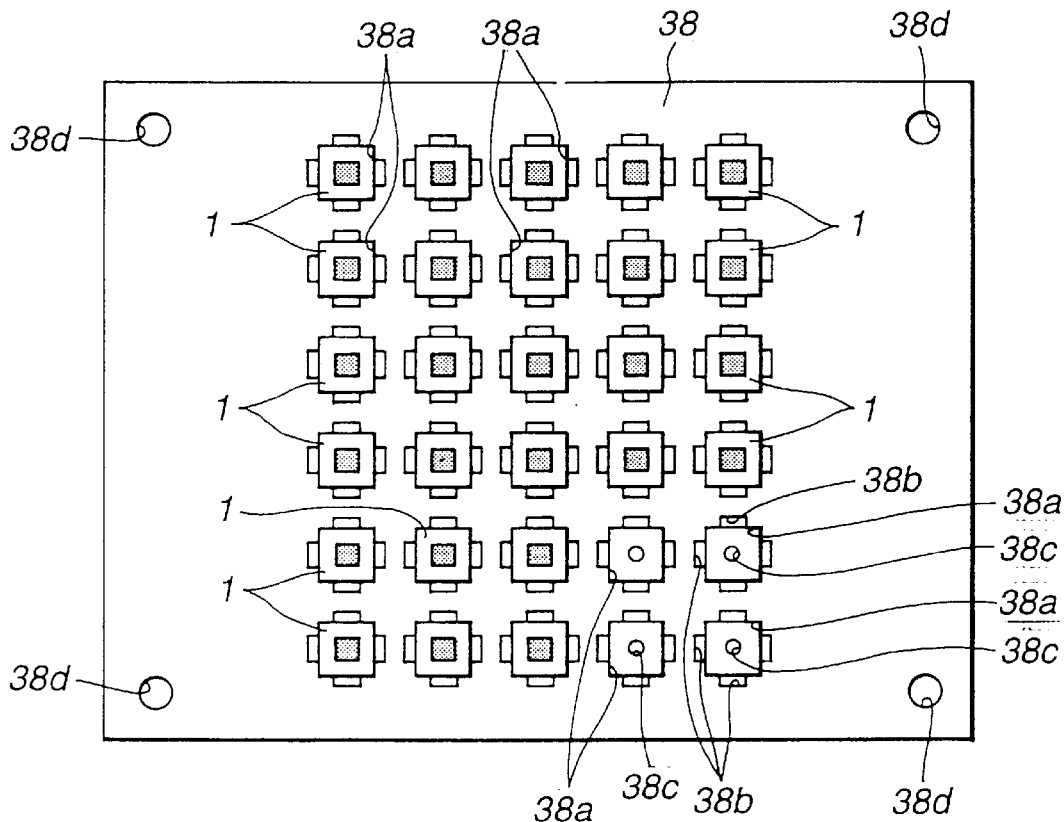
FIG. 39A is a plan view of a work holder in a state of having installed thereon works.
Figure 39B:
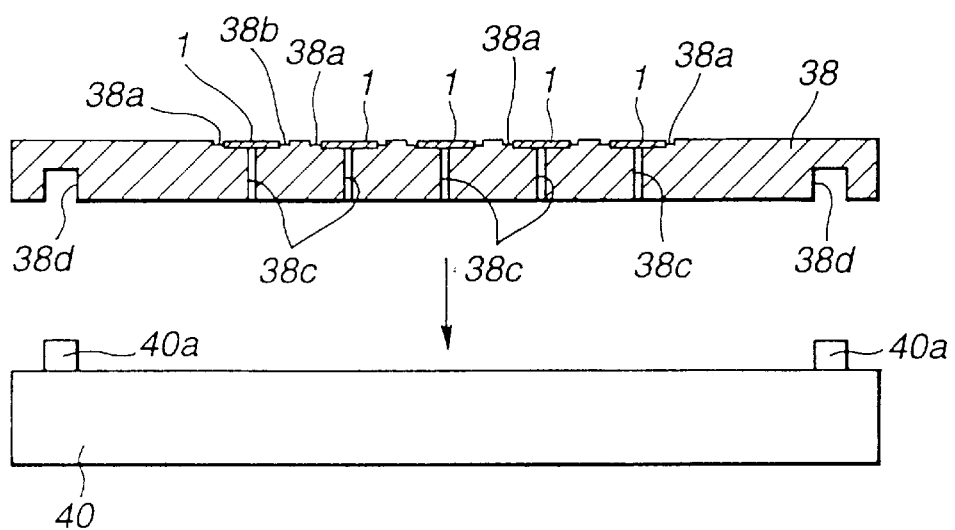
FIG. 39B is a cross sectional view of the work of FIG. 39A, together with an x-y table of FIG. 4.

On the other hand, as shown in FIG. 38B, when three bump height levels MAX1, MAX2, MAX3 are selected in order of height including the maximum, the coplanarity C can be determined by the distance from the plane $P_{max}$ which is determined by the three bump tops to the top of the bump which is minimum in height (or the distance between $P_{max}$ and $P_{min}$ where $P_{min}$ is a plane parallel to the plane Pmax and in contact with the top of the bump which is minimum in height). Further, on the contrary, when three bump height levels MIN1, MIN2 and MIN3 are selected in order of height including the minimum, the coplanarity C can be determined by the distance from the plane Pmin which is determined by the three bump tops to the top of the bump which is maximum in height (or by the distance between $P_{max}$ and $P_{min}$ where $P_{max}$ is a plane parallel to the $P_{min}$).

In the meantime, the coplanarity C can be calculated by the use of the heights of all the solder bumps on the circuit board 1 or for simplicity calculation may be made by the use of the heights of only part of the solder bumps 3.

Figure 31:
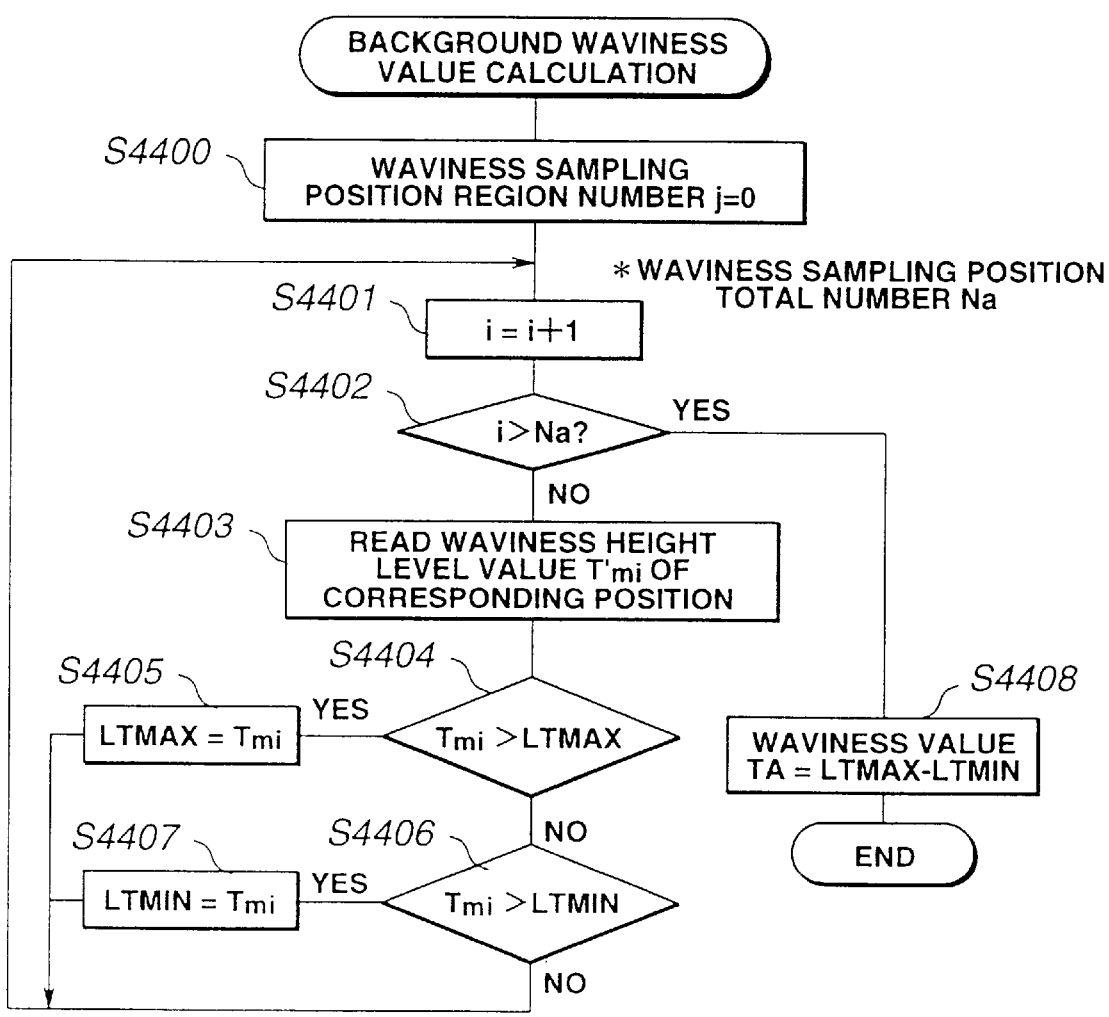
FIG. 31 is a flowchart of details of the background waviness calculating process of FIG. 27.

FIG. 31 shows a flow of a background waviness value calculating process. In this process, a plurality of predetermined waviness sampling positions are set on the background surface section of the inspection surface. A waviness height level Tm corresponding to each sampling position is read, and a waviness value TA (surface waviness information) is calculated by using the thus read waviness height level Tm. Herein, the number of the sampling positions is determined by way of example as Na, the waviness height levels obtained by sampling are compared with each other one by one to obtain the maximum value LTMAX and the minimum value LTMIN, and at step S4408 the waviness value TA is obtained by calculating the difference between them, i.e., LTMAX−LTMIN (S4400–S4408). Larger TA means that the degree of waviness or warping of the circuit board substrate (or inspection surface CP) is larger.

In the meantime, the following value can be calculated for use as a waviness value TA. For example, let a least squares plane corresponding to each sampling position be a reference surface LPO, let $LP_{max}$ be a plane parallel to the reference surface LPO and in contact with the sampling position which is maximum in height, and let $LP_{min}$ be a plane parallel to the reference surface LPO and in contact with the top of the sampling position which is minimum in height, the waviness value TA can be represented by the distance between the planes $LP_{max}$ and $LP_{min}$.

Further, the waviness value TA may be calculated from the sum of the waviness height levels Tm obtained by sampling. For example, as shown in FIG. 22, sampling positions may be set on the inspection surface CD in a way as to correspond to the bumps A, B, C and D at four corners of the inspection surface CD, and the waviness value TA may be calculated from the average value of the waviness height levels TmA, TmB, TmC and TmD which are obtained at the respective peripheral regions.

Further, the waviness value may be calculated from the following expressions (6) and (7), i.e., a center line average waviness may be calculated from the expressions (6) and (7) for use as a centerline average waviness. In the expressions, Na is the number of sampling positions and Tmi is the waviness height level corresponding to No. i of those sampling positions.

$$TA = \frac{1}{Na}\sum_{i=1}^{Na}|Tmi - \mu Tm| \quad (6)$$

$$\mu Tm = \frac{1}{Na}\sum_{i=1}^{Na}Tmi \quad (7)$$

Figure 32:
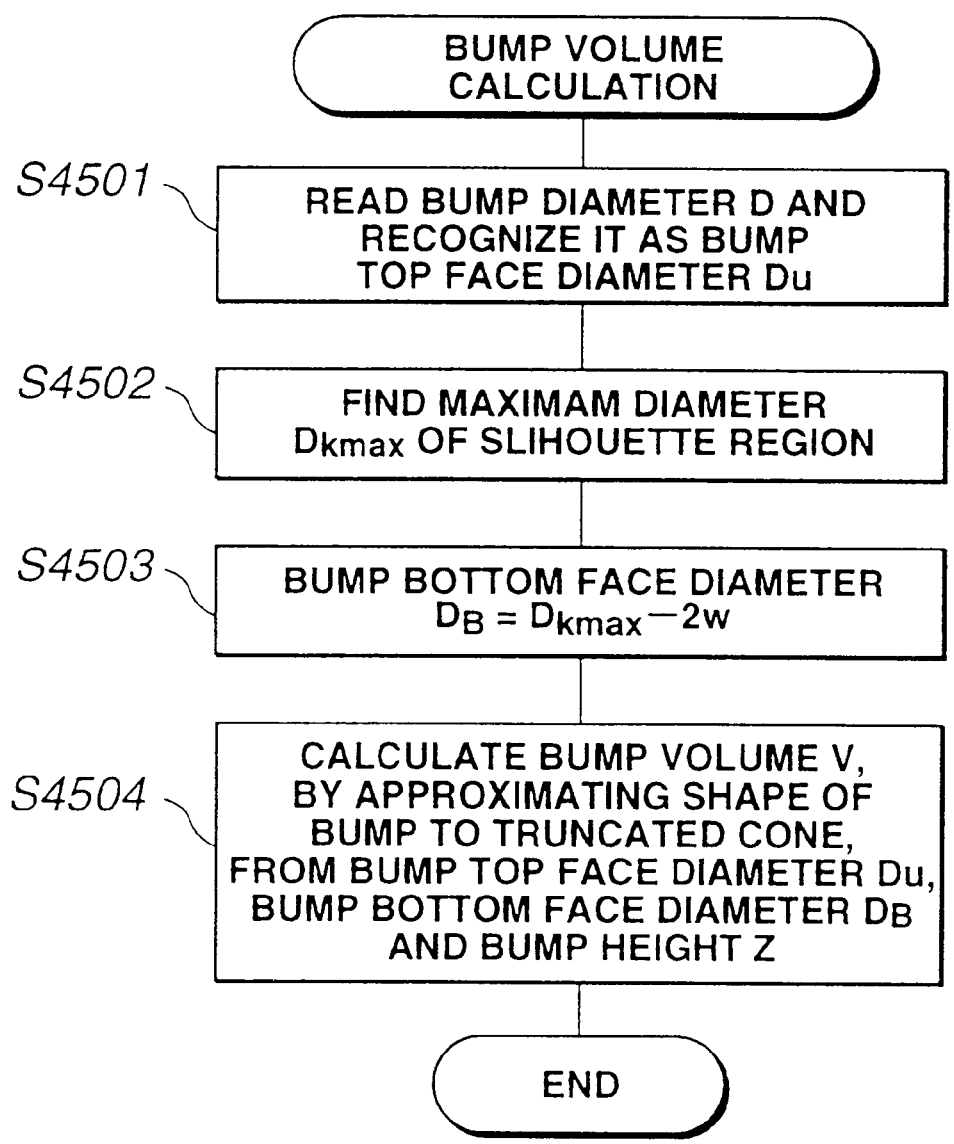
FIG. 32 is a flowchart of details of the bump volume calculating process of FIG. 27.
Figure 35A:
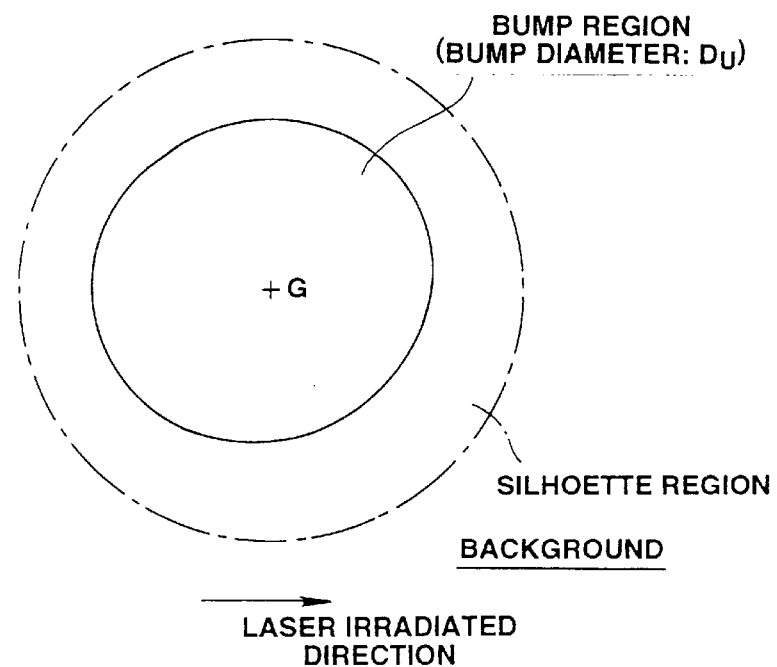
FIGS. 35A and 35B are illustrations of a silhouette region.

FIG. 32 shows a flow of a bump volume calculating process. Firstly at step S4501, the value of the previously calculated bump diameter D is read for use as a bump top face diameter $D_u$. Then, as shown in FIG. 35A, a silhouette region to be formed around a bump existing region is fixed. As shown in FIG. 8, the silhouette region SA can be fixed every each bump as a region which is lower in the reflected beam brightness than a threshold value $I_{SH2}$ which is set lower than the reflected beam level of the background surface SA.

Figure 35B:
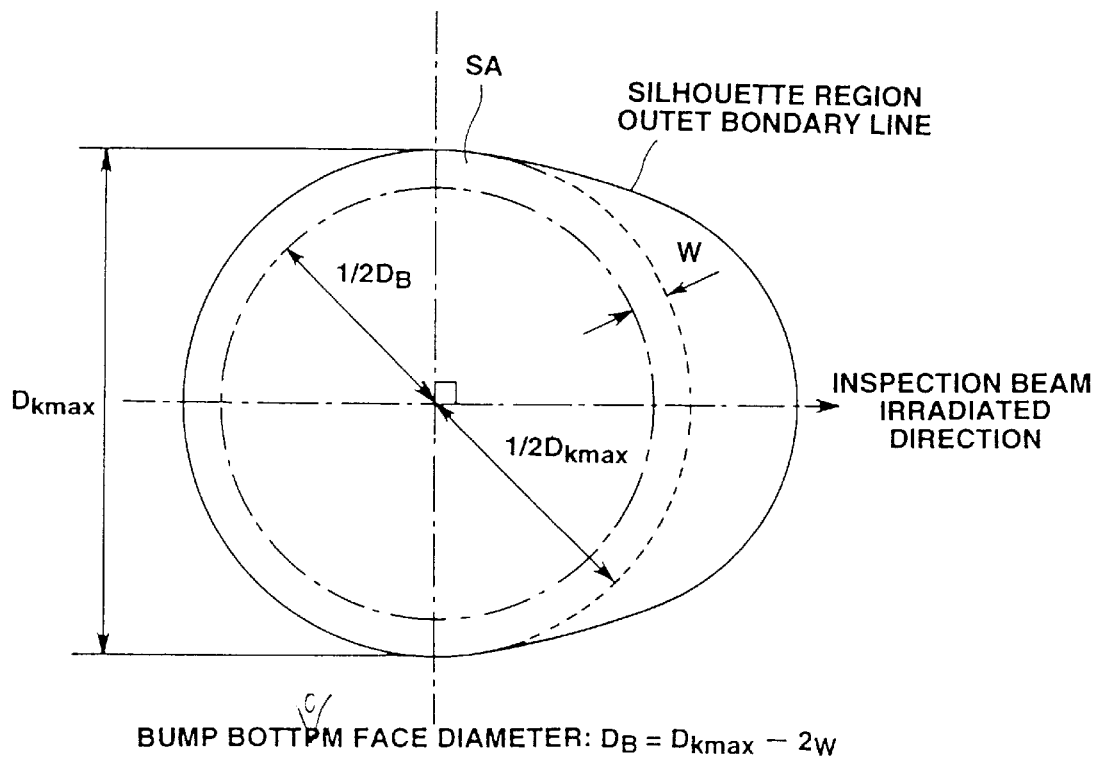

As shown in FIG. 35B, the maximum size $D_{kmax}$ of the silhouette region external line with respect to a plane perpendicular to the incident direction of the inspection beam is calculated (S4502 in FIG. 32). Further, as shown in FIG. 6, the annular groove 6 of the width W is formed in the circuit board substrate 2 at a location around each bump 3, so the silhouette region is represented by such a shape as reflecting the groove as shown in FIG. 35B. Thus, in steps S4503 in FIG. 32, a value resulting from subtraction of the, groove width W from the above described maximum diameter $D_{kmax}$, i.e., $D_{kmax}-W$ is obtained for use as a bump bottom face diameter $D_B$, as shown in FIG. 35B. Then, the process proceeds to step S4504 in which on the assumption that the bump can be approximated to a truncated cone of a top face diameter $D_u$ and a bottom face diameter $D_B$ as shown in FIG. 36, the bump volume V is calculated from the following expressions.

$$V = \frac{1}{3}\pi\left(\frac{D_B}{2}\right)^2 hv - \frac{1}{3}\pi\left(\frac{D_u}{2}\right)^2 hx \quad (8)$$

$$hx = \frac{Du \cdot Z}{D_B - Du} \quad (9)$$

-continued $$hv = hx + Z = \frac{D_B \cdot Z}{D_B - Du} \quad (10)$$

The value V is stored in the inspection result data memory section 94e in FIG. 5 and FIG. 19.

Returning to FIG. 24, the inspection data preparing process is completed by the above. The memory contents of the inspection data memory section 94e under this condition is as shown in FIG. 19. Firstly, an article number is used for fixing the kind of work, and an inspection article number is used for fixing a plurality of works (inspection articles) individually. Both of them are inputted to the inspection data memory section 94e from the input section 100 (refer to FIG. 5) prior to processing. Inspection data $DB_{11}$, $DB_{12}$ . . ., etc. is stored, one for each bump (or each bump principal portion existing region). Each inspection data includes coordinates of bump center G, bump diameter D, bump height z, bump region S (area of bump principal portion existing region), and bump intervals K1–K4. Further, the calculated coplanarity C with respect to the bump array on the circuit board 1 is also stored.

Figure 33:
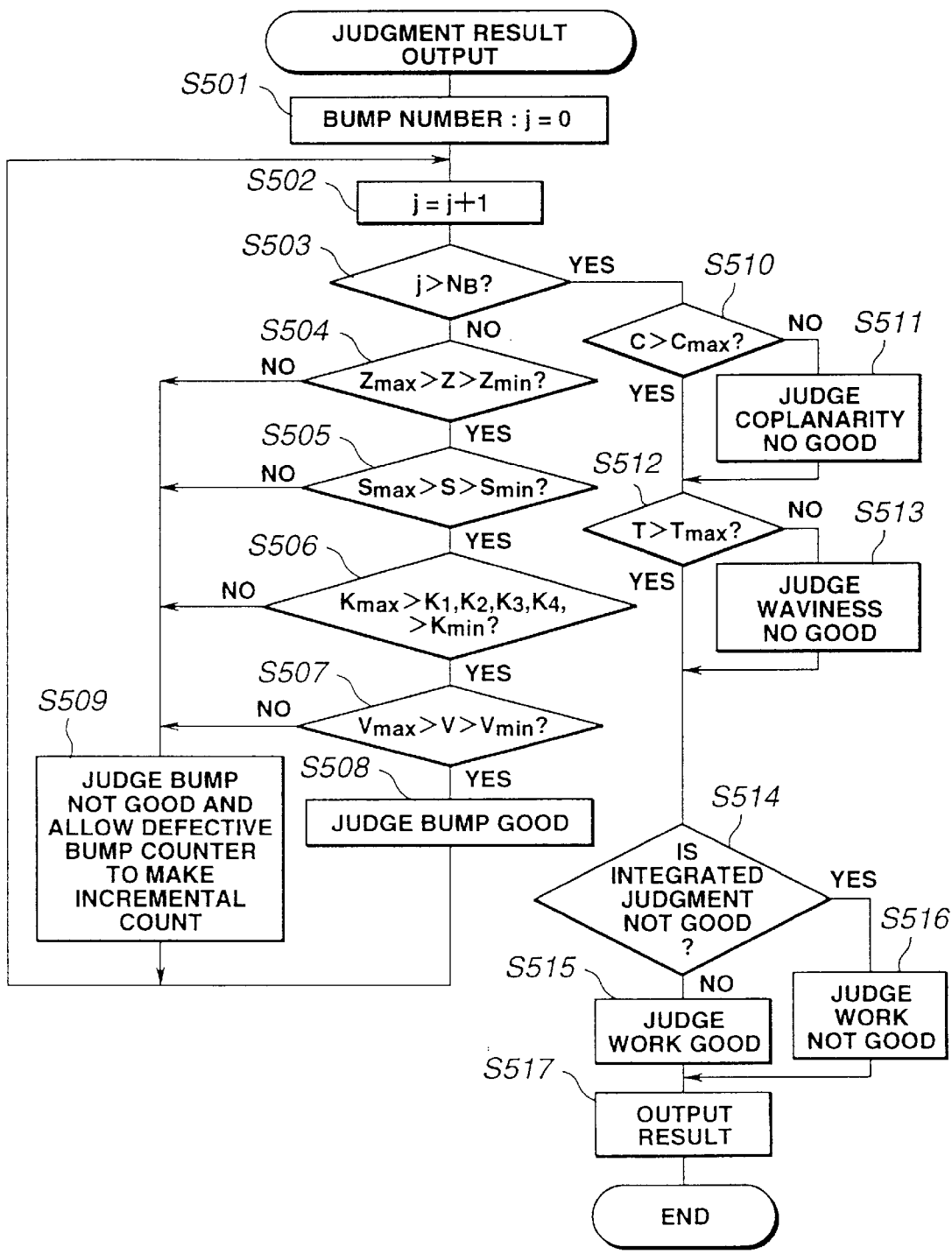
FIG. 33 is a flow chart of details of the judgment/result output process of FIG. 24.

In FIG. 24, the control proceeds to the judgment/result output process at S5. The flow of the process is shown in FIG. 33. Firstly, since data on acceptance ranges of various inspection parameters which are the objects of judgment (herein, D, Z, S, K1–K4, C) are stored in the inspection standard data memory section 94d, one for each circuit board 1 article number, so the data for a corresponding article number is read. In the process steps S501–S509 in FIG. 33, when the parameters D, Z, S and K1–K4 of the aforementioned inspection parameters obtained for all of the solder bumps of the work are within the acceptance range, it is judged that the bump is good or non-defective, and when not, it is judged that the bump is not good or defective. The result of judgment is stored in the inspection result data memory section 94e in FIG. 19 in such a manner as to be associated with the data of each bump (in FIG. 19, good or non-defective is indicated by ○ and not good or defective is indicated by x). Further, at S509, the number of defective bumps detected is counted by the use of a defective bump counter $N_D$ and is stored in the inspection data memory section 94e. The work with a defective bump or solder bumps which are of such a number equal to or larger than a predetermined value (in this embodiment, for example, 1) is judged as bad (x), and the work with a bump or bumps which are of such a number less than the predetermined value is judged as good (○).

When such judgment as described above is carried out on all of the solder bumps and completed, the process proceeds from S503 to S511 to carry out judgment on the coplanarity. That is, in case the coplanarity C measured with respect to the work exceeds a tolerance $c_{max}$, it is judged that the work is no good or defective (x), whereas in case the coplanarity C does not exceed the tolerance $C_{max}$ it is judged that the work is good (○). The result of judgment is stored in the inspection result data memory section 94e. Then, the process proceeds to S514 to carry out integrated evaluation or judgment. In this connection, in case the work has been decided as good on both the number of defective bump or bumps and the coplanarity its integrated judgment is acceptance (○), whereas in case it has been decided as bad on either of the judgments its integrated judgment is rejection. The result is also stored in the inspection result data memory section 94e. The above results are outputted from, for example, a monitor 98 or printer 102 in FIG. 5 on the basis of memory contents of the inspection data memory section 94e (S512). By the above process steps, the judgment/result output process is completed. Such process steps S1–S7 in FIG. 24 are carried out for each of the inspected works in sequence, and when the process steps for all the works are finished the data analysis/inspection judgment process is completed.

Referring now to FIGS. 39A to 52, a display of an inspection result will be described. Firstly, the display is executed by means of the monitor 98 shown in the block diagram of FIG. 5. The CPU 86 carries out the display control by way of a monitor control section 96 on the basis of a display control program stored in a memory section 94f of the memory 94. In the meantime, the monitor 98 functions as the following means in the appended claims, i.e., a height value distribution display means, an individual bump mapping image enlarged display means, an inspection information content display means, a detection information-by-position display means, and a work arrangement display means. Further, the CPU 86 functions a bump quality (good/no good) judging means, a defective bump position display control means, a defective bump existing region enlarged display means, a work quality (good/no good) judging means, a defective work display control means, and a measurement system drive control means. Further, the mouse (pointing device) 100b serves, together with the CPU 86, as a defective bump existing region selecting means and an individual bump selection region setting means.

Figure 41A:
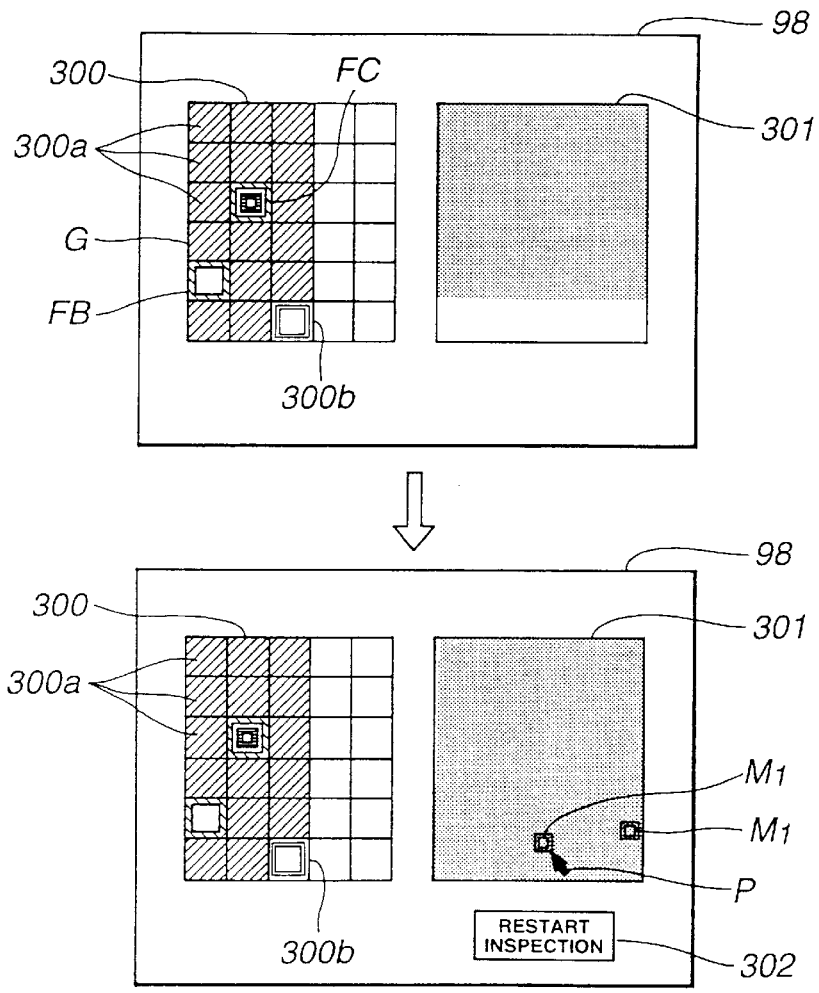
FIGS. 41A and 41B are illustrations of a display format of a judgment result display window and a height value distribution display window.
Figure 48:
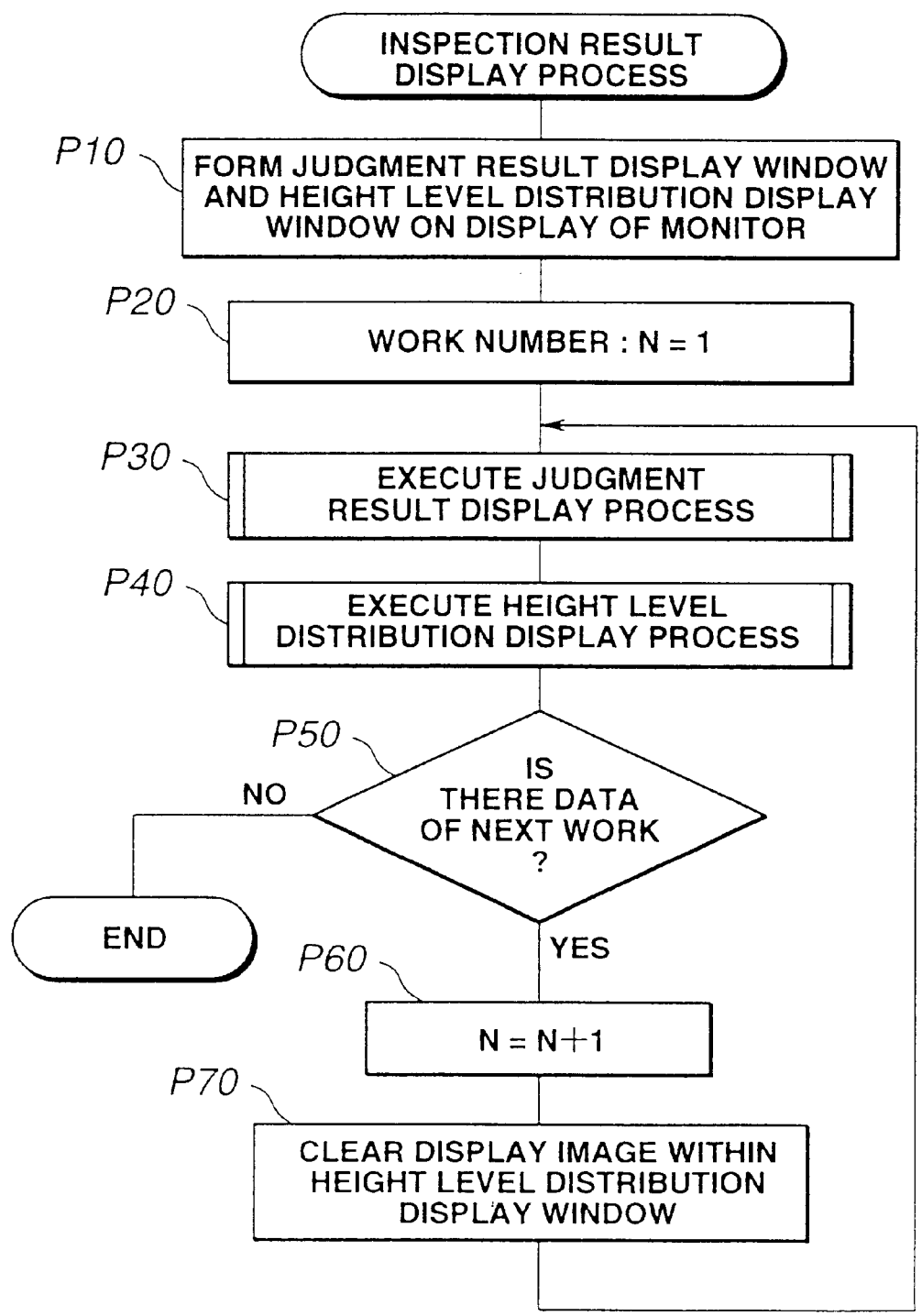
FIG. 48 is a flowchart of an inspection result display process.

FIG. 48 is a flowchart showing a flow of an inspection result display process. Firstly, at P10 and as shown in FIG. 41A, a judgment result display window 300 and a height value distribution display window 301 are displayed on the screen of the monitor 98. The judgment result display window 300 serves as a work arrangement display means, and the height value distribution display window 301 serves as a height value distribution display means. The judgment result display window 300 consists of display cells 300a which are in one-to-one correspondence to depressions 38a of the work holder 38 (i.e., works 1) to serve as individual display sections and arranged in a gridiron or checkered pattern.

Figure 49:
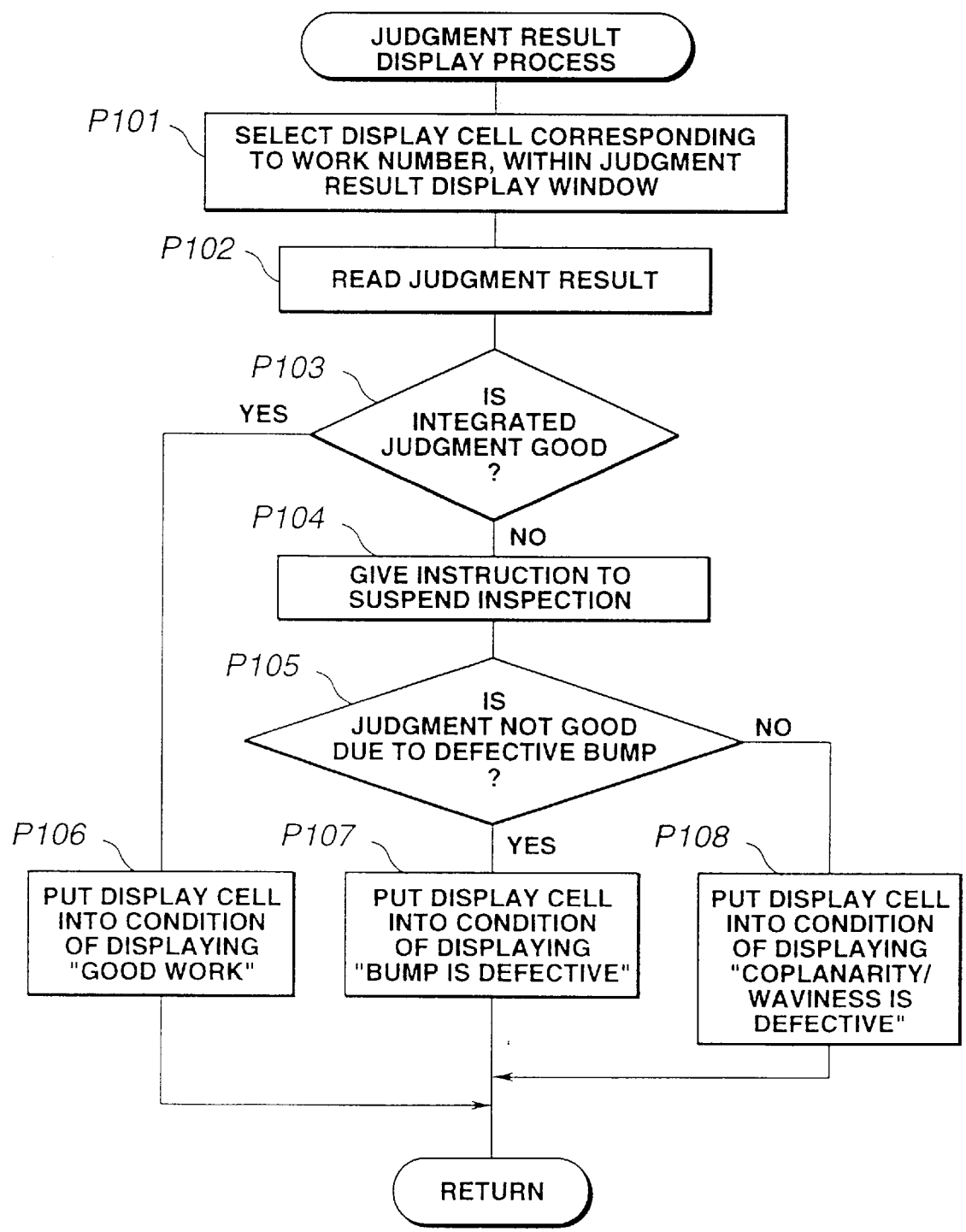
FIG. 49 is a flowchart of a Judgment result display process.

FIG. 49 is a flowchart showing a flow of a judgment result display process. Firstly, at P101, one of the display cells 300a within the judgment result display window 300, which corresponds to an object to be processed at the present time (hereinafter will be referred to as current work), is selected. In this embodiment, in case the result of judgment on the current work is not known, a marker 300b is displayed within the selected display cell, as shown in FIG. 41A, so that the position of the current work can be discriminated from others with ease.

Then, the process proceeds to step P102 of FIG. 49. At step P102, when the judgment result has been produced, it is read from the inspection result data memory section 94e. In the event the integrated judgment is acceptance (○), the process proceeds to step P106 where the display cell is put into a display condition of indicating "good work" (i.e., in FIG. 41A, a display condition indicated by G, for example, a display condition attained by painting out the display cell bright green). On the other hand, in the event the integrated judgment is no good (X), the process proceeds to step P104 where an instruction to suspend inspection is transmitted to the measurement system control section 51 of FIG. 5.

Figure 23:
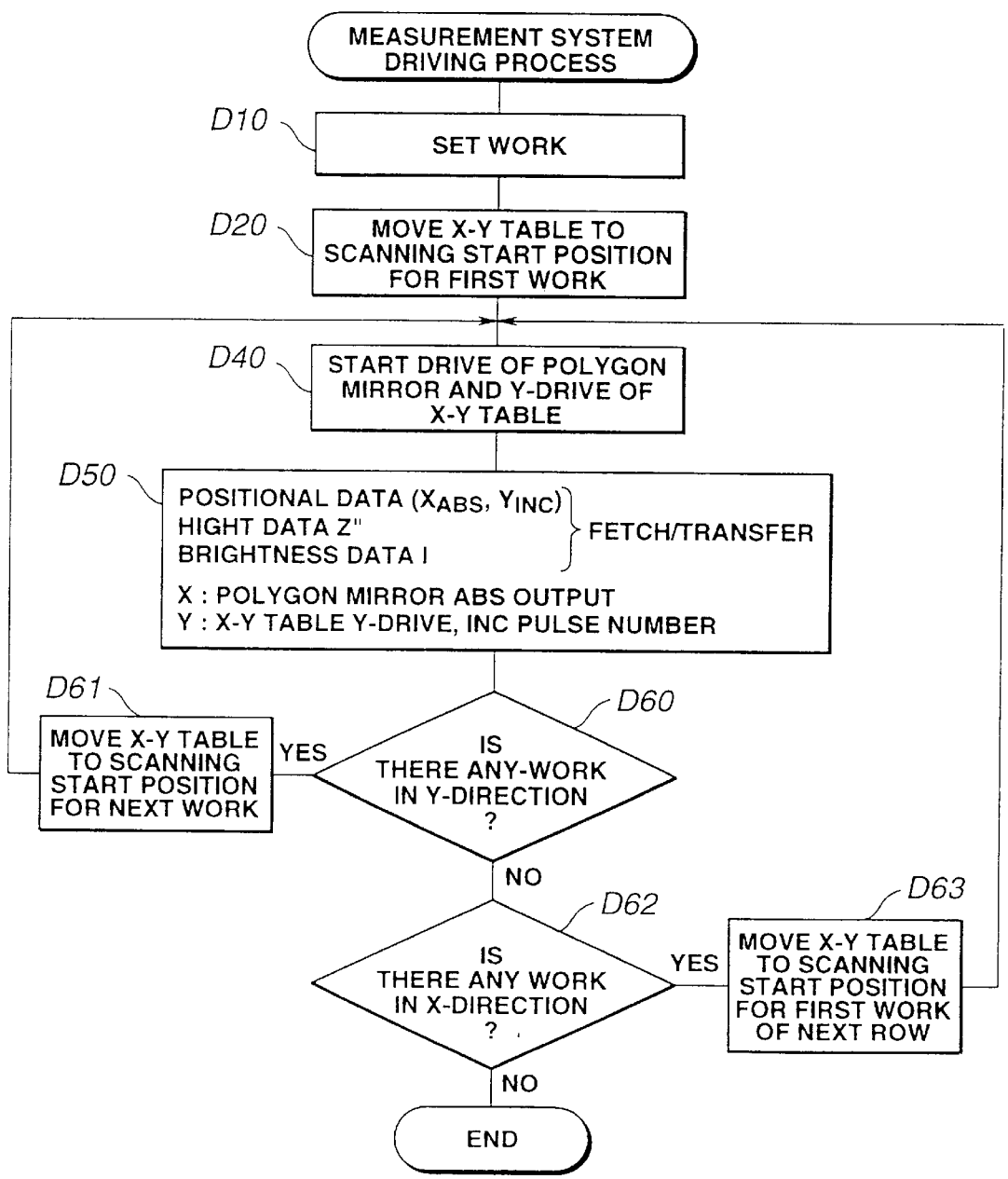
FIG. 23 is a flowchart of a control process for a drive section of the measurement system of FIG. 2.
Figure 54:
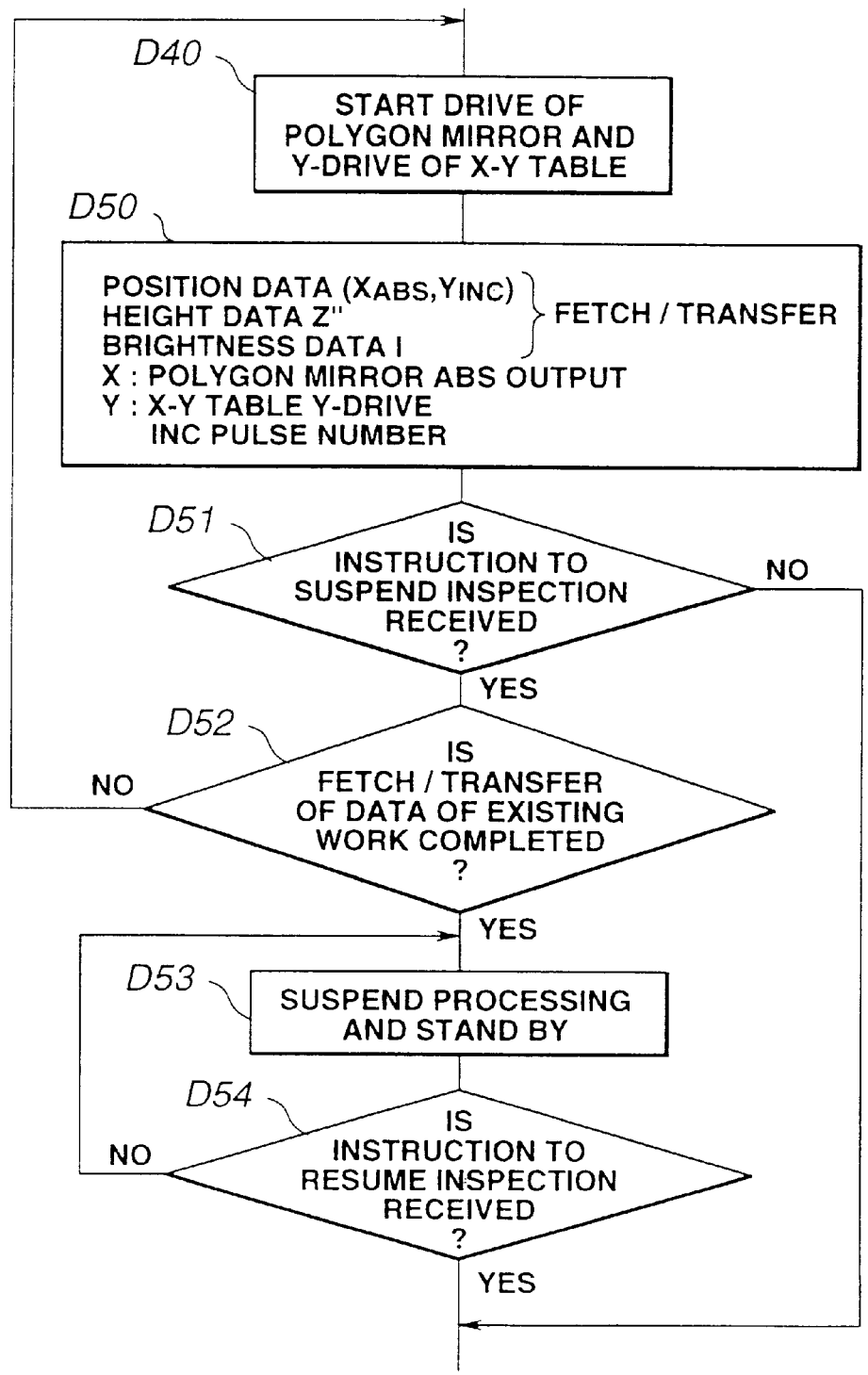
FIG. 54 is a flowchart which is a modified portion of the measurement system driving process of FIG. 23 and which is executed for suspending an operation in case a defective work is found.
Figure 55:
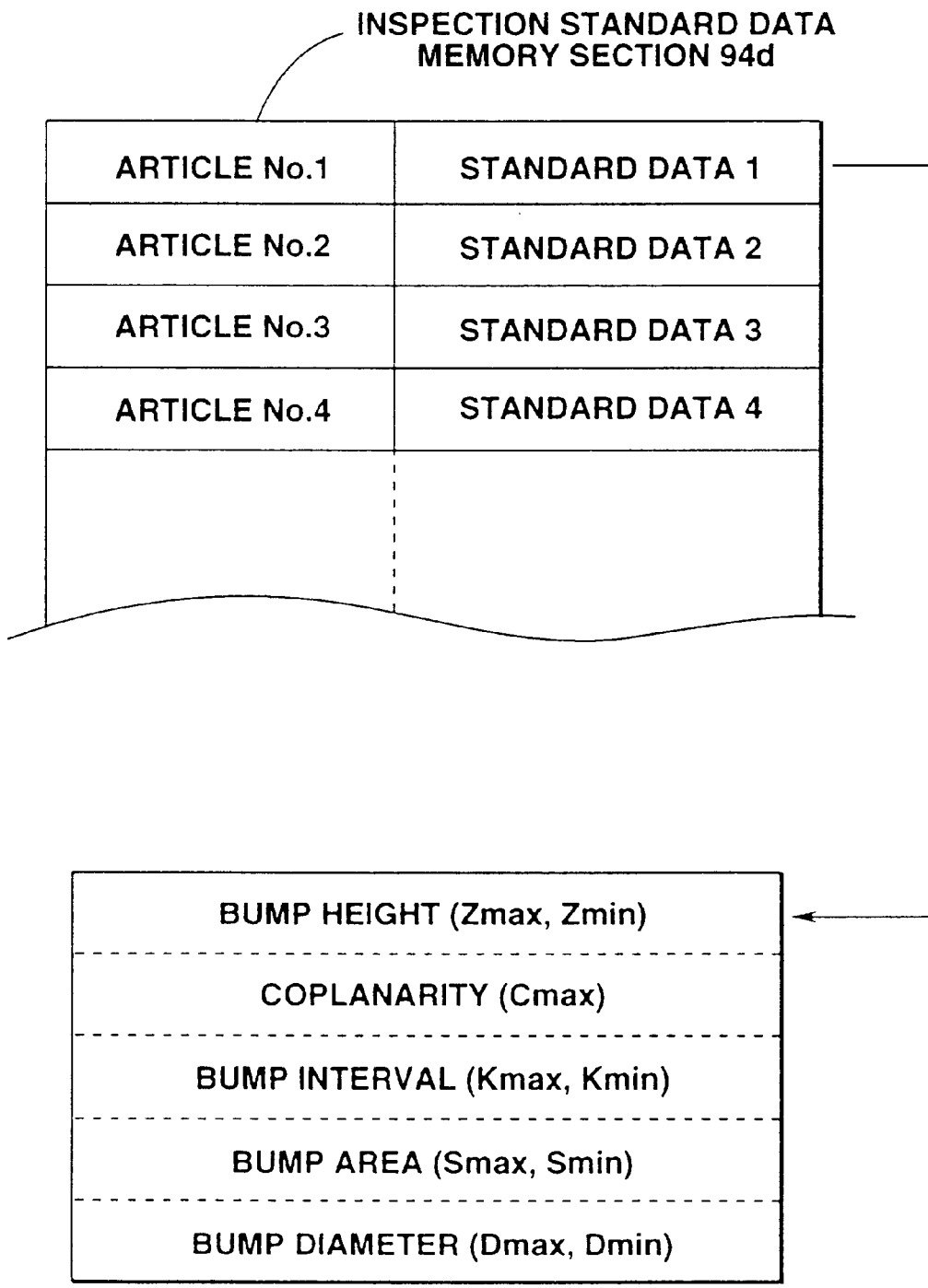
FIG. 55 is a view similar to FIG. 9 but shows a content of a modification of the present invention.
Figure 56:
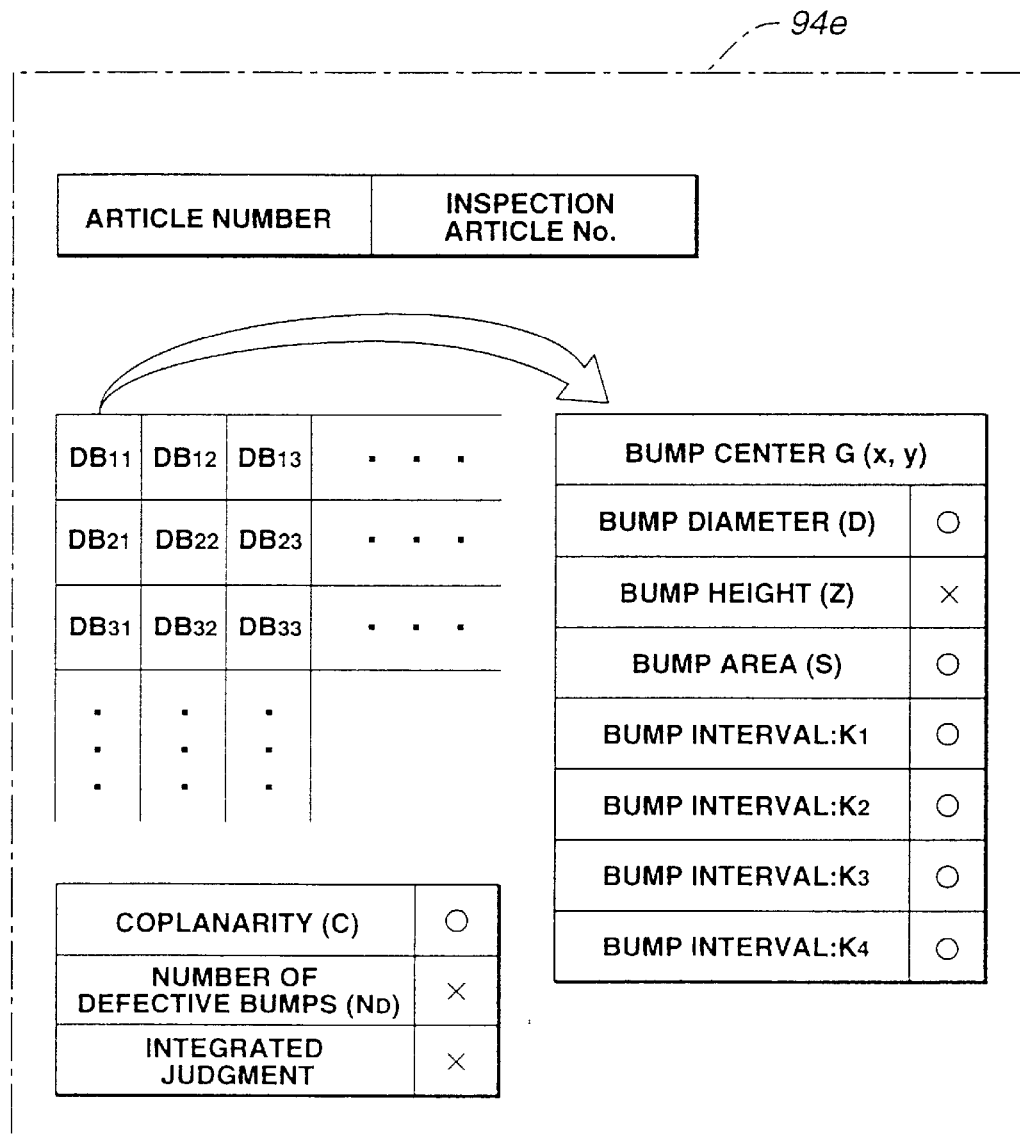
FIG. 56 is a view similar to FIG. 19 but shows a modification of the present invention.
Figure 57:
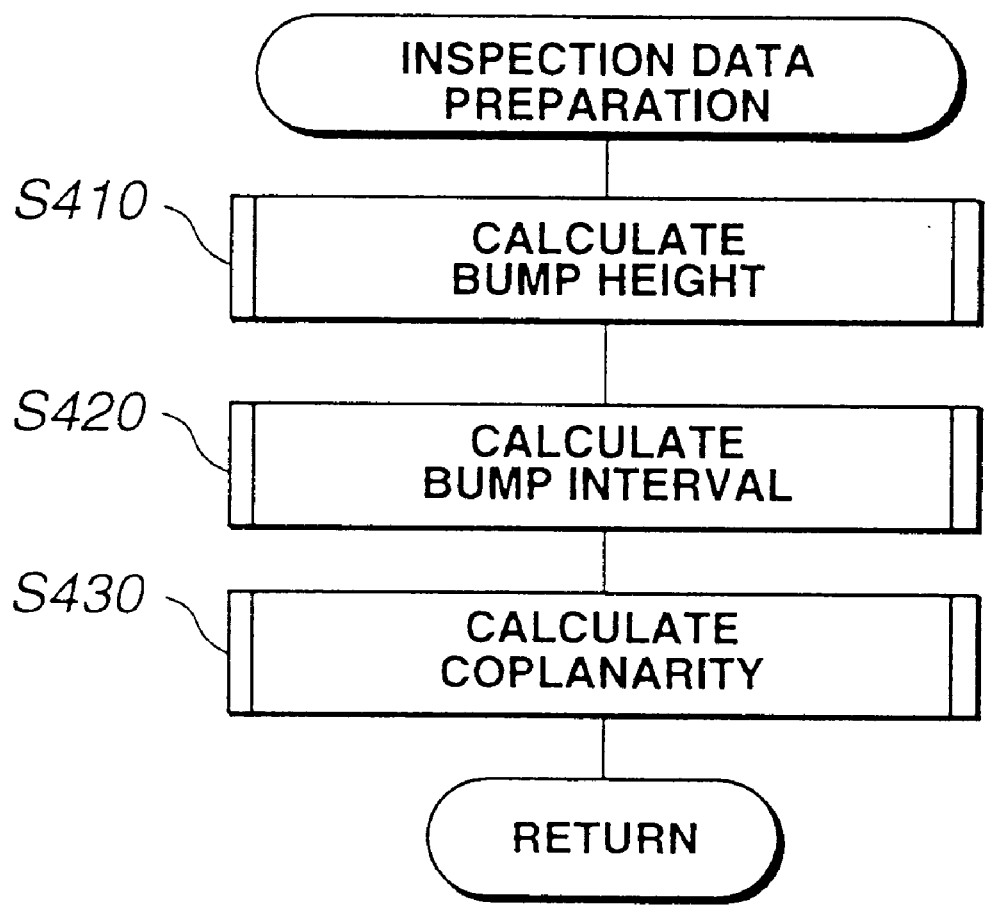
FIG. 57 is a view similar to FIG. 27 but shows a modification of the present invention.
Figure 58:
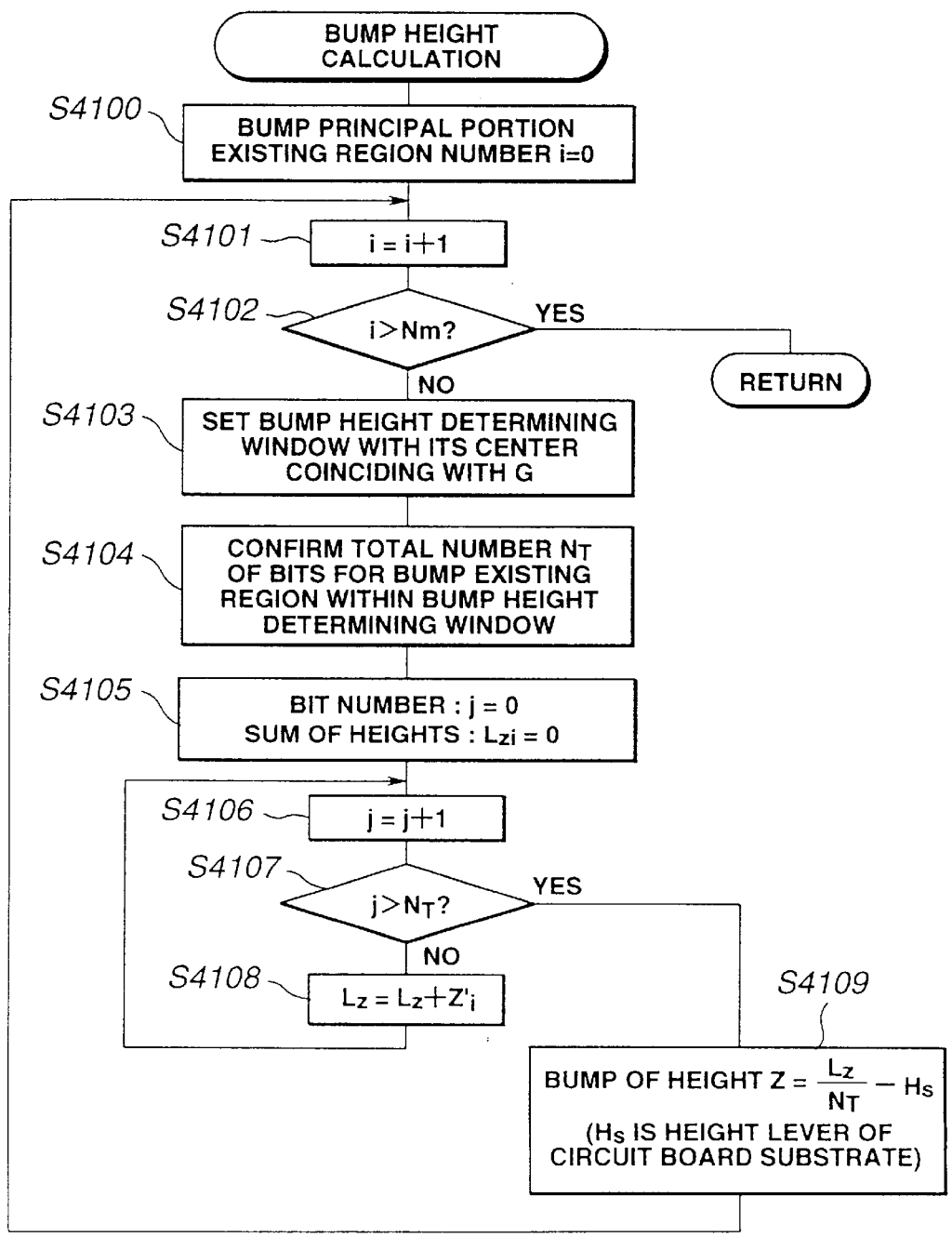
FIG. 58 is a flowchart similar to FIG. 28 but shows a modification.
Figure 59:
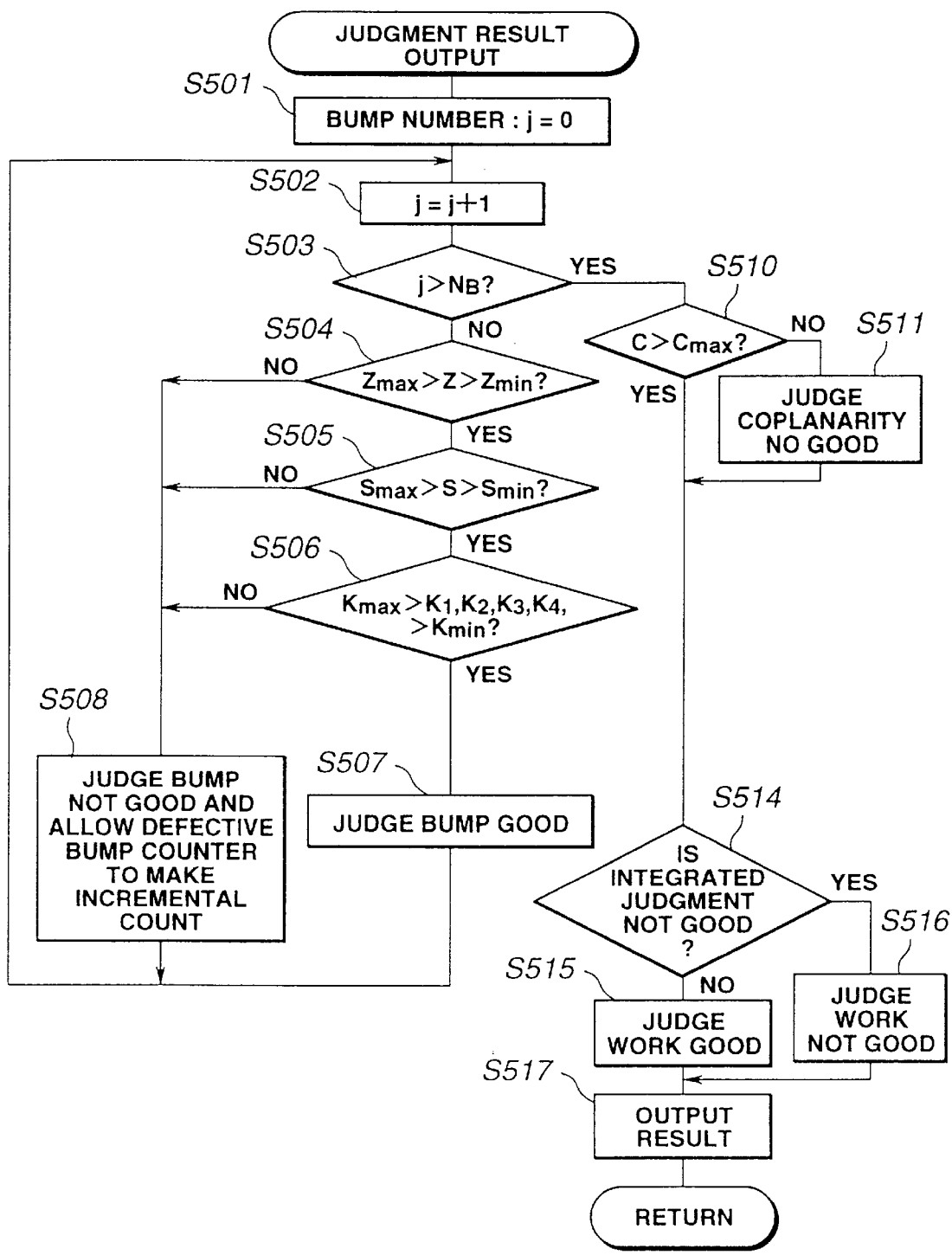
FIG. 59 is a flowchart similar to FIG. 33 but shows a modification.

In response to the instruction, there is executed on the measurement system control section 51 side such a process that is substantially similar to that shown in FIG. 23 except that the steps D40 and D50 are replaced by the steps D40 to D54 of the process of FIG. 54. That is, at D51, when the instruction to suspend inspection is received, the polygon mirror drive and y-drive of the x-y table 40 for beam scanning at D40 and the data fetch/transfer process at D50 are continued until the process for the work now subjected to measurement is finished, and then the process proceeds to step D53 for standby. At step D54, the suspended condition is maintained until an instruction to restart inspection is received. In the meantime, at D51, in case an instruction to suspend inspection is not received, the steps D52 to D54 are skipped and the process proceeds to step D60 onward.

Returning to FIG. 49, at step P105, it is confirmed on the basis of the judgment result data in the inspection result data memory section 94e whether the integrated judgment of no good is due to occurrence of a defective bump or not. When it is due to occurrence of a defective bump, the process proceeds to step P107 where the corresponding display cell 300a is put into a display condition of indicating "bump is defective" (i.e., in FIG. 41A, a display condition indicated by FB, for example, a condition in which the cell is surrounded by a red frame). On the other hand, in case the integrated judgment of no good is not due to occurrence of a defective bump but due to occurrence of a defect of a coplanarity, background (circuit board substrate surface) or waviness value, the process proceeds to step P108 where the display cell 300a is put into a display condition of indicating "coplanarity/waviness is defective" (i.e., in FIG. 41A, a display condition indicated by FC, for example, a dual-frame consisting of a blue frame section and a red frame section is displaced in the cell).

Figure 50:
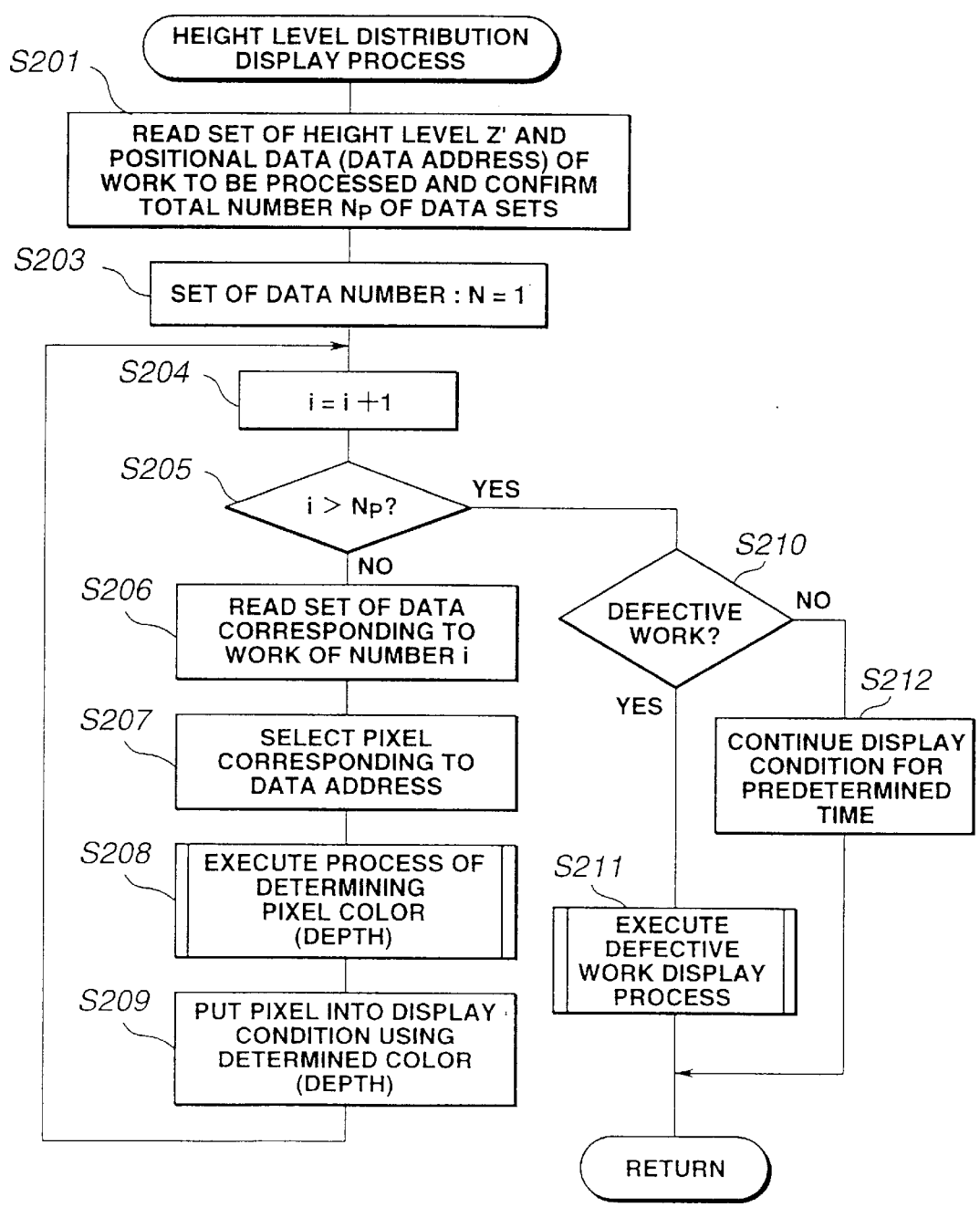
FIG. 50 is a flowchart of a height distribution display process.

Then, the height distribution display process in FIG. 50 is executed. Firstly, the corrected height level value data z' (FIG. 12B) of the work which is an object to be displayed, is read in a way as to form a data set together with the position data described in the form of data address, sequentially (P206). One of the pixels within the height distribution value display window 301, which corresponds to the data address of the read data set, is selected (P207), and it is determined, in case, for example, the monitor 98 is a color monitor and is set to a color display mode, the color of the pixel (P208). However, the display can be done on the basis of light and dark (i.e., density) of gray color, and in such a case the density or brightness of the pixel is determined at step P208. Hereinbelow, description will be made by way of example to a color display.

Figure 40:
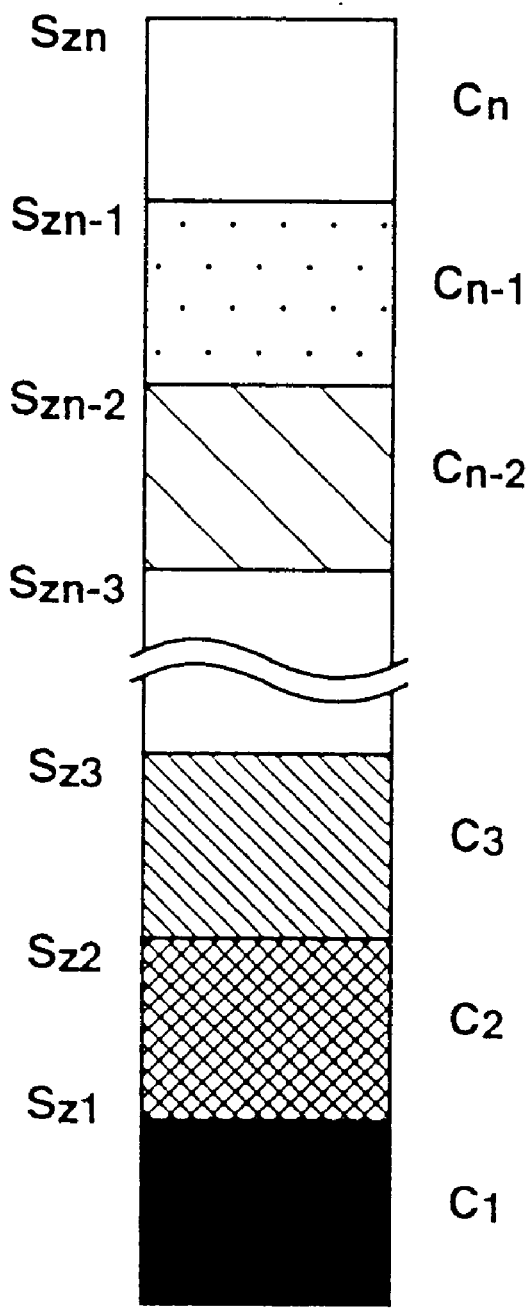
FIG. 40 is an illustration of a relation of threshold levels set for height ranges and predetermined colors of pixels.
Figure 51:
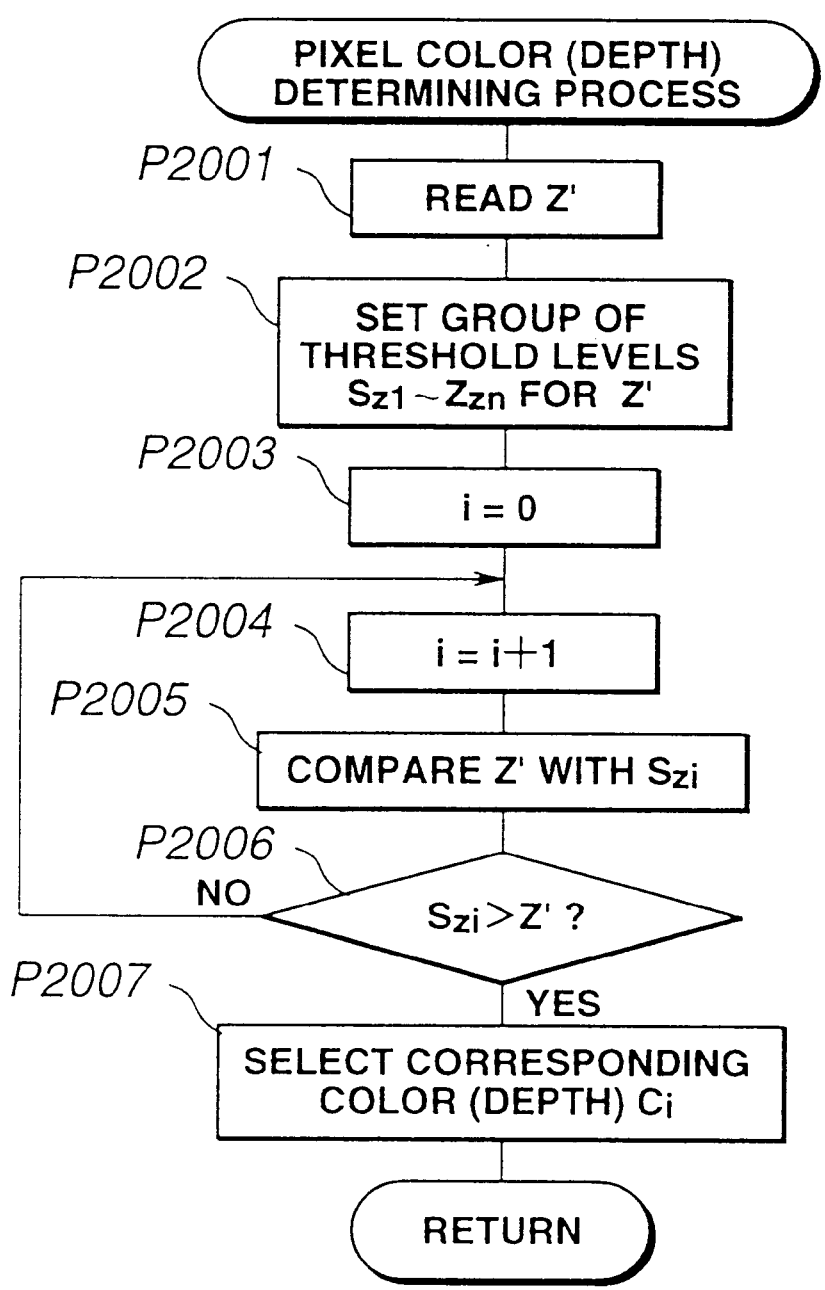
FIG. 51 is a flowchart of a pixel color (depth) determining process.

FIG. 51 is a flowchart showing a flow of a pixel color determining process. That is, as shown in FIG. 40, the ranges of height level values are defined by setting a group of threshold levels Sz1, Sz2, . . . Szn (P2002), and colors (density) C1, C2 . . . Cn different from each other are allotted to the height level value ranges, each of which is defined between adjacent two of threshold levels. At P2001, the height level value z' is read, while at the same time the read value is compared with the threshold levels sequentially to find a corresponding height level value range and a corresponding color (P2003–P2006).

Figure 42A:
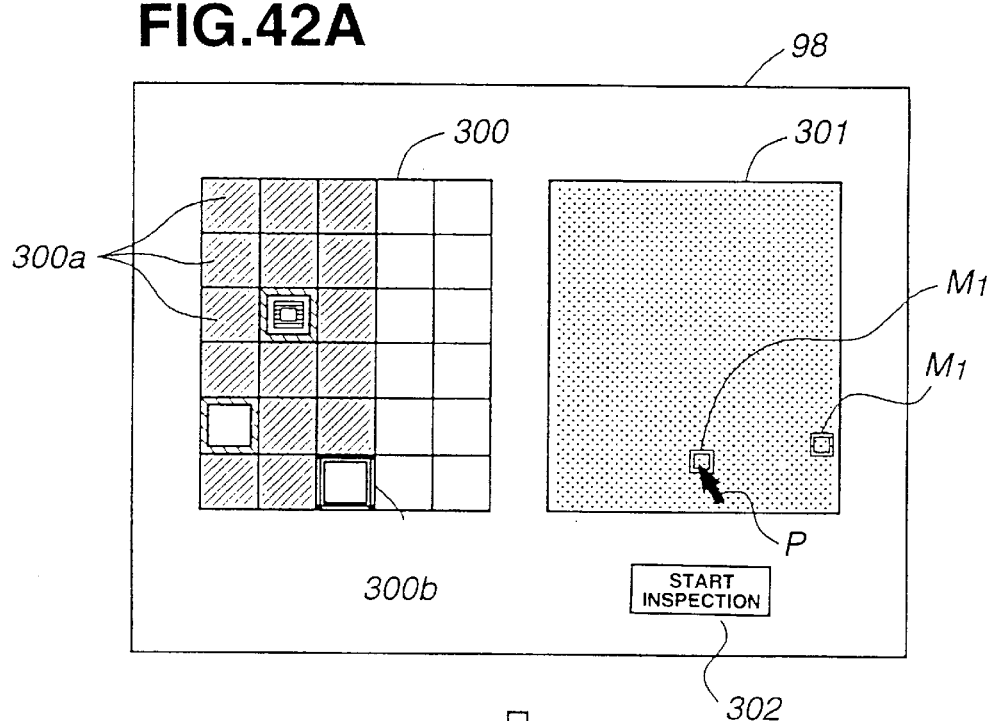
FIGS. 42A and 42B are illustrations of an operation for instructing enlargement on a height value distribution display window and an enlarged display of mapping image.

Returning to FIG. 50, the pixel is put into a condition of display by means of a determined color (P209). This process is repeated for the data sets which are read in sequence, whereby as shown in FIG. 41A or 42A, the distribution of height levels at respective positions within the inspection surface are displayed by color mapping within the height distribution value display window 301. In the meantime, in FIG. 42A, within the height distribution value display window 301, the mapping image is displayed in such a magnification that the entire inspection surface CP can be displayed.

Then, the process proceeds to step P210. At step 210, when the work is defective (e.g., defective in bump or in coplanarity/waviness value), the control proceeds to step P211 where the monitor 98 is put in a defective work display monde. On he other hand, when the work is good, the process proceeds to step P212 where a process of continuing the display condition of displaying the mapping image for a predetermined time. In this connection, since the step P104 in FIG. 49 for giving an instruction to suspend inspection is skipped, the measurement process is continued as it is, to allow, if the next work to be processed exists, the process to proceed, in FIG. 48, from P50 to P70 by way of P60 to clear the display within the height distribution value display window 301. Thereafter, the process returns to P30 to repeat the process P30 onward.

Figure 52:
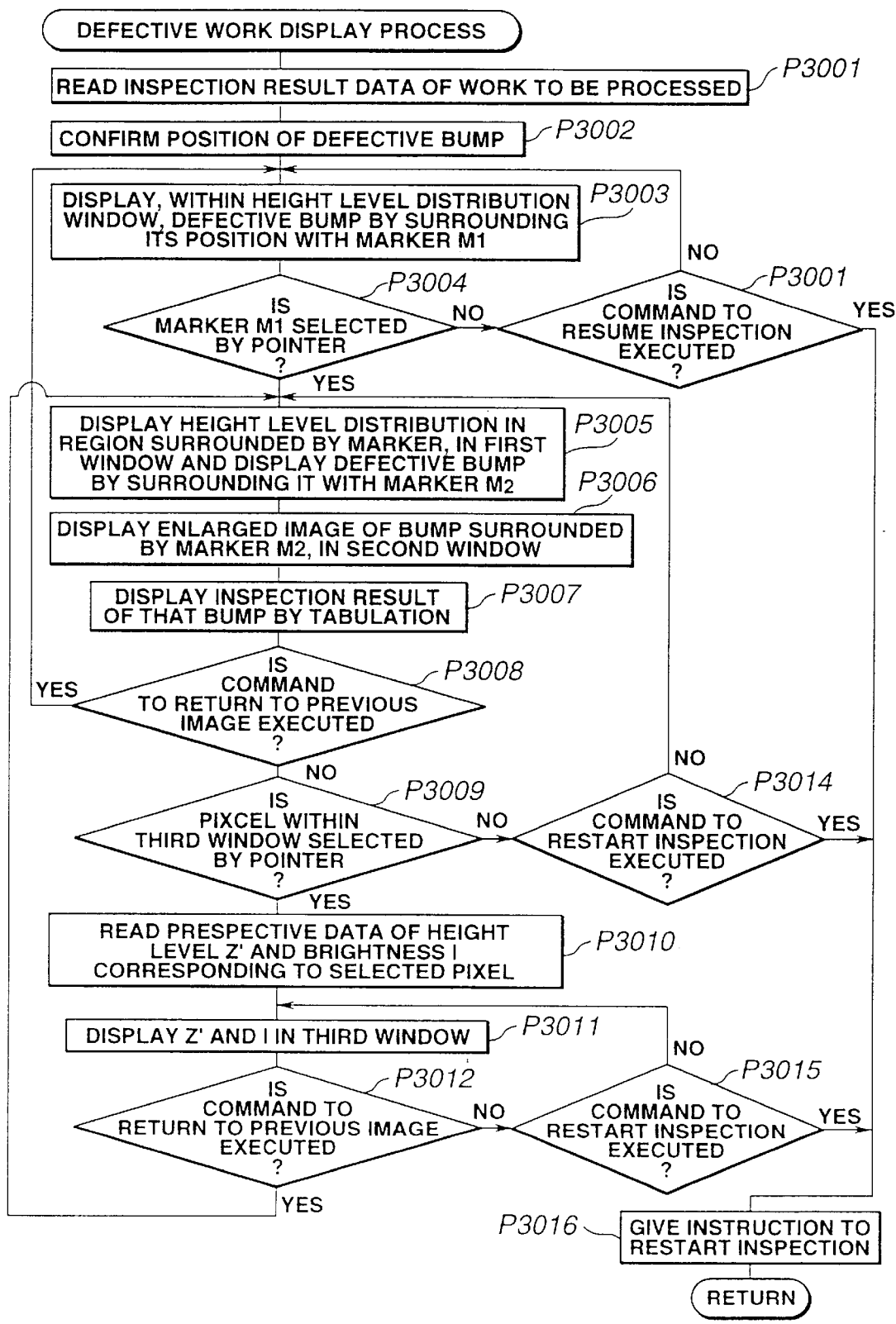
FIG. 52 is a flowchart of defect display process.

On the other hand, in case the defect display process at P211 is executed, various manipulations of image shown in FIG. 52 can be attained under the condition where the measurement process is suspended. Firstly, at P3001 the inspection result data of the corresponding work is read from the inspection result data memory section 94e (FIG. 19), and at P3002 a position of a defective bum is confirmed. Then, the process proceeds to step P3003 where, as shown in FIGS. 41A and 42A, a region of a predetermined area including the position of the defective bump is surrounded by a maker M1 on the mapping image displayed in the height distribution value display window 301, for thereby displaying the position of the defective bump. In the illustrated example, defective bumps are caused at two places, and the region surrounded by each marker M1 corresponds to an enlargement designating region. In the meantime, in place of or in addition to surrounding the region by the marker, inversion of the display color within the region or the like method of changing the display condition can be done. On the other hand, a pointer P which is movable on a display or screen by the operation of the mouse 100b in FIG. 5 is displayed within the height distribution value display window 301.

Then, in order to display an enlarged defective bump, the position indicated by the pointer P is put within the marker M1 and a selection command is executed by clicking a mouse button which is not shown (P3004). By this, the process proceeds to step P3005, the display image of the monitor 98 is cleared and changed into one shown in FIG. 42B. In this display image, there are shown three windows, i.e., a first window 303, second window 304 and a third window 305.

Within the first window 303 of those, there is displayed the region (enlargement designating region) surrounded by the marker M1 in the previous display image (FIG. 42A), which is enlarged, for example, in such a manner as to occupy almost all of the display region of the window 303, and further there is displayed a region of a defective bump which is surrounded by a marker M2 (P3005). The region surrounded by the marker M2 corresponds to an individual bump selection region. On the other hand, within the second window 304, there is displayed a mapping image of the region surrounded by the M2 and therefore a mapping image of the bump within that region, which is enlarged in such a manner as to occupy almost all of the display region of the window 304 (P3006). Within the third window 305, there is displayed an inspection data of the bump represented by the thus enlarged mapping image, which is read from the inspection result data memory section 94e (FIG. 19), e.g., numerical values such as the above described D, Z, S, K1–K4, V, C, TA, etc. are read from the inspection result data memory section 94e and shown (P3007). In the meantime, a judgment result may be displayed in addition to such numerical values.

For example, description being made by way of example to the second window 304, the height levels at the respective positions on the inspection surface can be known or recognized on the basis of the color or density of the respective pixels within the window, for example, a region corresponding to a bump top face is represented by a display region which is nearly equal in color since a variation of the height level within the region is not so large if the bump is normal. Further, around the bump top face region, there is formed a silhouette region which lacks a data of height level value as described before (in the illustrated example, the silhouette region is shown as a region whose height level is nearly zero). Outside the silhouette region, there appears a background region, which is lower in height level than the bump top face, in the color different from that of the bump top face. In this manner, from the color distribution on the mapping display, the bump existing region and the background region can be distinguished from each other with ease.

Further, in case the height level of the bump top face is too high or too low, the corresponding bump top face region appears in the color different from that of other normal bump top face regions, so such abnormality can be distinguished or recognized with ease. On the other hand, in case the bump top face region (or bump principal portion existing region) is not normal, i.e., the bump is abnormal in diameter, the bump top face region appears in the area different from that of the normal bump, so such abnormality can be distinguished with ease. Further, in case an abnormality due to a flaw or the like occurs in the bump top face, the abnormal portion appears in the same kind of color as the silhouette region since irregular reflection of the inspection beam occurs at that abnormal portion to cause the abnormal portion to lack the data of height level values, so such abnormality can be also distinguished with ease.

Further, since display of the height level values by mapping is also made as to the surface of the circuit board substrate, i.e., the background region, even macroscopic warping or waviness of the circuit board substrate surface can be recognized with ease on the basis of the difference in color when the surface of the circuit board substrate is displayed in such a condition by means of the height distribution value display window 301 of the low magnification as shown in FIG. 42A. In this manner, the height level values at respective positions are displayed by color mapping, so it becomes possible to grasp quite intuitively the information on the bump formed condition and undulations of the circuit board substrate surface.

Figure 42B:
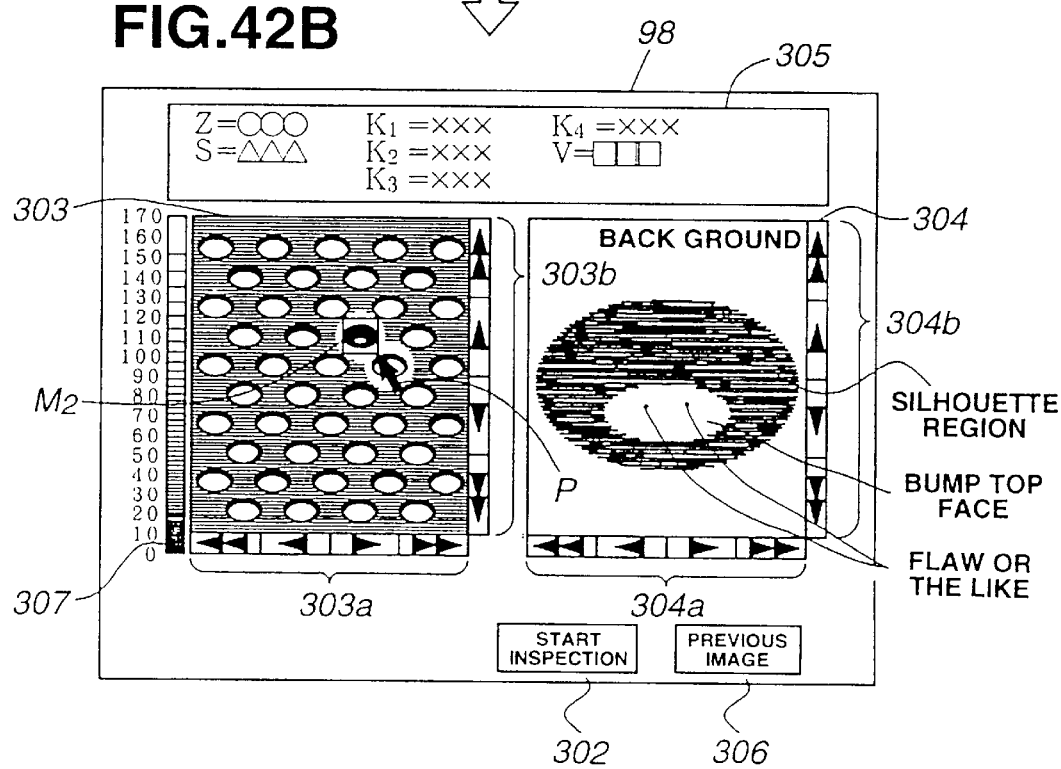

In the meantime, in FIGS. 42A and 42B, the data sampling distance in the y-direction is made larger than that in the x-direction, for thereby reducing in number the fetch data sets, while on the other hand the display on the screen is constructed so that the number of pixels per unit length so as to be the same both in the x-direction in which the sampling interval is dense and in the y-direction in which the sampling interval is course, so the silhouette region and the bump top face region corresponding to each bump appears in the form of an oval shape which is contracted in the y-direction. However, by making larger the magnification of display in the y-direction, it becomes possible to attain a circular display form corresponding to an original bump plane figure.

In the meantime, as shown in FIG. 42B, in order to enable, for either of the first window 303 and the second window 304, scroll of a mapping image within the window, there are provided scroll buttons 303a, 303b, 304a and 304b which are operated by mouse click by way of a pointer P, for the purpose of convenience of an operator who makes reference to the condition around the defective bump. Further, it is displayed a height scale 307 which represents a relation between the display color of the respective regions on the mapping image and the height level.

Figure 43A:
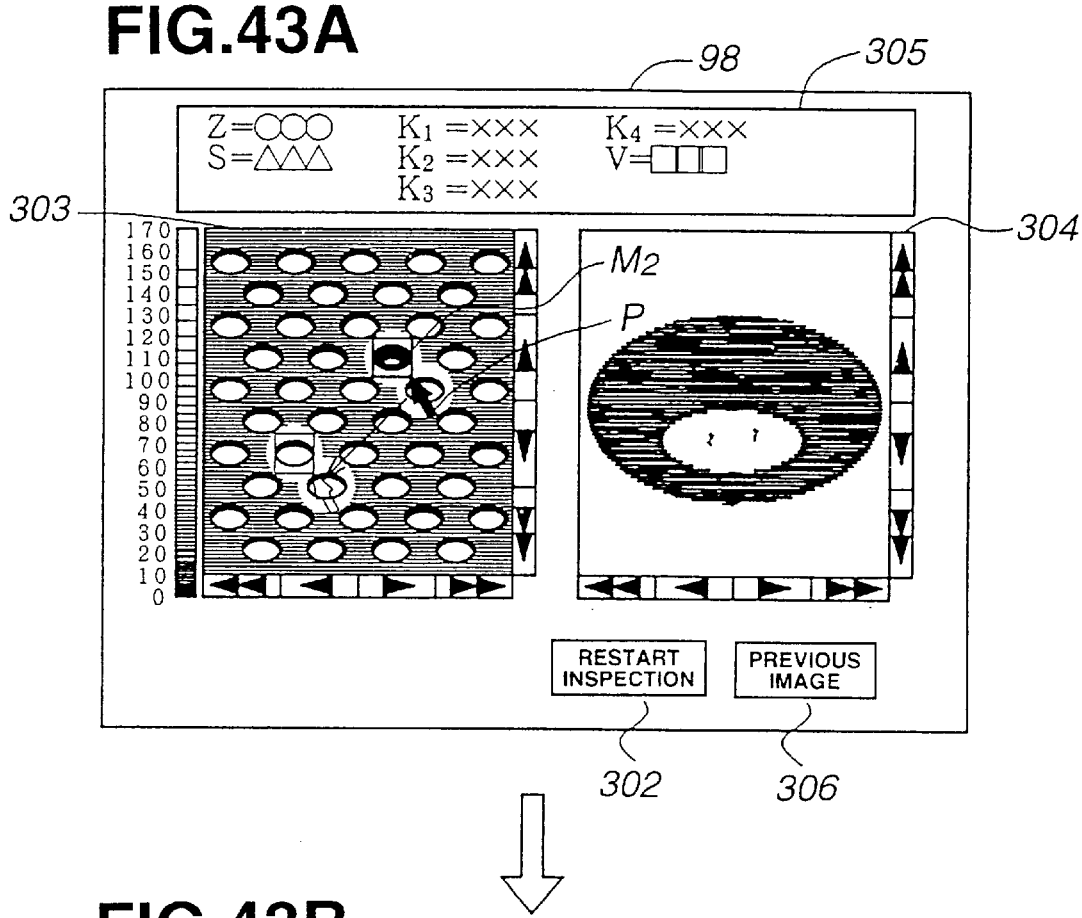
FIGS. 43A and 43B are illustrations of an operation for moving an enlarged display region and display of data by clicking a pixel on a mapping image.

Further, as shown in FIG. 43A, it is adapted that the marker M2 within the first window 303 can be moved into a position on the mapping image, where the marker surrounds a desired bump, by a drawing operation of the mouse 100*b* (FIG. 5). Though such a drawing operation is a known technique, it can be carried according to the following process. Firstly, the position indicated by the pointer P is positioned within the marker M2 by the operation of the mouse. Under this condition, by pushing a mouse button which is not shown, it is established a condition where the marker M2 is selected. Then, by moving the mouse with its button being held pushed, an image display processing is performed so as to allow the marker M2 to move following the pointer P. When the marker M2 is moved into a desired bump region, the mouse button is released, whereby the marker M2 is placed at that position and definitely held thereat.

As the marker M2 moves, an enlarged mapping image of an area indicated by the marker M2 having moved or having shifted its position is displaced within the second window 304. By this, a mapping image of a desired region within the first window 303 (i.e., a desired bump) can be displaced while enlarging it.

Figure 43B:
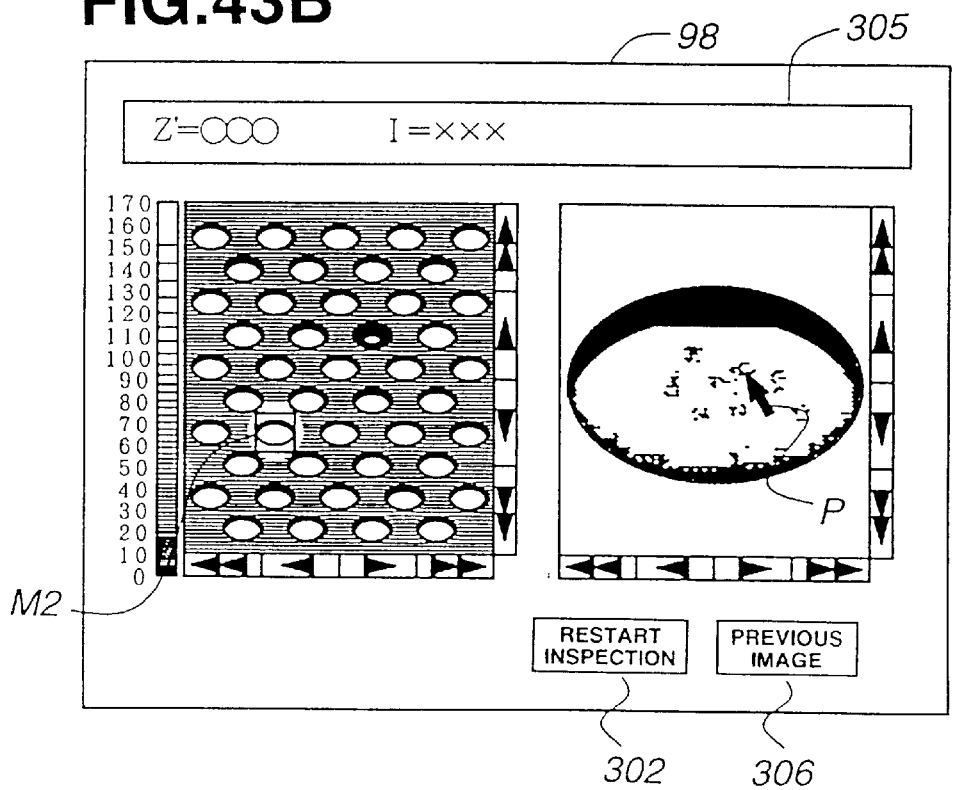

Further, it is adapted that, as shown in FIG. 43B, in the enlarged image within the second window 304 (individual bump selection region), the pixels corresponding to the respective data sets can be selected by means of the pointer P individually. This selection can be executed by, for example, placing the position indicated by the pointer P upon a desired pixel position and performing mouse click. By this operation, there is displayed within the third window 305 the height value Z' and the reflected beam brightness I which are read from the corrected data memory section 94*b* in FIG. 5 or FIG. 12B (P3009–P3011 in FIG. 52).

In the meantime, on the display image of the monitor 98 shown in FIG. 42B, there is formed a previous image selecting button 306. By operating this button, a previous or preceding image command is executed to enable returning to the image shown in FIG. 42A at any time (P3008, P3012 in FIG. 52). Further, each display image is formed with an inspection restart or resuming button 302. By performing mouse click of this button, a command to restart inspection is executed (P3013–P3015 in FIG. 52), and at P3016 an instruction to restart inspection is transmitted to the measurement system control section 51 to finish the defect display process in FIG. 52. At the same time, the height distribution display process in FIG. 50 is finished, and the process returns to P50. The process onward is the same as that for the normal work. In the meantime, when the measurement system control section 51 receives an instruction to restart inspection at D54 in FIG. 54, it is released from the processing suspension/standby condition at D53 to restart the process onward.

Figure 41B:
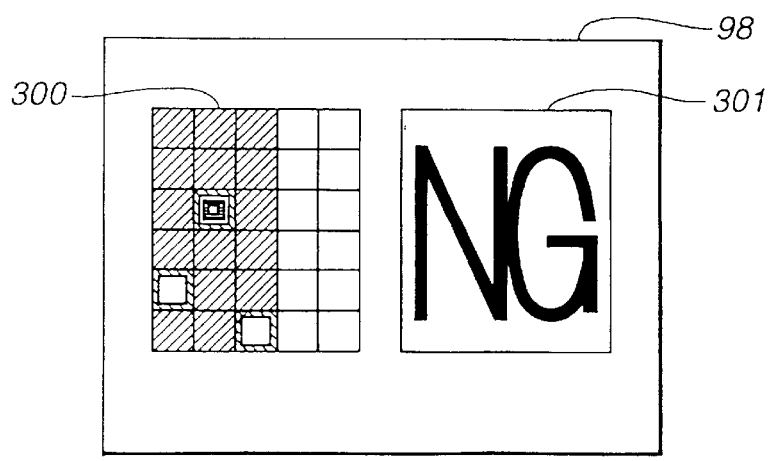

The works 1 on the work holder 38 are subjected to the above described judgment result display process in FIG. 48 (P30 and P40) in order as having finished the data analysis/inspection judgment process in FIG. 24. When the above processing of all of the works 1 on the holder is completed, the process is finished. In the meantime, it will do to continue the operation of the measurement system 10 at the time of detection of a defective work without suspending it and give only a warning of occurrence of defect. For example, it can be done, as shown in FIG. 41B, that the display within the height distribution value display window 301 is cleared and in place therefor a message (NG) indicating occurrence of defective work, or the like is displayed. Further, it will do to make a speaker (not shown) produce a warning sound. In this instance, the defect display process of FIG. 52 is executed by reading, after the inspection has been completed, a set of height level value and position data (FIG. 12B) and an inspection result data (FIG. 19) of a desired work.

Figure 44:
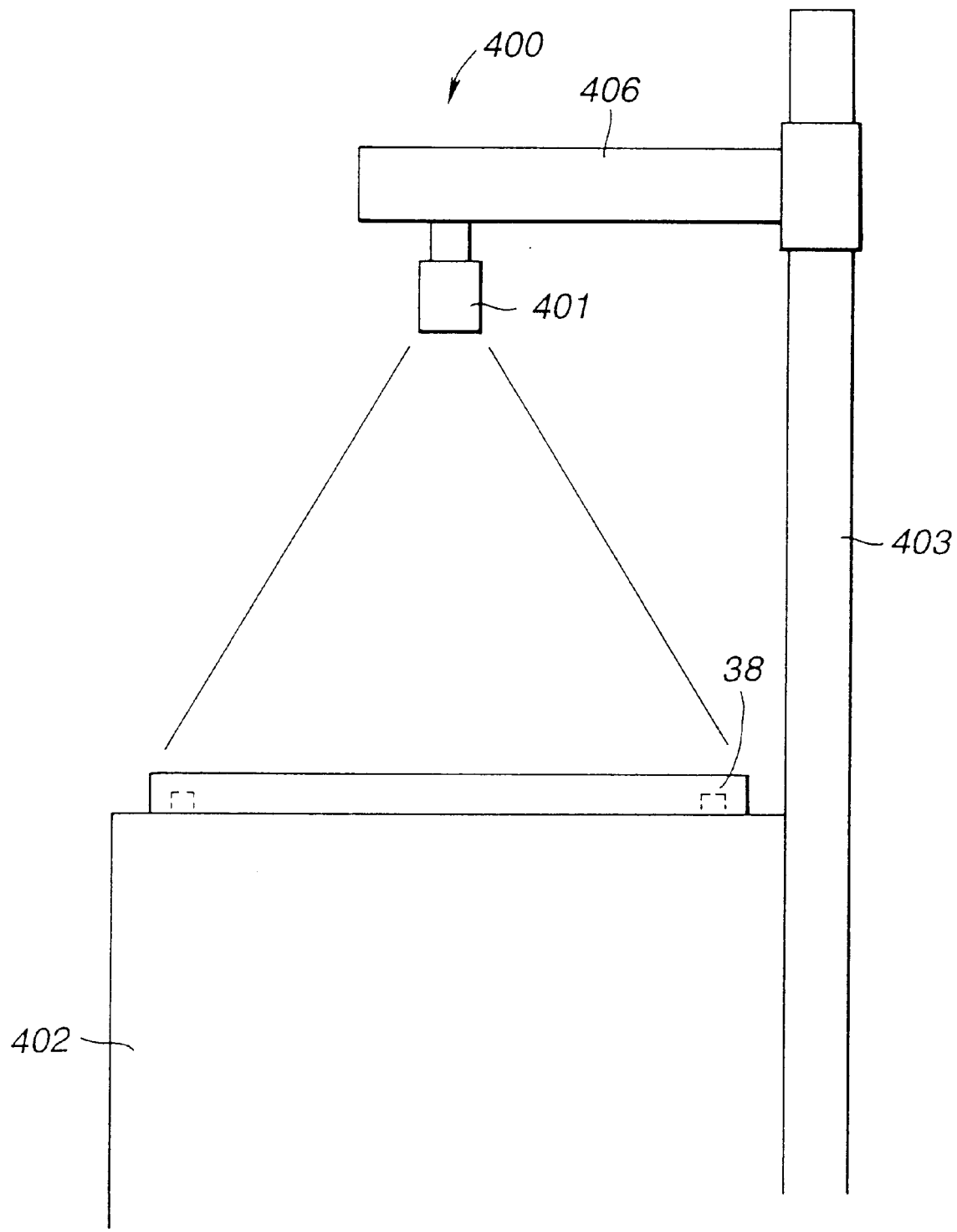
FIG. 44 is a schematic side elevation of a sorting unit.

The work holder 38 having finished the inspection is removed from the x-y table 40 (FIG. 4) and is mounted on a sorting unit 400 shown in FIG. 44. The sorting unit 400 consists of a light source box 402 on which the work holder 38 can be detachably mounted, and a CCD camera 401 attached to the light source box 402 by means of a vertical support post 403 and a horizontal arm 406.

FIG. 45 shows an internal structure of the light source box 403. The light source box 403 includes a box main body 402' having an opening 402'*b* on the upper surface side, and a light source 404 such as a fluorescent lamp disposed within the box main body 402'. The work holder 38 is position on the upper surface of the box main body 402' and attached thereto by allowing protruded engagement portions 402'*a* formed on the box main body 402' side to engage in engagement holes 38*d* formed in the work holder 38 so that the regions for arrangement of the respective works are positioned inside the opening 402'*b*. In the meantime, at a predetermined position on the upper surface side of the box main body 402', there is disposed a work holder orientation detecting sensor 405 which is constituted by a proximity switch or the like. On the other hand, at a predetermined position on the lower surface side of the work holder 38 which is made of, for example, a resinous material, there is disposed a detected metal piece 38*s*. Only when the work holder 38 is mounted on the box main body 402' in such a manner that its orientation relative to the box main body 402' is correct, i.e., in such a manner as to face correctly relative to the box main body 402', the detected metal piece 38*s* is detected by the work holder orientation detecting sensor 405, whereby it can be detected whether the orientation of the mounted work holder 38 is correct or not.

FIG. 46 shows is a block diagram of an electrical structure of the sorting unit 400. Its control portion 450 includes an I/O port 449, and a CPU 451, RAM 452 and ROM 453 which are connected to the I/O port 449, as major components. To the I/O port 449 are connected a sensor output control section 411, camera output control section 412, monitor control section 413, D/A converter 414, memory 454 such as a hard disk, the computer 82 of the data analysis section 81 and the central control unit 52 of the measurement control section 51. To the sensor output control section 411 is connected the work holder orientation detecting sensor 405. To the cameral output control section 412 is connected the above described CCD camera 401. To the monitor control section 413 is connected is a monitor 410 which serves as a work good/no good judgment result display means. To the D/A converter 414 is connected by way of an amplifier 415 a speaker 416 which serves as a warning output means. In the meantime, the CPU 451 functions as a measurement system operation control means on the basis of a control program 454*a* stored in the memory 454.

Hereinafter, the operation of the sorting unit 400 will be described by using the flowchart of FIG. 53. Firstly, at Q101, the inspection result data corresponding to the respective works 1 of the work holder 38 to be mounted, is received from the computer 82 of the data analysis section 81. At Q102–Q103, judgment on the orientation of the mounted work holder 38 is made on the basis of the detection output of the work holder orientation detecting sensor 405. When the orientation is incorrect, a warning sound is produced by the speaker 416.

Figure 47A:
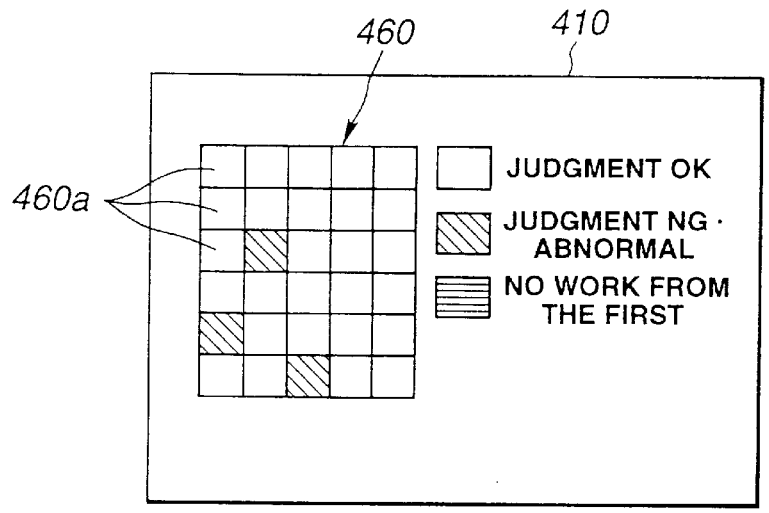
FIGS. 47A and 47B are illustrations of a display of work quality (good/no good) judgment result by a monitor of the sorting unit of FIG. 44.

Then, at Q105, a judgment result display window 460 is displayed, as shown in FIG. 47A, on the monitor 410 on the basis of the received inspection judgment result and in nearly the same format as the judgment result display window 300 already shown in FIGS. 41A and 41B. By this, the position of a defective work on the work holder 38 can be recognized. At the same time, at Q106, an operation suspending instruction (or operation inhibiting instruction) is transmitted to the central control unit 52 of the measurement system control section 51 for suspending the process when the measurement of that work holder is finished even though there is a new work holder installed on the x-y table of the measurement system 10.

Figure 47B:
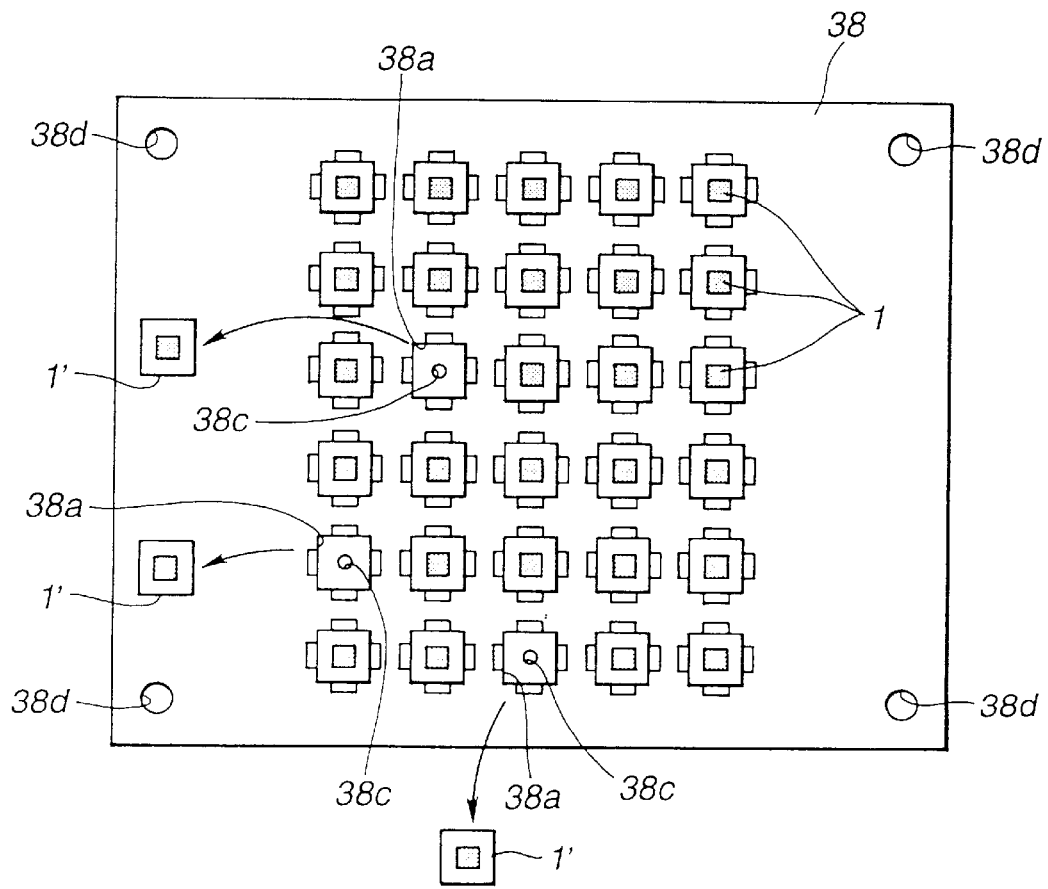

The operator removes manually or by hand a defective work from the work holder 38 as shown in FIG. 47B while looking at the judgment result display window 460 on the monitor 410. Then, as shown in FIG. 45B, at the depression 38a from which a work is removed, a light from the light source 404 penetrates the through hole 38c to leak to the upper side of the work holder 38 and is detected by the CCD camera 402 (FIG. 44). In this connection, since it is already known which one of the works 1 on the work holder 38 is defective, so judgment on whether all of the defective works are removed correctly can be done by reference to whether leaking light is detected at the positions corresponding to the defective works and at the same time the leaking light is not detected at the positions corresponding to all of the normal works.

Figure 53:
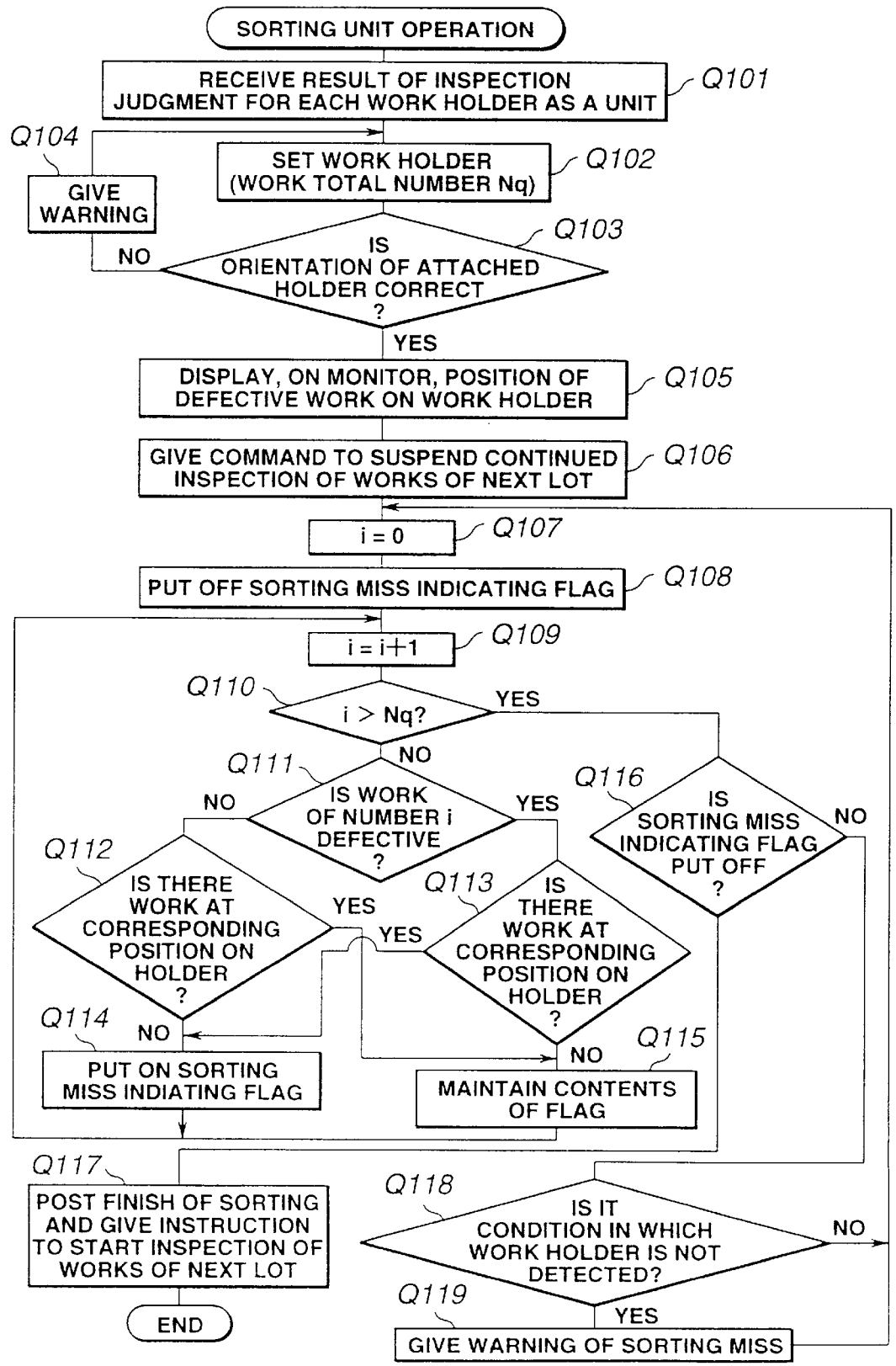
FIG. 53 is a flowchart of an operation of the sorting unit of FIG. 44.

In the process of FIG. 53, a check on whether leaking light is detected is made sequentially at the respective work mounted positions, while at the same time if there is an inconsistency about a leaking light detected condition, a sorting miss indicating flag 452a formed in the RAM 452 is put on. This process steps are repeated until the inconsistency about leaking light detected condition is eliminated, i.e., until a condition where the sorting miss indicating flag 452a is put off at the time when a check at all of the work mounted positions is finished, is obtained (Q108–Q116). When such a condition is obtained, the process proceeds to step Q117 where it is made to post finish of sorting, and an instruction to allow operation is transmitted to the central control unit 52 of he measurement control section 51, and thereafter the process is finished. By this, it becomes possible for the measure system 10 to start inspection of the works of the next lot. On the other hand, in case the work holder orientation detecting sensor 405 is put into a condition of not detecting a work holder though the sorting miss indicating flag 452a is put on at Q116 (i.e., the work holder 38 is removed from the sorting unit 400), the process proceeds to step Q119 to give a warning by means of a warning sound produced by the speaker 413.

While the present invention has been described and shown as above, this is not for the purpose of limitation but various modifications and variation can be made thereto without departing from the appended claims.

For example, while the present invention has been described and shown as being applied to inspection of a flip-chip circuit board, it can be applied to another kind of circuit boards such as BGA circuit board so long as it has solder bumps. Further, the bump is not limited to such a shape that the bump is flat at the top, and the present invention can be applied to a bump having a spherical top by setting a brightness threshold value, etc. to a suitable value.

Figure 9:
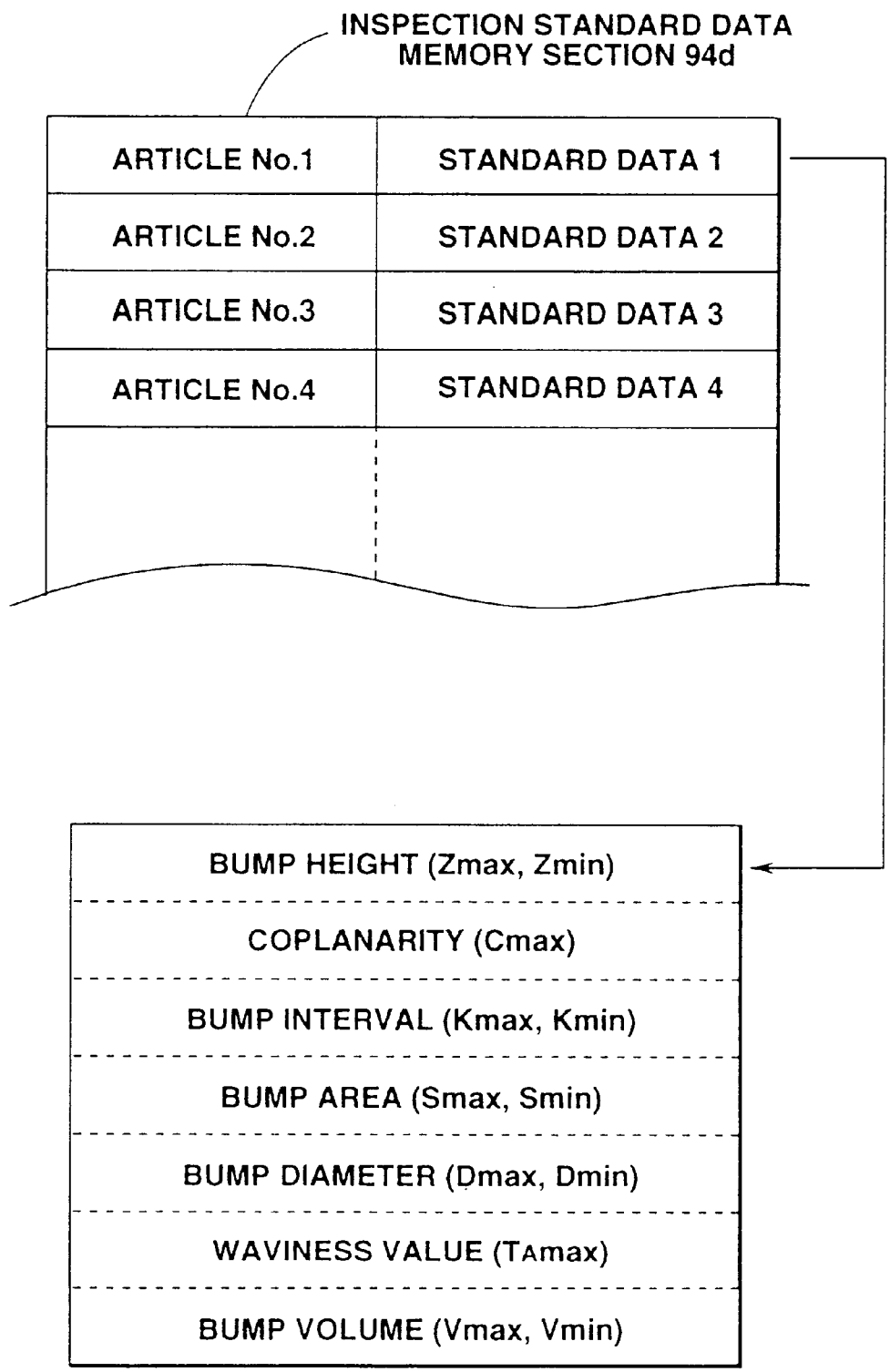
FIG. 9 is an illustration of a data stored in an inspection standard data memory section of the control system of FIG. 5.
Figure 60:
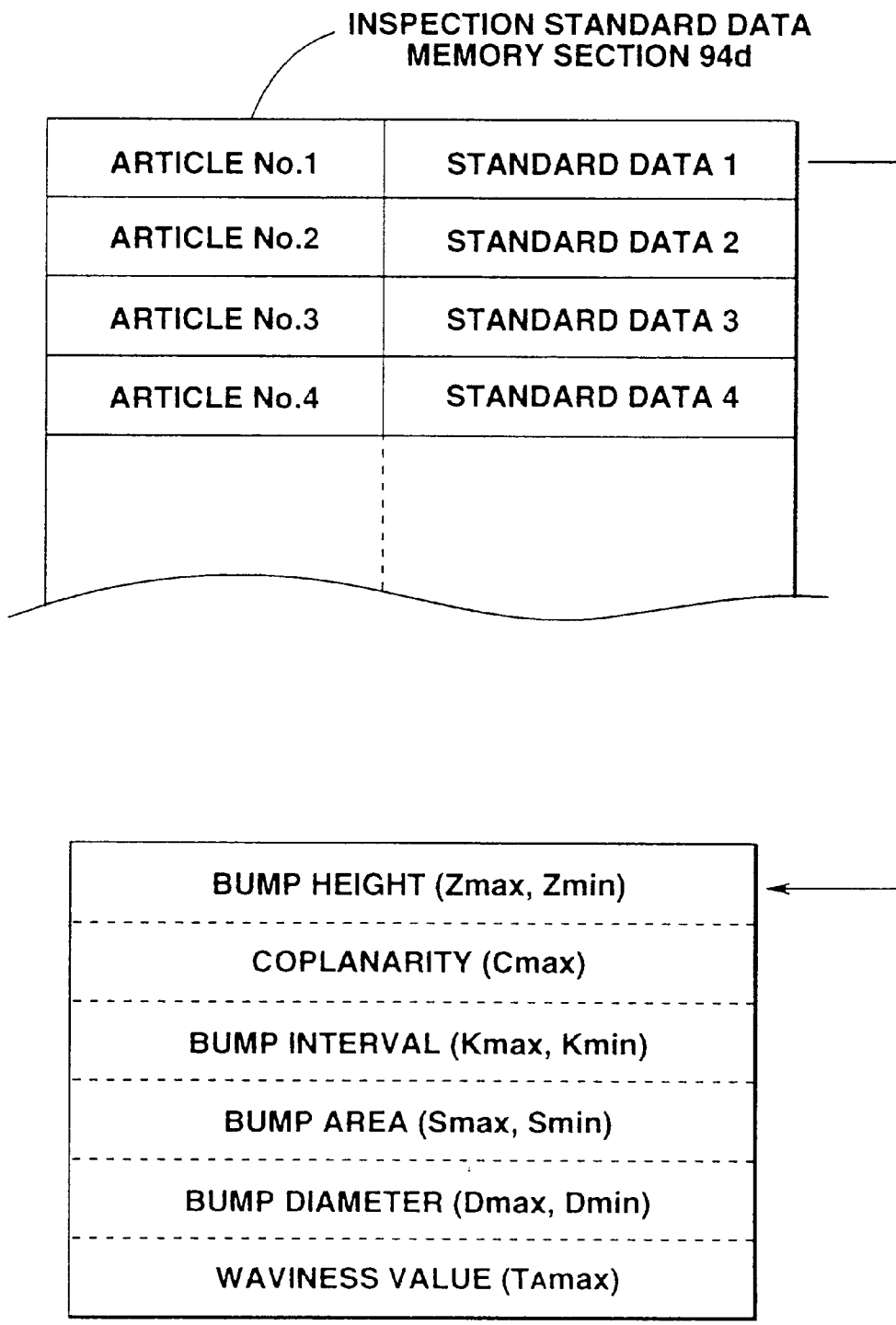
FIG. 60 is a view similar to FIG. 9 but shows another modification.
Figure 61:
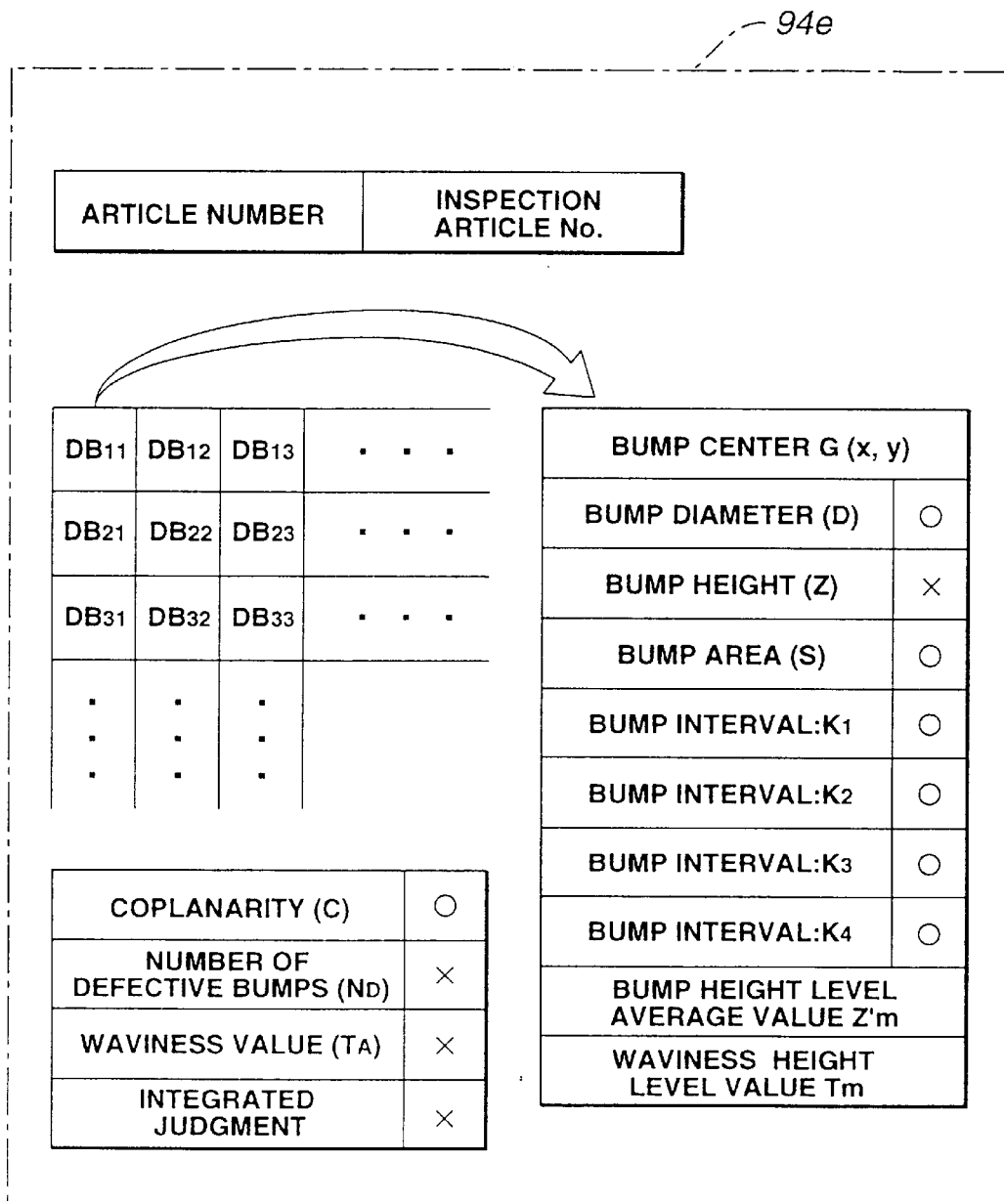
FIG. 61 is a view similar to FIG. 19 but shows another modification.
Figure 62:
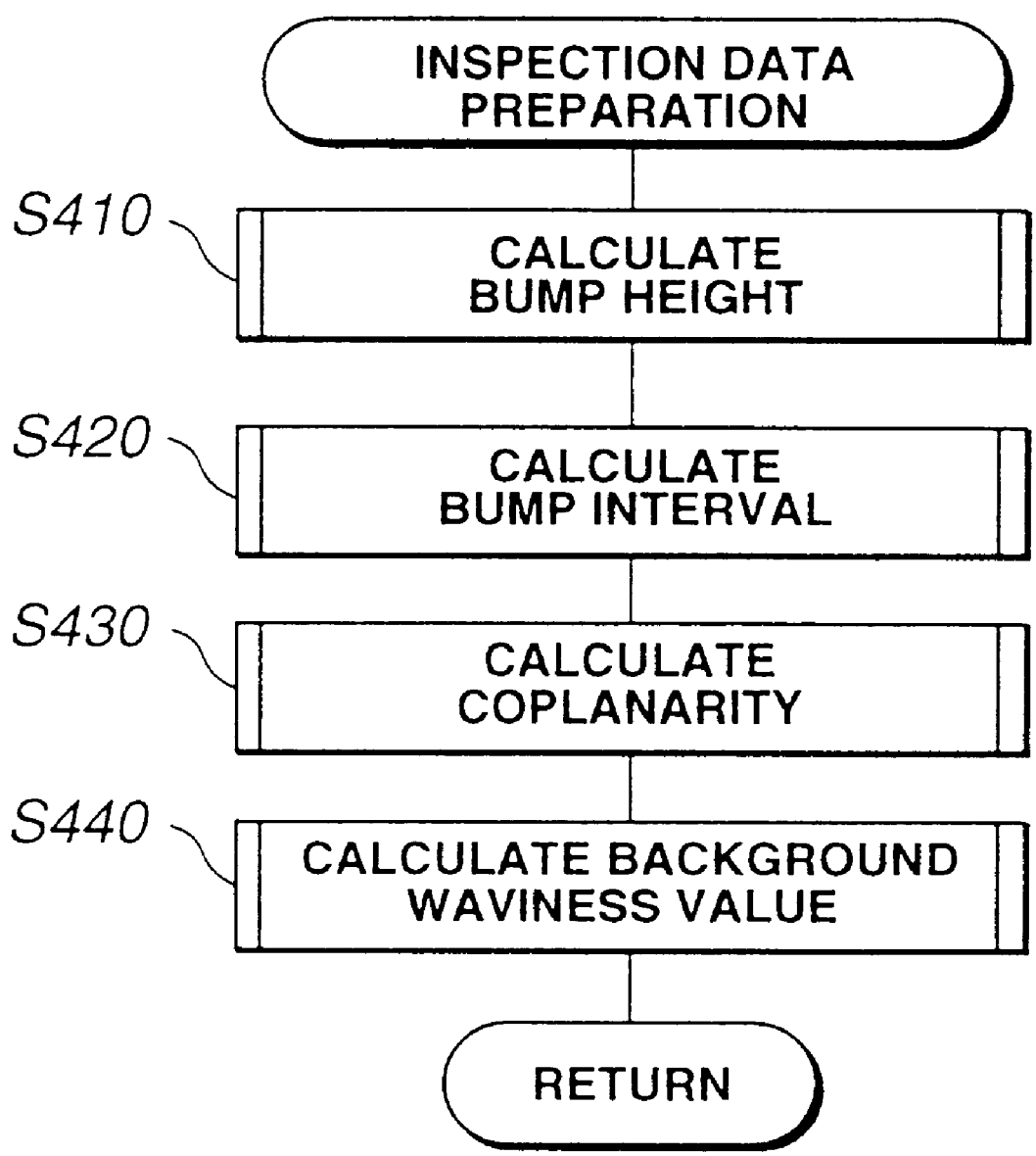
FIG. 62 is a view similar to FIG. 27 but shows another modification.

Further, the inspection standard data memory section 94d in FIG. 9, inspection result data memory section 94e, inspection data preparation in FIG. 27, bump height calculation in FIG. 28 and judgment result output in FIG. 33 are not necessarily to be so but can be those shown in FIGS. 55 to 59, respectively, for the purpose of simplicity in the inspection process and therefore the simplicity in the structure of the apparatus for carrying out the inspection process, particularly when the circuit board substrate 2 is made of a ceramic material or the like that is hard to cause a large warping or waviness of its surface. In case the circuit board substrate 2 is made of a resinous material such as a high polymer material, which is easy to cause such warping or waviness, only the inspection standard data memory section 94d in FIG. 9, inspection result data memory section 94e and inspection data memory section can be replaced by those shown in FIGS. 60 to 62, respectively.

What is claimed is:

1. An apparatus for inspecting a circuit board with a plurality of solder bumps disposed on a circuit board substrate two-dimensionally, the apparatus comprising:

a beam source for supplying an inspection beam onto an inspection surface of the circuit board, said inspection surface including a surface region where said solder bumps are disposed;

a beam receiving section for receiving a reflected beam resulting from the inspection beam and reflected from the inspection surface;

beam scanning means for scanning the beam within the inspection surface two-dimensionally;

height information preparing means for preparing information on height at respective positions within the inspection surface, on the basis of an inspection output at said beam receiving section;

reflected beam brightness information preparing means for preparing information on reflected beam brightness at respective positions on the inspection surface, on the basis of an inspection output at said beam receiving section;

high brightness region fixing means for fixing a plurality of high brightness regions which are located on the inspection surface and which exhibit a reflected beam brightness equal to or higher than a predetermined threshold value, on the basis of the information on brightness prepared by said reflected beam brightness information preparing means;

bump principal portion existing region recognizing means for recognizing, of the fixed high brightness regions, those that have an area equal to or larger than a criterion area as bump principal portion existing regions where principal portions of corresponding those of the solder bumps exist, respectively;

inspection information preparing means for preparing inspection information including at least information on height of the solder bumps corresponding to the bump principal portion existing regions, on the basis of information on height at respective positions within the bump principal portion existing regions; and inspection information output means for outputting the inspection information prepared by said inspection information preparing means.

2. An apparatus according to claim 1, wherein said inspection information preparing means comprises:

bump height determining region setting means for setting, in regard to the inspection surface, a plurality of bump height determining regions each having a predetermined size and a predetermined positional relation to each of the bump principal portion existing regions so that each of the bump height determining regions includes therewithin each of the bump principal portion existing regions; and bump height calculating means for calculating a height of each of the solder bumps on the basis of the information on height at respective positions within each of the set bump height determining regions.

3. An apparatus according to claim 2, further comprising:

bump height determining high brightness region extracting means for extracting, from said high brightness regions existing within said set bump height determining regions, those that have an area equal to or larger than a predetermined threshold area which is set so as to include therewithin each of the bump principal portion existing regions and be smaller than said criterion area, for use as bump height determining high brightness regions;

wherein said bump height calculating means calculates, on the basis of information on height at those of respective positions within each of the bump height determining regions and belonging to each of the extracted bump height determining high brightness regions, a height of corresponding one of the solder bumps.

4. An apparatus according to claim 3, wherein said bump height determining region set by said bump height determining region setting means is one of a circular region with a center coincident with a geometric center of gravity of each of the bump principal portion existing regions, a quadrilateral region with a point of intersection of its diagonal lines coinciding with a geometric center of gravity of each of the bump principal portion existing regions, and a quadrilateral region circumscribed about each of the bump principal portion existing regions.

5. An apparatus according to claim 3, wherein said bump height calculating means calculates one of an average height which is obtained by averaging heights at respective positions within each of the bump height determining high brightness regions, a maximum height which is a maximum of the heights at said respective positions, a minimum height which is a minimum of the heights at said respective positions and a most frequent height which is the most numerous one of the heights at said respective positions, and determines calculated one of them as a height of corresponding one of the solder bumps.

6. An apparatus according to claim 1, further comprising:

position tolerance defining window setting means for setting, in regard to the inspection surface, a plurality of position tolerance defining windows each of which defines a tolerance of a position where each of the solder bumps is formed;

area calculating means for calculating an area of each of the high brightness regions within each of the set position tolerance defining windows or an area proportion at which each of the high brightness regions occupies each of the position tolerance defining windows; and judgment means for judging whether each of the solder bumps corresponding to each of the position tolerance defining windows is in a state of being formed good or not, on the basis of the area or the area proportion of each of the high brightness regions calculated by said area calculating means.

7. An apparatus according to claim 1, wherein the inspection information preparing means comprises bump center calculating means for calculating a geometric center of gravity of each of the bump principal portion existing regions and determining the calculated geometric center of gravity as a center of corresponding one of the solder bumps.

8. An apparatus according to claim 7, wherein said inspection information preparing means comprises bump arranging interval calculating means for calculating a bump arranging interval on the basis of a distance between the centers of the solder bumps calculated by said bump center calculating means.

9. An apparatus according to claim 1, wherein said inspection information preparing means comprises bump center calculating means for calculating a point of intersection of diagonal lines of a quadrilateral region circumscribed about each of the bump principal portion existing regions.

10. An apparatus according to claim 9, therein said inspection information preparing means comprises bump arranging interval calculating means for calculating a bump arranging interval on the basis of a distance between the centers of the solder bumps calculated by said bump center calculating means.

11. An apparatus according to claim 1, wherein said inspection information preparing means comprises bump size calculating means for calculating, on the basis of a size of each of the bump principal portion existing regions, a size of corresponding one of the solder bumps.

12. An apparatus according to claim 1, wherein:

the inspection beam is cast onto the inspection surface while holding the bump-attached circuit board in place by means of a circuit board holder;

said bump height calculating means calculates a coplanarity determining height which is a height of each of the solder bumps above a reference height level having a constant relation with the circuit board holder and determines the coplanarity determining height as said height of corresponding one of the solder bumps; and said inspection information preparing means includes coplanarity information preparing means for preparing coplanarity information reflecting an irregularity of heights of the solder bumps of the bump-attached circuit board, on the basis of a maximum $z'_{max}$ and a minimum $z'_{min}$ of the coplanarity determining heights calculated by said bump height calculating means.

13. An apparatus for inspecting a circuit board with a plurality of solder bumps disposed on a circuit board substrate two-dimensionally, the circuit board substrate having a background surface which is an exposed surface exposed between the solder bumps, the background surface being different in reflectivity for a predetermined inspection beam from a surface of each of the solder bumps, the apparatus comprising:

a beam source for supplying the inspection beam onto an inspection surface of the circuit board, said inspection surface including a surface region where said solder bumps are disposed;

a beam receiving section for receiving a reflected beam resulting from the inspection beam and reflected from the inspection surface;

beam scanning means for scanning the beam within the inspection surface two-dimensionally;

height information preparing means for preparing information on height at respective positions within the inspection surface, on the basis of an inspection output at said beam receiving section;

reflected beam brightness information preparing means for preparing information on reflected beam brightness at respective positions on the inspection surface, on the basis of an inspection output at said beam receiving section;

bump existing region fixing means for fixing a plurality of bump existing regions which are located on the inspection surface, on the basis of the difference in reflected beam brightness between the background surface and a surface of each of the bumps, which difference in reflected beam brightness reflects said information on reflected beam brightness prepared by said reflected beam brightness information preparing means;

inspection information preparing means for preparing inspection information including at least information on height of the solder bumps corresponding to the bump principal portion existing regions, on the basis of information on height at respective positions within the bump principal portion existing regions fixed by the bump principal portion existing region fixing means; and inspection information output means for outputting the inspection information prepared by said inspection information preparing means.

14. An apparatus according to claim 13, wherein said circuit board substrate is made of a high polymer material and has a reflectivity lower than that of said bumps, and said bump existing region fixing means specifies a region at which a reflected beam brightness higher than a predetermined threshold value is detected, as said bump existing region, said predetermined threshold value being set so as to be higher than a reflected beam brightness level at a surface of said high polymer material.

15. An apparatus according to claim 13, further comprising:

high brightness region fixing means for fixing a plurality of high brightness regions which are located on the inspection surface and which exhibit a reflected beam brightness equal to or higher than a predetermined threshold value, on the basis of the information on brightness prepared by said reflected beam brightness information preparing means; and bump principal portion existing region recognizing means for recognizing, of the fixed high brightness regions, those that have an area equal to or larger than a criterion area as bump principal portion existing regions where principal portions of corresponding those of the solder bumps exist, respectively;

wherein said inspection information preparing means produces inspection information including at least information on height of the solder bumps corresponding to the bump principal portion existing regions, on the basis of information on height at respective positions within the bump principal portion existing regions.

16. An apparatus according to claim 15, further comprising:

bump height determining region setting means for setting, in regard to the inspection surface, a plurality of bump height determining regions each having a predetermined size and a predetermined positional relation to each of the bump principal portion existing regions so that each of the bump height determining regions includes therewithin each of the bump principal portion existing regions;

background height determining region setting means for setting, at locations outside of the respective set bump height determining regions, background height determining regions for obtaining the height of the background surface around each of the solder bumps;

bump height calculating means for calculating a height of each of the solder bumps on the basis of the information on height at respective positions within each of the set bump height determining regions;

background height calculating means for calculating the height of the background surface on the basis of information on height of respective positions within each of the set background height determining regions; and bump protruding height calculating means for calculating a height of each of the solder bumps above the background surface on the basis of the difference in height between each of the solder bumps and the background surface.

17. An apparatus according to claim 16, wherein said background height determining region setting means sets an inner boundary line which is disposed outside of each of said bump principal portion existing regions in a way as to surround each of said bump principal portion existing regions and an outer boundary line which is disposed outside of said inner boundary line in a way as to surround said inner boundary line, for thereby setting a region between said inner boundary line and said outer boundary line as said background height determining region.

18. An apparatus according to claim 16, wherein said bump height calculating means calculates one of an average height which is obtained by averaging heights at respective positions within each of the bump height determining high brightness regions, a maximum height which is a maximum of the heights at said respective positions, a minimum height which is a minimum of the heights at said respective positions and a most frequent height which is the most numerous one of the heights at said respective positions, and determines calculated one of them as a height of corresponding one of the solder bumps, and said background height calculating calculates one of an average height which is obtained by averaging heights at respective positions within each of the background height determining regions, a maximum height which is a maximum of the heights at said respective positions, a minimum height which is a minimum of the heights at said respective positions and a most frequent height which is the most numerous one of the heights at said respective positions, and determines calculated one of them as a height of corresponding part of the background surface.

19. An apparatus according to claim 16, wherein said inspection information preparing means includes surface waviness information preparing means for preparing surface waviness information reflecting a waviness condition of the background surface on the basis of the heights, which are calculated by the background height calculating means, of the background surface at the background height determining which are set at different positions on the inspection surface.

20. An apparatus for inspecting a circuit board with a plurality of solder bumps disposed on a circuit board substrate two-dimensionally and having flat tops, the apparatus comprising:

a beam source for supplying an inspection beam onto an inspection surface of the circuit board, said inspection surface including a surface region where said solder bumps are disposed;

a beam receiving section for receiving a reflected beam resulting from the inspection beam and reflected from the inspection surface;

beam scanning means for scanning the beam within the inspection surface two-dimensionally;

height information preparing means for preparing information on height at respective positions within the inspection surface, on the basis of an inspection output at said beam receiving section;

reflected beam brightness information preparing means for preparing information on reflected beam brightness at respective positions on the inspection surface, on the basis of an inspection output at said beam receiving section;

bump top face region fixing means for fixing bump top face existing regions which are regions where top faces of the respective bumps exist and which are located on the inspection surface, on the basis of the information on brightness prepared by said reflected beam brightness information preparing means;

inspection information preparing means for preparing inspection information including at least information on height of the solder bumps corresponding to the bump principal portion existing regions, said inspection information preparing means including bump top face size information preparing means for preparing bump top face size information which is information on a size or an area of each of the bump top face existing regions, bump height information preparing means for preparing bump height information which is information on height of corresponding one of the solder bumps on the basis of the information on height at the respective positions within the inspection surface, and bump volume information preparing means for preparing bump volume information which is information on volume of corresponding one of the solder bumps, on the basis of the bump top face size information and the bump height information; and inspection information output means for outputting the inspection information prepared by said inspection information preparing means.

21. An apparatus according to claim 20, wherein said bump top face size information prepared by said bump top face size information preparing means reflects a diameter or an area of a circle which is of nearly the same area of the bump top face existing region of corresponding one of the bumps and to which the bump top face existing region of said corresponding one bump is approximated.

22. An apparatus according to claim 20, further comprising silhouette region fixing means for fixing silhouette regions on the basis of the reflected beam brightness information prepared by said reflected beam brightness information preparing means each of said silhouette regions being formed along and outside of an outer peripheral end of the bump top face of corresponding one of the bumps and showing a lower brightness with respect to said reflected beam received by said reflected beam receiving section than either of each of the bump top faces and an exposed surface of the circuit board substrate around each of the bumps;

wherein said inspection information preparing means includes a silhouette region size information preparing means for preparing a silhouette region size information which is information on a size or an area of the silhouette region, and bump bottom face size information preparing means for preparing bump bottom face size information which is information on a size or an area of a bump bottom face of corresponding one of the bumps, on the basis of said silhouette region size information; and wherein said bump volume information preparing means prepares said bump volume information on the basis of said bump top face size information, said bump bottom face size information and said bump height information.

23. An apparatus according to claim 22, wherein said silhouette region size information preparing means includes a silhouette region maximum size calculating means for calculating a maximum size of the silhouette region with respect to a plane perpendicular to an incident direction of the inspection beam cast onto the inspection surface, and prepares, as said silhouette region size information, information reflecting a diameter or an area of a circuit to which the silhouette region is approximated in such a manner that a maximum size of the silhouette region is determined as the diameter of the circle.

24. An apparatus according to claim 22, wherein said bump volume information preparing means includes bump volume calculating means for calculating a volume of each of the bumps by approximating a shape of each of the bumps to a truncated cone which has a circular top face of a diameter fixed by said bump top face size information, a circular bottom face of a diameter fixed by said bump bottom face size information, and a height fixed by said bump height information.

25. An apparatus for inspecting a circuit board with a plurality of solder bumps disposed on a circuit board substrate two-dimensionally, the apparatus comprising a measurement system including:

a beam source for supplying an inspection beam onto an inspection surface of the circuit board, said inspection surface including a surface region where said solder bumps are disposed;

a beam receiving section for receiving a reflected beam resulting from the inspection beam and reflected from the inspection surface;

beam scanning means for scanning the beam within the inspection surface two-dimensionally; and height information preparing means for preparing height information which is information on height at respective positions within the inspection surface, on the basis of detection output of said beam receiving section;

the apparatus further comprising:

inspection information preparing means for preparing inspection information reflecting a formed condition of each of the bumps on the inspection surface; and inspection information output means for outputting the inspection information prepared by the inspection information preparing means;

wherein the inspection information output means includes height distribution display means for causing a display device to produce a mapping output representing the height distribution on the inspection surface by dividing a range of height by one or more threshold values and associating divided range sections of height with respective depths and/or colors of each of pixels of the display device one to one for thereby associating depths and/or colors of pixels corresponding to the respective positions on the inspection surface with heights at the respective positions, which are indicated by said height information.

26. An apparatus according to claim 25, further comprising reflected beam brightness information preparing means for preparing information on brightness of the reflected beam at the respective positions on the inspection surface, on the basis of the detection output of said beam receiving section, and wherein said inspection information preparing means prepares said inspection information reflecting a formed condition of each of the bumps on the inspection surface, on the basis of said reflected beam brightness information and said height information.

27. An inspection apparatus according to claim 25, wherein said inspection information includes at least one of height information of each bump, coplanarity information, waviness information of the circuit board substrate, positional information, arranging interval information, information on area of a bump existing region on the inspection surface, and volume information.

28. An inspection apparatus according to claim 25, further comprising:
bump quality judging means for judging good/no good of each of the bumps on the basis of whether the formed condition of each of the bumps, which reflects on said inspection information, satisfies a predetermined judgment condition or not; and
defective bump position display control means for controlling so that said display device displays an existing position of a defective bump which are judged, on a mapping output display of said height distribution, as being defective by said bump quality judging means.

29. An apparatus according to claim 28, further comprising:
defective bump existing region selecting means for selecting, on the mapping output display of the height distribution, the existing region of the defective bump whose position is indicated; and
defective bump existing region enlarged display means for displaying an enlarged mapping image of a height distribution of the selected defective bump existing region.

30. An apparatus according to claim 29, wherein said defective bump position display control means displays, on the mapping output display of the height distribution, a region of a predetermined area including said defective bump existing region for use as an enlargement designating region, said defective bump existing region selecting means selects said defective bump existing region by using said enlargement designating region as a unit for selection of said defective bump existing region, and said defective bump existing region enlarged display means displays while enlarging a mapping image within the selected enlargement designating region.

31. An apparatus according to claim 30, wherein said defective bump existing region selecting means selects said enlargement designating region by moving, on said mapping output display, a pointer which is displayed on the mapping output display by an operation of a pointing device and placing a position indicated by said pointer within said enlargement designating region while executing, under such a condition, a region selection command.

32. An apparatus according to claim 30, wherein said defective bump position display control means sets said enlargement designating region in such a manner that said enlargement designating region includes a plurality of bump existing regions, the apparatus further comprising individual bump selection region setting means for setting a region of a predetermined area including only optional one of the individual bump existing regions within the enlargement designating region, as an individual bump selection region, and individual bump mapping image enlarged display means for displaying while further enlarging a mapping image within the set individual bump selection region.

33. An apparatus according to claim 32, further comprising inspection information content display means for displaying a content of said inspection information of one of the bumps corresponding to the bump existing region selected by said individual bump selection region.

34. An apparatus according to claim 32, further comprising:
pixel selecting means for selecting optional one of pixels constituting the mapping image within said individual bump selection region; and
detection information-by-position display means for displaying a content concerning at least one of said height information and said reflected beam information and corresponding to a position on the inspection surface, which is indicated by the selected pixel.

35. An apparatus according to claim 25, further comprising:
a work holder for detachably holding thereon a plurality works which are arranged on a plane, each of the works being a bump-attached circuit board which is an object for inspection; and
work holder drive means for driving said work holder to move relative to the beam source for thereby moving the arranged works sequentially into an inspection position to which the inspection beam is cast;
wherein said measurement system performs detection of height at respective positions within an inspection surface of each of the works which are moved into the inspection position, and said inspection information preparing means prepares inspection information of each of the works on the basis of corresponding one of said height information.

36. An apparatus according to claim 35, further comprising:
work arrangement display means for displaying arrangement of the works on the work holder;
work quality judging means for judging good/no good of each of the works on the basis of said inspection information; and
defective work display control means for controlling said work arrangement display means and making it display, in relation to the arrangement of the works, a position of a defective work which is judged as having a defective bump or bumps by means of said work quality judging means.

37. An apparatus according to claim 36, wherein said work arrangement display means includes individual work display sections which correspond one-to-one to the respective works on the work holder, and said defective work display control means causes said work arrangement display means to display the position of the defective work by making those of the individual work display sections corresponding to a defective work and a normal work different in a display condition from each other.

38. An apparatus according to claim 35, further comprising measurement system operation control means for suspending measurement operation of said work holder drive means and said measurement system in case a work is judged as being defective by said work quality judging means in the middle of detection of the height at the respective positions within the inspection surface, which is carried out sequentially for the works.

39. An apparatus according to claim 35, further comprising:
work quality judgment result display means for displaying a result of judgment on whether each of the works on the work holder is a defective work or normal work;

work detecting means for detecting individually whether the works are attached to respective work attaching positions on the work holder;

sorting result judging means for judging whether a work sorting operation is carried out correctly or not, on the basis of a detection content of said work detection means with respect to the work holder which is subjected to a work sorting operation for removing a defective work and leaving a normal work, while looking at a display content of said work quality judgment result display means; and judgment result output means for outputting a result of judgment by said sorting result judging means.

40. An apparatus according to claim 39, further comprising warning output means for outputting a warning by means of a sound, line or a combination thereof, in response to an output of a judgment result from said judgment result output means when a work sorting operation is not carried out correctly.

41. An apparatus according to claim 39, wherein said work detecting means detects whether the works are attached to the work attaching positions, with respect to the work holder in a state of being removed from said measurement system, and the apparatus further comprising measurement system operation control means for controlling said work holder drive means and said measurement system in a way as to inhibit them from performing a measurement operation for a next work holder, in response to an output of a judgment result from said judgment result output means in case the work sorting operation is not carried out correctly.

42. An apparatus according to claim 41, wherein said work holder is formed with a plurality of depressions in which the works are installed respectively, said work holder being further formed with a light transmitting portion at a bottom of each of the depressions, and said work detecting means includes a sorting light source for illuminating said work holder from a lower side thereof and leaking light detecting means disposed on a side of said work holder opposite to said sorting light source for detecting a leaking light from said light transmitting portion at each of said depressions, said work detecting means detecting whether the works are installed in the respective depressions on the basis of existence of the leaking light.

43. A method of inspecting a bump-attached circuit board with a plurality of solder bumps arranged on a circuit board substrate two-dimensionally, comprising the steps of:

supplying an inspection beam onto an inspection surface of the circuit board, the inspection surface including a surface region where the solder bumps are disposed, and scanning the inspection beam within the inspection surface two-dimensionally while receiving, at a beam receiving section, a reflected beam resulting from the inspection beam and reflected from the inspection surface;

preparing information on height at respective positions within the inspection surface, on the basis of an inspection output at the beam receiving section;

preparing, on the basis of the inspection output at the beam receiving section, information on brightness of the reflected beam at respective positions on the inspection surface, and fixing, within the inspection surface, a plurality of high brightness regions each of which exhibits a reflected beam brightness higher than a predetermined threshold value, on the basis of the information on brightness of the reflected beam;

recognizing, of the fixed high brightness regions, those that have an area equal to or larger than a criterion area as bump principal portion existing regions where principal portions of corresponding those of the solder bumps exist, respectively; and obtaining, on the basis of information on height at respective positions within the bump principal portion existing regions, inspection information including at least information on height of the solder bumps corresponding to the bump principal portion existing regions.

44. A method of inspecting a bump-attached circuit board with a plurality of solder bumps disposed on a circuit board substrate two-dimensionally, the circuit board substrate having a background surface which is an exposed surface exposed between the solder bumps, the background surface being different in reflectivity for a predetermined inspection beam from a surface of each of the solder bumps, the method comprising the steps of:

supplying an inspection beam onto an inspection surface of the circuit board, the inspection surface including a surface region where the solder bumps are disposed, and scanning the inspection beam within the inspection surface two-dimensionally while receiving, at a beam receiving section, a reflected beam resulting from the inspection beam and reflected from the inspection surface;

preparing information on height at respective positions within the inspection surface, on the basis of an inspection output at the beam receiving section;

preparing, on the basis of the inspection output at the beam receiving section, information on brightness of the reflected beam at respective positions on the inspection surface, and fixing, within the inspection surface, a plurality of bump existing regions where the respective solder bumps exist, on the basis of the difference in reflected beam brightness between the background surface and a surface of each of the bumps; and obtaining, on the basis of information on height at respective positions within the bump existing regions, inspection information including at least information on height of the solder bumps corresponding to the bump existing regions.

45. A method of inspecting a circuit board with a plurality of solder bumps disposed on a circuit board substrate two-dimensionally and having flat tops, the method comprising the steps of:

supplying an inspection beam onto an inspection surface of the circuit board, the inspection surface including a surface region where the solder bumps are disposed, and scanning the inspection beam within the inspection surface two-dimensionally while receiving, at a beam receiving section, a reflected beam resulting from the inspection beam and reflected from the inspection surface;

preparing information on height at respective positions within the inspection surface, on the basis of an inspection output at said beam receiving section;

preparing information on reflected beam brightness at respective positions on the inspection surface, on the basis of an inspection output at said beam receiving section;

fixing bump top face existing regions which are regions where top faces of the respective bumps exist and which are located on the inspection surface, on the basis of the information on brightness prepared by said reflected beam brightness information preparing means; and preparing inspection information including at least bump volume information which is information on volume of the solder bumps, by using the size or area of the bump top face existing regions and the bump height information at the respective positions within the inspection surface.

46. A method of producing a bump-attached circuit board with a plurality of solder bumps arranged on a circuit board substrate two-dimensionally, comprising the steps of:

forming the solder bumps on the circuit board substrate;

supplying an inspection beam onto an inspection surface of the circuit board, the inspection surface including a surface region where the solder bums are disposed, and scanning the inspection beam within the inspection surface two-dimensionally while receiving, at a beam receiving section, a reflected beam resulting from the inspection beam and reflected from the inspection surface;

preparing information on height at respective positions on the inspection surface, on the basis of an inspection output at the beam receiving section;

preparing, on the basis of the inspection output at the beam receiving section, information on brightness of the reflected beam at respective positions on the inspection surface, and fixing, within the inspection surface, a plurality of high brightness regions each of which exhibits a reflected beam brightness higher than a predetermined threshold value, on the basis of the information on brightness of the reflected beam;

recognizing, of the fixed high brightness regions, those that have an area equal to or larger than a criterion area as bump principal portion existing regions where principal portions of corresponding those of the solder bumps exist, respectively;

measuring, on the basis of information on height at respective positions within the recognized bump principal portion existing regions, a height of each of the solder bumps corresponding to each of the bump principal portion existing regions; and detecting and sorting out only a bump-attached circuit board, all of the solder bumps of which have heights within a predetermined range.

47. A method of producing a bump-attached circuit board with a plurality of solder bumps disposed on a circuit board substrate two-dimensionally, the circuit board substrate having a background surface which is an exposed surface exposed between the solder bumps, the background surface being different in reflectivity for a predetermined inspection beam from a surface of each of the solder bumps, the method comprising the steps of:

forming the solder bumps on the circuit board substrate;

supplying an inspection beam onto an inspection surface of the circuit board, the inspection surface including a surface region where the solder bumps are disposed, and scanning the inspection beam within the inspection surface two-dimensionally while receiving, at a beam receiving section, a reflected beam resulting from the inspection beam and reflected from the inspection surface;

preparing information on height at respective positions on the inspection surface, on the basis of an inspection output at the beam receiving section;

preparing, on the basis of the inspection output at the beam receiving section, information on brightness of the reflected beam at respective positions on the inspection surface, and fixing, within the inspection surface, a plurality of bump existing regions where the respective solder bumps exist, on the basis of the difference in reflected beam brightness between the background surface and a surface of each of the bumps;

measuring, on the basis of information on height at respective positions within the recognized bump existing regions, a height of each of the solder bumps corresponding to each of the bump existing regions; and detecting and sorting out only a bump-attached circuit board, all of the solder bumps of which have heights within a predetermined range.

48. A method of producing a circuit board with a plurality of solder bumps disposed on a circuit board substrate two-dimensionally and having flat tops, the method comprising the steps of:

forming the solder bumps on the circuit board substrate;

supplying an inspection beam onto an inspection surface of the circuit board, the inspection surface including a surface region where the solder bumps are disposed, and scanning the inspection beam within the inspection surface two-dimensionally while receiving, at a beam receiving section, a reflected beam resulting from the inspection beam and reflected from the inspection surface;

preparing information on height at respective positions on the inspection surface, on the basis of an inspection output at the beam receiving section;

preparing, on the basis of the inspection output at the beam receiving section, information on brightness of the reflected beam at respective positions on the inspection surface, and fixing, within the inspection surface, a plurality of bump top face existing regions where top faces of the respective bumps exist, on the basis of said prepared information on brightness;

measuring a volume of each of the bumps by using the size or area of corresponding one of the bump top face existing regions and bump height information which is information on height of corresponding one of the bumps and which is prepared on the basis of information on height at respective positions within corresponding one of the bump top face existing regions;

detecting and sorting out only a bump-attached circuit board, all of the solder bumps of which have volumes within a predetermined range.

* * * * *